(12) United States Patent
Bouzguarrou et al.

(10) Patent No.: US 12,541,371 B2
(45) Date of Patent: Feb. 3, 2026

(54) PREDICTING BEHAVIOUR OF CONTROL FLOW INSTRUCTIONS USING PREDICTION ENTRY TYPES

(71) Applicant: Arm Limited, Cambridge (GB)

(72) Inventors: Houdhaifa Bouzguarrou, Austin, TX (US); Alexander Cole Shulyak, Austin, TX (US)

(73) Assignee: Arm Limited, Cambridge (GB)

( * ) Notice: Subject to any disclaimer, the term of this patent is extended or adjusted under 35 U.S.C. 154(b) by 195 days.

(21) Appl. No.: 18/454,165

(22) Filed: Aug. 23, 2023

(65) Prior Publication Data

US 2025/0068426 A1 Feb. 27, 2025

(51) Int. Cl.
*G06F 9/38* (2018.01)

(52) U.S. Cl.
CPC .......... *G06F 9/3842* (2013.01); *G06F 9/3844* (2013.01)

(58) Field of Classification Search
CPC ........ G06F 9/38; G06F 9/3802; G06F 9/3804; G06F 9/3806; G06F 9/3808; G06F 9/381; G06F 9/3812; G06F 9/3814; G06F 9/3816; G06F 9/3818; G06F 9/382; G06F 9/3822; G06F 9/3824; G06F 9/3826; G06F 9/3828; G06F 9/383; G06F 9/3832; G06F 9/3834; G06F 9/3836; G06F 9/3838; G06F 9/384; G06F 9/3842; G06F 9/3844; G06F 9/3846; G06F 9/3848; G06F 9/3851; G06F 9/3853; G06F 9/3854; G06F 9/3855; G06F 9/3856; G06F 9/3857; G06F 9/3858;

(Continued)

(56) References Cited

U.S. PATENT DOCUMENTS 6,006,317 A 12/1999 Ramagopal et al.
6,385,720 B1 5/2002 Tanaka (Continued)

OTHER PUBLICATIONS

Xie et al., SWIP Prediction: Complexity-Effective Indirect-Branch Prediction Using Pointers, Jul. 12, 2012, J. Comput. Sci. Technol. 27, 754-768 (Year: 2012).*

(Continued)

*Primary Examiner* — Jyoti Mehta
*Assistant Examiner* — Emilio Alcantara-Ramos
(74) *Attorney, Agent, or Firm* — NIXON & VANDERHYE P.C.

(57) ABSTRACT

An apparatus stores pointer values for pointers which are incremented differentially and has prediction circuitry to maintain prediction entries each identifying a control flow instruction, an associated pointer, and a behaviour record indicating resolved behaviour of the control flow instruction. Resolved behaviour stored in a selected element of the behaviour record identified using a pointer value of the associated pointer may be used as predicted behaviour for a control flow instruction. The prediction entries include a first type of prediction entry and a further type of prediction entry, where prediction circuitry uses each prediction entry of the first type to identify a control flow instruction whose associated pointer is within a first subset of the pointers, and uses each prediction entry of a further type to identify a control flow instruction whose associated pointer is within a further subset of the pointers excluding at least one pointer of the first subset.

20 Claims, 29 Drawing Sheets

(58) Field of Classification Search
CPC .... G06F 9/3859; G06F 9/3861; G06F 9/3863; G06F 9/3865; G06F 9/3867; G06F 9/3869; G06F 9/3871; G06F 9/3873; G06F 9/3875; G06F 9/3877; G06F 9/3879; G06F 9/3881; G06F 9/3885; G06F 9/3887; G06F 9/3888; G06F 9/3889; G06F 9/3891; G06F 9/3893; G06F 9/3895; G06F 9/3897; G06F 1/3287

See application file for complete search history.

(56) References Cited

U.S. PATENT DOCUMENTS

| | | | |
|---|---|---|---|
| 6,694,425 | B1 | 2/2004 | Eickemeyer |
| 6,738,897 | B1 * | 5/2004 | Talcott .................. G06F 9/3848 712/240 |
| 8,078,852 | B2 | 12/2011 | Al-Otoom |
| 8,751,776 | B2 * | 6/2014 | Ukai ..................... G06F 9/3806 712/240 |
| 9,639,368 | B2 | 5/2017 | Bonanno |
| 9,891,918 | B2 * | 2/2018 | Hooker ................. G06F 9/3848 |
| 9,973,187 | B1 * | 5/2018 | Pant ..................... H03K 17/223 |
| 10,223,123 | B1 * | 3/2019 | Blasco .................. G06F 1/3206 |
| 10,846,097 | B2 | 11/2020 | Jumani et al. |
| 10,915,322 | B2 | 2/2021 | Annamalai |
| 11,113,066 | B2 * | 9/2021 | Bhat ..................... G06F 9/3844 |
| 11,334,361 | B2 * | 5/2022 | Ishii ..................... G06F 9/3832 |
| 11,983,533 | B2 | 5/2024 | Pusdesris |
| 2004/0255104 | A1 | 12/2004 | Akkary et al. |
| 2005/0138480 | A1 | 6/2005 | Srinivasan et al. |
| 2011/0238917 | A1 | 9/2011 | Lin |
| 2016/0092230 | A1 | 3/2016 | Chen |
| 2016/0350116 | A1 | 12/2016 | Reddy et al. |
| 2017/0010820 | A1 | 1/2017 | Day |
| 2018/0088953 | A1 | 3/2018 | Lin |
| 2020/0050459 | A1 | 2/2020 | Palivela |
| 2020/0104137 | A1 | 4/2020 | Natarajan |
| 2020/0174794 | A1 | 6/2020 | Golla |
| 2021/0081575 | A1 | 3/2021 | Saileshwar |
| 2021/0124586 | A1 | 4/2021 | Bouzguarrou |
| 2021/0240476 | A1 | 8/2021 | Kountanis |
| 2022/0197650 | A1 | 6/2022 | Soundararajan |
| 2023/0057600 | A1 | 2/2023 | Malley |

OTHER PUBLICATIONS

U.S. Appl. No. 17/851,266, filed Jun. 28, 2022, Shulyak et al.
U.S. Appl. No. 18/312,052, filed May 4, 2023, Shulyak et al.
U.S. Appl. No. 18/454,158, filed Aug. 23, 2023, Bouzguarrou et al.
U.S. Appl. No. 18/462,742, filed Sep. 7, 2023, Bouzguarrou et al.
Office Action dated Aug. 9, 2023 for U.S. Appl. No. 17/851,266, 11 pages.
Akkary, H. et al. "Recycling Waste: Exploiting Wrong-Path Execution to Improve Branch Prediction" ICS'03, Jun. 23-26, 2003, pp. 12-21 (10 pages).
Mutlu, O. et al. "On Reusing the Results of Pre-Executed Instructions in a Runahead Execution Processor" IEEE Computer Architecture Letters, 2005, vol. 4 (4 pages).
Notice of Allowance dated Aug. 22, 2024 for U.S. Appl. No. 18/312,052, 15 pages.
Notice of Allowance dated Apr. 4, 2025 for U.S. Appl. No. 18/462,742, 10 pages.

* cited by examiner

```
for (i = 0; i < N; i++){
        if (hard_to_predict){        // Branch A
                if (data[i]){        // Branch B
                        ...
                }
        }
}
```

FIG. 2

```
if (long_latency_hard_to_predict){
        ...
} if (short_latency_hard_to_predict){
        ....
}
```

FIG. 3

```
for (i=0; i < N; i++){
        if (long_latency_hard_to_predict){      // Branch A
                ...
        } if (short_latency_hard_to_predict){     // Branch B
                ...
        }
}
```

FIG. 4A short[i=0] = T      long[i=0] = T
short[i=1] = T      long[i=1] = N*
short[i=2] = N      long[i=2] = ?
short[i=3] = T      long[i=3] = ?

FIG. 4B

```
for (i=0; i < N; i++){
        for (j=0; j < N; j++){    // Loop iteration count hard to predict
                ...
        }
}
if (hard_to_predict){              // Branch A
        ...
}
```

FIG. 5

PREDICTING BEHAVIOUR OF CONTROL FLOW INSTRUCTIONS USING PREDICTION ENTRY TYPES

BACKGROUND

Technical Field

The present technique relates to the field of data processing, and more particularly to control flow prediction.

Technical Background

In a data processing system, instructions can be executed speculatively. For example, conditional control flow instructions determine which sequence of later instructions (control flow path) will subsequently be executed. A particular example of a conditional control flow instruction is a conditional branch instruction. In such systems, execution of a conditional control flow instruction can involve predicting the conditional control flow instruction's outcome before the instruction has been executed. This allows the data processing system to speculatively execute later instructions on the control flow path indicated by the predicted outcome of the control flow instruction. Speculative execution of instructions in this way allows the later instructions to be executed sooner than would be possible if the data processing system was forced to wait until the outcome of the earlier instruction was known, which may improve the performance of the data processing system. If the prediction of the outcome of a conditional control flow instruction is later determined to have been incorrect, the later instructions executed from the incorrect control flow path are flushed from the pipeline of the data processing system, with the data processing system then executing instructions on the correct control flow path.

It is desirable to develop prediction mechanisms that increase the accuracy of prediction of the outcome of control flow instructions, as the more accurately the prediction mechanism operates, the less need there will be to flush instructions from the pipeline, and hence the performance impact of incorrect predictions will be reduced.

SUMMARY

In a first example arrangement there is provided an apparatus comprising:
pointer storage configured to store pointer values for a plurality of pointers;
increment circuitry, responsive to a series of increment events, to differentially increment the pointer values of the pointers; and
prediction circuitry configured to maintain a plurality of prediction entries, each prediction entry arranged to identify a control flow instruction with an associated pointer from the plurality of pointers, and a behaviour record comprising at least one element, wherein a valid element of the behaviour record comprises an indication of a resolved behaviour of an instance of the control flow instruction identified by the prediction entry; wherein
the prediction circuitry is responsive to replay of a given instance of a given control flow instruction identified by a given prediction entry of the prediction circuitry, to use the resolved behaviour stored in a selected element of the behaviour record of the given prediction entry as the predicted behaviour of the given instance of the given control flow instruction, wherein the selected element is dependent on a pointer value of the associated pointer; and
the plurality of prediction entries comprises:
at least one prediction entry of a first type, wherein the prediction circuitry is enabled to use each prediction entry of the first type to identify a control flow instruction whose associated pointer is within a first subset of the plurality of pointers; and
at least one prediction entry of at least one further type, wherein the prediction circuitry is enabled to use each prediction entry of the at least one further type to identify a control flow instruction whose associated pointer is within a further subset of the plurality of pointers that excludes at least one pointer of the first subset.

In a further example arrangement there is provided a method of predicting behaviour of control flow instructions, comprising:
maintaining pointer values for a plurality of pointers and, responsive to a series of increment events, differentially incrementing pointer values of the pointers;
employing prediction circuitry to maintain a plurality of prediction entries, each prediction entry arranged to identify a control flow instruction with an associated pointer from the plurality of pointers, and a behaviour record comprising at least one element, wherein a valid element of the behaviour record comprises an indication of a resolved behaviour of an instance of the control flow instruction identified by the prediction entry; and
responsive to replay of a given instance of a given control flow instruction identified by a given prediction entry of the prediction circuitry, using the resolved behaviour stored in a selected element of the behaviour record of the given prediction entry as the predicted behaviour of the given instance of the given control flow instruction, wherein the selected element is dependent on a pointer value of the associated pointer; wherein
the plurality of prediction entries comprises:
at least one prediction entry of a first type, wherein the prediction circuitry is enabled to use each prediction entry of the first type to identify a control flow instruction whose associated pointer is within a first subset of the plurality of pointers; and
at least one prediction entry of at least one further type, wherein the prediction circuitry is enabled to use each prediction entry of the at least one further type to identify a control flow instruction whose associated pointer is within a further subset of the plurality of pointers that excludes at least one pointer of the first subset.

In a yet further example arrangement there is provided computer-readable code for fabrication of a data processing apparatus comprising:
pointer storage configured to store pointer values for a plurality of pointers;
increment circuitry, responsive to a series of increment events, to differentially increment the pointer values of the pointers; and
prediction circuitry configured to maintain a plurality of prediction entries, each prediction entry arranged to identify a control flow instruction with an associated pointer from the plurality of pointers, and a behaviour record comprising at least one element, wherein a valid element of the behaviour record comprises an indication of a resolved behaviour of an instance of the control flow instruction identified by the prediction entry; wherein the prediction circuitry is responsive to replay of a given instance of a given control flow instruction identified by a given prediction entry of the prediction circuitry, to use the resolved behaviour stored in a selected element of the behaviour record of the given prediction entry as the predicted behaviour of the given instance of the given control flow instruction, wherein the selected element is dependent on a pointer value of the associated pointer; and the plurality of prediction entries comprises:

at least one prediction entry of a first type, wherein the prediction circuitry is enabled to use each prediction entry of the first type to identify a control flow instruction whose associated pointer is within a first subset of the plurality of pointers; and at least one prediction entry of at least one further type, wherein the prediction circuitry is enabled to use each prediction entry of the at least one further type to identify a control flow instruction whose associated pointer is within a further subset of the plurality of pointers that excludes at least one pointer of the first subset.

Such computer-readable code can be disposed in any known transitory computer-readable medium (such as wired or wireless transmission of code over a network) or non-transitory computer-readable medium such as semiconductor, magnetic disk, or optical disc.

In a still further example arrangement there is provided a system comprising: the apparatus according to the above-mentioned first example arrangement, implemented in at least one packaged chip; at least one system component; and a board, wherein the at least one packaged chip and the at least one system component are assembled on the board.

In a still further example arrangement there is provided a chip-containing product comprising the above-mentioned system assembled on a further board with at least one other product component.

Further aspects, features and advantages of the present technique will be apparent from the following description of examples, which is to be read in conjunction with the accompanying drawings.

BRIEF DESCRIPTION OF THE DRAWINGS

FIG. 2 illustrates an example of a guard instruction;

FIG. 3 illustrates an example of hard to predict instructions having different latencies;

FIG. 4A shows an example in which a FOR loop contains a long latency branch instruction and a short latency branch instruction, whilst FIG. 4B shows the corresponding storage that can be used to perform replay prediction;

FIG. 5 shows how FOR loop indexing can be polluted;

DESCRIPTION OF EXAMPLES

Figure 1:
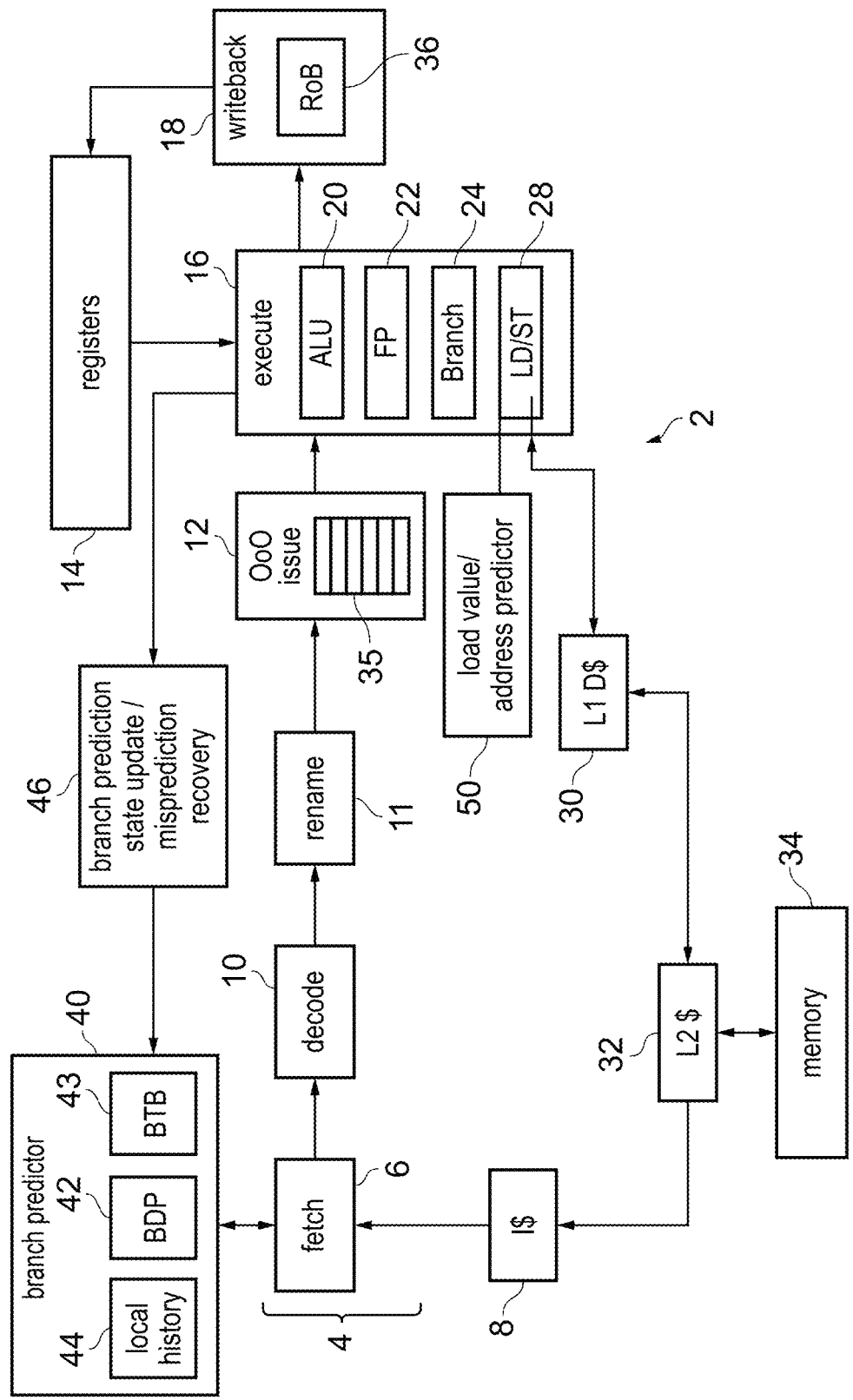
FIG. 1 schematically illustrates an example of a data processing apparatus.

Rather than using global history for control flow (e.g. branch) instruction prediction, one could consider the history of other recently executed branch instructions. This, however, can be problematic in the face of out-of-order execution in which a later branch prediction is rewound due to an earlier branch instruction being mispredicted. In this case, the series of branch outcomes taken to get to the later branch instruction will be different in each case and so the previous execution of the later branch instruction does not help.

Replay prediction makes it possible to use the previous execution result (behaviour) of a branch instruction that was rewound due to a misprediction of an earlier instruction. This is particularly useful in the case of program loops (such as FOR loops) where an iteration of the FOR loop might be repeated due to rewinding. In this case, if the previous execution result of a branch instruction is kept, this result could serve as a reasonable prediction of the branch instruction's behaviour when the same iteration number is re-reached. However, it remains difficult to tell, at a hardware level, which iteration a loop is in. This is because, at the instruction level, all that is seen are branch instructions, which might be branches or loops. Further complicating this is the fact that certain program structures can make it difficult to count the loop iteration number. It would therefore be desirable to provide a replay prediction mechanism that can enable replay prediction to occur more accurately. It would also be desirable to produce an area efficient design, so as for example to allow a larger number of control flow instructions to be tracked by the replay prediction mechanism for a given size/area cost associated with the provision of the replay prediction mechanism.

In accordance with one example implementation, an apparatus is provided that has pointer storage to store pointer values for a plurality of pointers, and increment circuitry that is responsive to a series of increment events to differentially increment the pointer values of the pointers. This approach provides a pool of pointers whose values are incremented in response to increment events, but where the evaluation of whether and/or how to increment the value of any given pointer in response to any given increment event is performed such that over time the pointer values of the different pointers will increment differently with respect to each other. Hence, over time the pointers will take different values dependent on the observed increment events. As will be apparent from the subsequent discussion, the aim is to seek to associate, with any given control flow instruction that is seeking to be tracked, one of the pointers, and in particular to seek to identify a pointer whose pointer value is incremented in a way that correlates with occurrences of the given control flow instruction, or put another way a pointer whose pointer value will increment at the same rate at which any encapsulating loop containing the given control flow instruction iterates.

In accordance with the techniques described herein, the apparatus also has prediction circuitry configured to maintain a plurality of prediction entries, wherein each prediction entry is arranged to identify a control flow instruction and an associated pointer, selected from amongst the plurality of pointers, to be associated with that control flow instruction. Each prediction entry also identifies a behaviour record comprising at least one element, wherein a valid element of the behaviour record comprises an indication of a resolved behaviour of an instance of the control flow instruction identified by that prediction entry. The prediction circuitry is responsive to replay of a given instance of a given control flow instruction identified by a given prediction entry of the prediction circuitry, to use the resolved behaviour stored in a selected element of the behaviour record of the given prediction entry as the predicted behaviour of the given instance of the given control flow instruction.

The selected element of the behaviour record may be selected based on a pointer value of the associated pointer associated with the given control flow instruction identified in the given prediction entry. The behaviour record may comprise several valid elements indicating different resolved behaviours of different instances of the given control flow instruction. To make an accurate prediction, the element corresponding to the given instance of the given control flow instruction should be selected. As discussed above, the associated pointer associated with the given control flow instruction may be selected such that it is a pointer which increments in a manner which correlates with occurrences of instances of the given control flow instruction. Use of the associated pointer therefore means that the selection of the element of the behaviour record changes in a manner correlating with the occurrence of instances of the given control flow instruction, meaning that the element of the behaviour record selected using the pointer value of the associated pointer can be used to make a prediction for the outcome of the given instance of that given control flow instruction. This can enable accurate predictions to be made of the outcome of the given control flow instruction during multiple iterations of an encapsulating loop.

As will be discussed in further detail below, training circuitry may be provided to select the associated pointer for a given control flow instruction. Training circuitry may be configured to perform a training process to seek to determine, as an associated pointer for the given control flow instruction, a pointer from amongst the plurality of pointers whose pointer value increments in a manner that meets a correlation threshold with occurrence of instances of the given control flow instruction. Training circuitry may make use of tracker circuitry separate from the prediction circuitry to store indications of control flow instructions during training.

When making a prediction using the prediction circuitry for a given control flow instruction, an entry of the prediction circuitry may be identified and used to identify the associated pointer. The pointer value may then be read from the pointer storage circuitry and used to select an element from the behaviour record to provide the prediction. In one example of the prediction circuitry, the prediction circuitry is able to use any prediction entry to identify a given control flow instruction. However, the inventors have realised that in such an example implementation, each entry of the prediction circuitry may need to be provided with a read port into the pointer storage, each entry would be provided with selection circuitry to select the associated pointer from the pointer storage based on the pointer associated with the entry, and each entry would be associated with selection circuitry to select an element of the behaviour record based on the selected pointer. The area and power requirements for providing such circuitry for every prediction entry may be high. In addition, multiple predictions for multiple branch instructions may be made in each clock cycle. There may therefore be congestion associated with several entries simultaneously reading pointer values from the pointer storage, which could lead to timing delays.

The inventors have identified that these problems can be reduced by providing prediction circuitry with prediction entries of more than one type. In particular, according to the present technique, the plurality of prediction entries comprises at least one prediction entry of a first type, wherein the prediction circuitry is enabled to use each prediction entry of the first type to identify a control flow instruction whose associated pointer is within a first subset of the plurality of pointers, and at least one prediction entry of at least one further type, wherein the prediction circuitry is enabled to use each prediction entry of the at least one further type to identify a control flow instruction whose associated pointer is within a further subset of the plurality of pointers that excludes at least one pointer of the first subset. For example, whilst a prediction entry of the first type may be usable for any control flow instruction having an associated pointer within the first subset, a prediction entry of the further type may not be usable for control flow instructions having an associated pointer which is excluded from the further subset of pointers, and therefore may not be usable for certain control flow instructions which could be identified in an entry of the first type. Hence, the prediction entries of the first type and the prediction entries of the further type may differ in the control flow instructions which they can be used to represent.

Prediction entries of the further type cannot be used for any control flow instruction because they can only be used to identify a control flow instruction having an associated pointer in the further subset which excludes at least one pointer of the first subset. This means that circuitry associated with an entry of the further type only needs to allow pointers in the further subset to be used to make a prediction for the entries of the further type. This can mean that selection circuitry associated with the prediction entries of the further type for selecting values from the pointer storage can be reduced, for example. In certain examples discussed below, restricting the pointers which can be associated with certain entries can in some cases mean that pointer values are not needed to be read at all to make a prediction for certain entries, significantly reducing the circuitry which needs to be provided for those entries, and in some cases the prediction entries of the further type do not need to provide a field (or can provide a smaller field) for identifying the associated pointer, which can also reduce the storage requirements of the prediction circuitry. Therefore, for prediction circuitry having a given number of prediction entries, rather than providing prediction circuitry having only entries of the first type, providing some of those prediction entries as entries of the further type can be associated with a reduction in the area and power costs of the prediction circuitry, and can allow improved timing.

The decision to provide more than one type of prediction entry is partially motivated by the observation that certain pointers tend to be associated with a control flow instruction more often than others. If entries of the further type are provided which include the more often used pointers in their further subset of pointers, then these more restrictive entries can still be used for the most common control flow instructions which may be stored in the prediction circuitry. Hence, even if the number of general prediction entries is reduced whilst keeping the total number of entries the same, this is less likely to impact the ability of the prediction circuitry to accommodate control flow instructions because the control flow instructions associated with the most common pointers can still be stored in the further type of entries.

In accordance with some examples of the present technique, the apparatus comprises pointer value routing circuitry arranged to route a pointer value from the pointer storage to the prediction circuitry for making a prediction in respect of a chosen prediction entry. The routing circuitry could, for example, comprise a read port to the pointer storage and selection circuitry to select a particular one of the pointer values stored in the pointer storage. The pointer value routing circuitry may comprise first pointer value routing circuitry arranged to route to the prediction circuitry a pointer value associated with any pointer of the first subset of pointers, the first pointer value routing circuitry being employed when the chosen prediction entry is a prediction entry of the first type. For example, an instance of the first pointer value routing circuitry may be provided for each entry of the first type. The pointer value routing circuitry may also comprise further pointer value routing circuitry arranged to route to the prediction circuitry a pointer value associated with at least one pointer of the further subset of pointers, the further pointer value routing circuitry being employed when the chosen prediction entry is a prediction entry of a given further type. An instance of the further pointer value routing circuitry may be provided for each entry of the at least one further type, although as discussed below some entries of at least one further type may not require any pointer value routing circuitry to be provided at all.

The further pointer value routing circuitry may be simpler than the first pointer value routing circuitry, as it may be unable to route to the prediction circuitry a pointer value which is excluded from the further subset of pointers. Hence, providing entries of the further type to replace entries of the first type can lead to a reduction in area and power overhead associated with circuitry for routing the pointer values from pointer storage to the prediction circuitry.

In some examples, a given entry of the further type may be used to make a prediction based on a pointer value read from the pointer storage for only one associated pointer. This could mean that the entry is only able to be used for control flow instructions associated with one particular pointer, although it is also possible for the entry to be used for more than one type of pointer as long as predictions using a further pointer do not require a pointer value to be read from pointer storage (to be discussed further below). In any case, when only one pointer value can be read for a given prediction entry, then that prediction entry does not need to be provided with selection circuitry for selecting between pointer values of the pointer storage. Instead, the one pointer value can be directly read from the pointer storage and provided to the prediction circuitry for making predictions in respect of said prediction entry. This means that the further pointer value routing circuitry can be made significantly less complex for such entries, further reducing the power and area cost associated with the prediction circuitry.

In some examples, each prediction entry of the first type is arranged to specify the associated pointer. As each entry of the first type may be used for any given control flow instruction having its associated pointer in the first subset of pointers, this means that the associated pointer could be any pointer in the first subset, and therefore the prediction entries of the first type may provide a field identifying which pointer of the first subset of pointers is the associated pointer for the particular control flow instruction identified by that entry.

In some examples, at least one prediction entry of a further type is arranged to identify the associated pointer based on an entry type. In some examples, the prediction entry is arranged to implicitly identify, based on the entry type, the associated pointer. For example, certain entries of a further type may be provided which can only be used for control flow instructions associated with one particular pointer. For these entries, the associated pointer is identified implicitly based on the type of entry without a requirement for the entry to specify the associated pointer. Hence, for these entries the number of bits required in the encoding of the entry can be reduced compared to entries of the first type because the field for specifying the associated pointer can be excluded. Therefore, providing an entry of a further type instead of a particular entry of the first type can lead to a reduction in storage requirements for the prediction circuitry, which can reduce the area cost of the prediction circuitry.

Certain entries of the further type may also be provided which can identify the associated pointer based on a combination of the entry type and some further information specified in the prediction entry. As the selection of pointers which can be associated with the entry of the further type excludes at least one pointer in the first subset, there may be a reduced number of pointers which can be associated with an entry of the further type. This can mean that a reduced number of candidate pointers can be identified based on the type of entry, and then the associated pointer can be specified from amongst the candidate pointers using fewer bits than would be required to specify the pointer from the entire plurality of pointers. For example, a particular entry of a further type may be used for identifying control flow instructions having an associated pointer which is one of two particular pointers. In this case, for example, a single bit could be used to identify which of the two possible pointers (the two candidate pointers being identified based on the entry type) is the pointer associated with the control flow instruction identified by that entry. Again, use of such entries where the type of entry is used to identify the associated pointer can reduce the storage requirements of the prediction circuitry.

As will be apparent from the earlier discussions, a variety of different pointers may be established within the pointer storage, which all have associated different rules used to determine when the values of those pointers get updated in response to increment events. One particular type of pointer that could be used as one of the pointers is a pointer whose value is incremented in response to each increment event (e.g., for every backwards taken branch). Such a pointer may be referred to elsewhere as an IDX0 pointer. The inventors have identified that the IDX0 pointer is a pointer which increments in a manner which particularly often correlates with occurrence of instances of control flow instructions, and is therefore often selected as the associated pointer for control flow instructions. This means that frequently a significant proportion of entries of the prediction circuitry are associated with the IDX0 pointer. This makes the IDX0 pointer a good candidate for being included in a further subset of pointers for an entry of a further type, since providing lower overhead entries of the further type which can identify the IDX0 pointer means that replacement of entries of the first type with entries of the further type is less likely to result in a reduction in the capability of the prediction circuitry to identify the desired control flow instructions.

Therefore, in some examples the at least one prediction entry of the at least one further type comprises a prediction entry of a second type, and the further subset for the prediction entry of the second type comprises an incremented-each-event pointer (IDX0 pointer) for which the pointer value is incremented in response to each increment event.

Another particular type of pointer that could be used as one of the pointers is a pointer whose value never updates in response to any increment events, and hence remains a static value, such a pointer also being referred to herein as a never-updated or IDX1 pointer. The IDX1 pointer is another pointer which the inventors have observed to be commonly selected as the associated pointer for control flow instructions, and therefore is another good candidate for being a pointer which can be identified by an entry of the further type. Therefore, in some examples, the at least one prediction entry of the at least one further type comprises a prediction entry of a third type, and the further subset for the prediction entry of the third type comprises a never-updated pointer for which the pointer value is not updated in response to any of the series of increment events.

When the never-updated pointer is chosen as the associated pointer for a control flow instruction, this means that the predicted behaviour will always be the last observed behaviour. Hence, the behaviour record of a prediction entry associated with the never-updated pointer, such as the behaviour record for a prediction entry of the third type, only needs a single element to hold a single observed behaviour. Therefore, in some examples the behaviour record for a prediction entry of the third type comprises only a single element. As there is only a single element, said single element will always be the selected element. Therefore, for a prediction entry of the third type there is no requirement to use a pointer value from the pointer storage to select the selected element. Therefore, a prediction entry of the third type may exclude pointer value routing circuitry and a field for identifying an associated pointer. As entries of the third type may not access the pointer storage, this can reduce the congestion for reading pointer values from pointer storage, and can therefore allow timing demands to be met more easily for predictions which do depend on pointer values read from the pointer storage. In addition, the field providing the behaviour record for a prediction entry of the third type can be much smaller than a behaviour record for an entry of different type comprising more than one observed behaviour. The combined effect of these factors is that a prediction entry of the third type can have a much lower overhead than entries of the first type, and therefore there are significant area and power advantages associated with using entries of the third type in place of entries of the first type in the prediction circuitry.

In some examples, the prediction entry of the second type can also be used to identify control flow instructions whose associated pointer is the never-updated pointer, in addition to instructions whose associated pointer is the incremented-each-event pointer. This allows entries of the second type to be used for both IDX0 and IDX1 pointers, which can allow the prediction circuitry to handle overflow from prediction entries of the third type (which can be used when the associated pointer is IDX1) without using prediction entries of the first type (allowing entries of the first type to be preferentially used for pointers other than IDX0 and IDX1). To handle being used for both IDX0 and IDX1 pointers, the entries of the second type may be provided with a parameter identifying which pointer is the associated pointer.

When an entry of the second type identifies that the associated pointer is IDX1, the selected element can be selected in different ways. As the selected element is always the same for the IDX1 pointer, then in one method no pointer value may be used at all to select the selected element and the prediction circuitry may be configured to select a predetermined element of the behaviour record (e.g., the first element) as the selected element in response to determining that the associated pointer is IDX1. This would allow entries of the second type to handle IDX1 pointers without increasing the amount of pointer value routing circuitry required (as no pointer value would be read from the pointer storage when the associated pointer is IDX1, meaning that the routing circuitry only needs to be capable of routing the pointer values for IDX0). Alternatively, the pointer routing circuitry associated with the entry of the second type may be configured to select one of the IDX0 or IDX1 pointer values from the pointer storage in dependence on which pointer is the associated pointer, requiring an increase in the amount of pointer value routing circuitry but potentially reducing the amount of logic which is provided for determining which element is the selected element based on the entry type.

In some examples, the first subset of pointers (the set of pointers which can be associated with a prediction entry of the first type) may exclude one or more of the pointers in a further subset (a set of pointers which can be associated with an entry of a further type). However, in other examples, the first subset of the plurality of pointers may include one or more of the pointers in a further subset of the plurality of pointers. For example, the first subset may include all pointers. Including the further subset in the first subset allows prediction entries of the first type to be used for control flow instructions which could also be identified in a prediction entry of a further type, which can be useful as this means that available entries of the first type can accommodate a control flow instruction having an associated pointer in the further subset if there are no available entries of a further type.

In some examples, the apparatus comprises allocation circuitry to allocate a control flow instruction to a given prediction entry of the prediction circuitry. For example, when performance is expected to be improved by making predictions in respect of a particular control flow instruction using a particular associated pointer, then that combination of control flow instruction and associated pointer may be allocated to an entry of the prediction circuitry. For a given control flow instruction having an associated pointer which is within both the first subset and the further subset of pointers, the control flow instruction could be allocated to a selected entry of the first or a further type. In some examples the allocation circuitry is configured to preferentially choose as the selected prediction entry a free prediction entry of the further type. This means that the prediction entries of the first type are used for control flow instructions having an associated pointer of the further subset only when the prediction entries of the further type have been filled up, meaning that the prediction entries of the first type are generally more available to accommodate control flow instructions having an associated pointer which is excluded from the further subset of pointers and cannot be accommodated in a prediction entry of a further type.

The prediction circuitry may comprise a fixed number of prediction entries. Of the fixed number of prediction entries, there may be a fixed number of entries of each type. The number of entries of each type may be selected based on an estimation of the frequency at which particular pointers will be associated with a control flow instruction. For example, if it is estimated that a particular pointer may be associated with a given proportion of control flow instructions stored in the prediction circuitry, then a number of prediction entries of the further type including that particular pointer in the further subset may be selected based on the given proportion.

The prediction circuitry may comprise two or more partitions (which do not need to be contiguous in the prediction circuitry) each for storing a respective type of prediction entry. In some use cases, entries of a particular type may not be used or may be used less than a threshold amount. For example, if control flow instructions do not occur in a particular workload in a way that correlates with the incrementing of a pointer associated with a particular type of prediction entry, then the prediction entries for identifying control flow instructions associated with that particular type of pointer may be unused. For example, in some use cases only IDX0 and/or IDX1 pointers may be used, and therefore there may be no control flow instructions identified in the entries of the first type (assuming no overflow).

In such cases, power overhead can be further reduced using power control circuitry to control a power mode of each partition in response to one or more power trigger events. A power trigger event could include, for example, an indication that a number of valid entries in a given partition is below (or above) a threshold. The power mode could include an active power mode in which entries are maintained in the partition and the prediction circuitry is enabled to use the partition to make a prediction, and an inactive mode in which prediction circuitry is not enabled to use the partition to make a prediction. In the inactive mode, the associated pointer value routing circuitry could be power gated, for example, reducing the power overhead of the unused partitions. The threshold may be selected based on a compromise between the performance impact of disabling a given partition and the power savings associated with doing so. If a given inactive partition is provided using dynamic storage circuitry, then prediction entries in the inactive partition could optionally be refreshed or not refreshed, where not refreshing the inactive entries could further reduce power consumption but could reduce performance on reactivation of the partition.

In accordance with examples of the present technique, the apparatus may also have training circuitry comprising tracker circuitry to maintain a plurality of tracker entries each associated with a control flow instruction, the training circuitry arranged, for a given control flow instruction identified in a given tracker entry, to perform a training process to seek to determine, as the associated pointer for the given control flow instruction, a pointer from amongst the plurality of pointers whose pointer value increments in a manner that meets a correlation threshold with occurrence of instances of the given control flow instruction. Provision of training circuitry enables control flow instructions to be associated with appropriate pointers and therefore used for making accurate predictions for the outcome of given instances of the control flow instruction.

In some examples, the prediction circuitry could comprise the training circuitry, and the tracker entries may also be used as prediction entries. However, it has been found that in many practical systems, it is necessary to be able to provide high prediction bandwidth, for example to be able to make predictions for multiple branch instructions per clock cycle, and it is found that it can be problematic seeking to achieve the required prediction bandwidth using entries which are also used for training.

Therefore, the training circuitry may be separate from the prediction circuitry and the apparatus may also have promotion circuitry responsive to detection of the correlation threshold being met for the given control flow instruction, to allocate a prediction entry within the prediction circuitry to identify the given control flow instruction and the associated pointer, and to establish within the prediction entry the behaviour record. By arranging the apparatus to have both training circuitry and prediction circuitry of the form described above, with promotion circuitry controlling the allocation of control flow instructions into prediction entries of the prediction circuitry once the training process performed by the training circuitry has found suitable associated pointers for those control flow instructions (i.e. pointers whose pointer values increment in a manner that meets the earlier-mentioned correlation threshold), it has been found that this can lead to a particularly power efficient and low area apparatus while still being able to achieve good prediction bandwidth. In particular, since the training circuitry is no longer required to be used to make predictions, and hence is not constrained by the need for high prediction bandwidth, the size of the training circuitry can be reduced. Thus, a high-capacity training circuitry design can be provided in order to enable a desired number of control flow instructions to be tracked, but due to the fact that the training circuitry does not need to meet the performance requirements associated with the desired prediction bandwidth, it is possible to adopt more size efficient topologies for the design of the tracker circuitry making up the training circuitry. For example, it is possible to use a set associative storage structure for the tracker circuitry (for example a two-way set associative cache), which can significantly reduce the size requirements when compared with an equivalent fully associative storage structure (if the tracker circuitry were to be used to make predictions directly, then the prediction bandwidth requirements would likely necessitate that a fully associative or very highly associative cache structure be used in order to meet the performance needs). Hence this can enable the size of the training structure to be reduced when compared with a training structure that was also required to be used to make predictions. Such an approach can also reduce the power consumption requirements of the training circuitry.

In addition, it is also possible to make the prediction circuitry relatively small, since the training circuitry performs a filtering function, and in particular a control flow instruction is only allocated into the prediction circuitry when the training process performed within the training circuitry has identified a suitable associated pointer for that control flow instruction, and in particular has found an associated pointer whose pointer value increments in a manner that meets a given correlation threshold, and hence is likely to be usable to make accurate predictions. The prediction circuitry can hence be configured for high bandwidth, and in particular can be arranged to meet the required prediction bandwidth (i.e. make the required number of predictions per clock cycle).

Overall, such an approach enables a high capacity and high prediction bandwidth apparatus to be produced, with reduced area and power consumption. The training circuitry can be used to track a relatively large number of control flow instructions, and via the training process seek to identify appropriate pointers to associate with those control flow instructions. For those control flow instructions where a suitable pointer has been found that is expected to enable accurate predictions to be made, then those control flow instructions can be promoted into the prediction circuitry, with the prediction circuitry able to provide high prediction throughput performance.

In some examples, the training circuitry comprises cache circuitry to maintain a plurality of cache entries, each cache entry to store a resolved behaviour of an instance of a control flow instruction identified by a tracker entry of the tracker circuitry along with an associated tag value generated in dependence on a chosen pointer when the resolved behaviour was allocated into that cache entry. By such an approach, the cache circuitry is used as a shared cache structure in which to maintain the resolved behaviours of each of the control flow instructions being tracked by the tracker entries of the tracker circuitry, which can lead to a very efficient design when compared with an approach that instead seeks to maintain separate storage structures for each of the tracked control flow instructions into which to store the resolved behaviours of those tracked control flow instructions. In particular, for a given area/size, it is possible using the approach described above to track a larger number of control flow instructions than would be possible were separate storage structures required to be maintained for each of the tracked control flow instructions in order to store their resolved behaviours. Further, the use of the shared cache structure provides enhanced flexibility, as the amount of history (the number of resolved behaviours) that can be maintained for any given tracked control flow instruction can be varied dependent on the total number of control flow instructions being tracked at any point in time.

When a new resolved behaviour is observed for a given control flow instruction allocated into a prediction entry, then an element of the behaviour record may be updated to reflect the new resolved behaviour that has been observed. The element to be updated may be selected based on the pointer associated with the prediction entry. Update circuitry may be provided to perform the update of a prediction entry in response to a resolved behaviour event identifying a resolved behaviour for an observed instance of the given control flow instruction. Update circuitry may also update a confidence value associated with a given prediction entry in response to a resolved behaviour event.

In some examples, the update circuitry is configured to update a prediction entry in different processing cycles following a resolved behaviour event depending on whether that entry is a prediction entry of the first type or a prediction entry of the further type. Prediction entries of the further type may be simpler than prediction entries of the first type (for example, having fewer options for the associated pointer), which can allow quicker identification of the selected element to be updated than if the prediction entry was of the first type. Hence, the update circuitry may be configured to update the prediction entry of a further type in an earlier clock cycle after the resolved behaviour event than it is configured to update a prediction entry of the first type. This can allow timing demands to be met more easily.

Similar considerations apply to the use of a prediction entry for making a prediction in respect of a given instance of a given control flow instruction. Prediction can be performed in different processing cycles depending on whether the prediction entry is an entry of the first type or an entry of the further type as a mitigation of timing demands on the prediction pipeline.

Particular embodiments will now be described with reference to the figures.

FIG. 1 schematically illustrates an example of a data processing apparatus 2. The data processing apparatus 2 has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; a register renaming stage 11 for mapping architectural registers specified by program instructions or micro-operations to physical register specifiers identifying physical registers in a register file 14; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34.

In this example, the memory system includes a level one data cache 30, a level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The processor shown in FIG. 1 is an out-of-order processor where the pipeline 4 includes a number of features supporting out-of-order processing. This includes the issue stage 12 having an issue queue 35 for queuing instructions and issue control circuitry which is able to issue a given instruction for execution if its operands are ready, even if an earlier instruction in program order has not issued yet. Also the writeback stage 18 may include a reorder buffer (ROB) 36 which tracks the execution and the commitment of different instructions in the program order, so that a given instruction can be committed once any earlier instructions in program order have themselves be committed. Also, the register renaming stage 11 helps to support out of order processing by remapping architectural register specifiers specifying the instructions decoded by the decode stage 10 to physical register specifiers identifying physical registers 14 provided in hardware. The instruction encoding may only have space for register specifiers of a certain limited number of bits which may restrict the number of architectural registers supported to a relatively low number such as 16 or 32. This may cause register pressure, where after a certain number of instructions have been processed a later instruction which independent of an earlier instruction which references a particular register needs to reuse that register for storing different data values. In an in-order processor, that later instruction would need to wait until the earlier reference to the same register has completed before it can proceed, but these register dependencies caused by insufficient number of architectural registers can be avoided in an out-of-order processor by remapping the references to the same destination register in different instructions to different physical registers within the register file 14, which may comprise a greater number of physical registers than the number of architectural registers supported in the instruction encoding. This can allow a later instruction which writes to a particular architectural register to be executed while an earlier instruction which writes to the same architectural register is stalled, because those register references are mapped to different physical registers in the register file 14. It will be appreciated that other features may support out of order processing.

As shown in FIG. 1, the apparatus 2 has a number of prediction mechanisms for predicting instruction behaviour for instructions at particular instruction addresses. For example, these prediction mechanisms may include a branch predictor 40 and a load value or load address predictor 50. It is not essential for processors to have both forms of predictor. The load value or load address predictor is provided for predicting data values to be loaded in response to load instructions executed by the load/store unit 28 and/or predicting load addresses from which the data values are to be loaded before the operands for calculating the load addresses have been determined. For example, the load value prediction may record previously seen values loaded from a particular address, and may predict that on subsequent instances of loading from that address the value is expected to be the same. Also, the load address predictor may track history information which records observed stride patterns of address accesses (where the addresses of successive loads differ by a constant offset) and then use that observed stride pattern to predict the address of a future load instructions by continuing to add offsets to the latest seen address at intervals of the detected stride.

Also, the branch predictor 40 may be provided for predicting outcomes of branch instructions, which are instructions which can cause a non-sequential change of program flow. Branches may be performed conditionally, so that they may not always be taken. The branch predictor is looked up based on addresses of instructions provided by the fetch stage 6, and provides a prediction of whether those instruction addresses are predicted to correspond to branch instructions. For any predicted branch instructions, the branch predictor provides a prediction of their branch properties such as a branch type, branch target address and branch direction (branch direction is also known as predicted branch outcome, and indicates whether the branch is predicted to be taken or not taken). The branch predictor 40 includes a branch target buffer (BTB) 43 for predicting properties of the branches other than branch direction, and a branch direction predictor (BDP) 42 for predicting the not taken/taken outcome of a branch (branch direction). It will be appreciated that the branch predictor could also include other prediction structures, such as a call-return stack for predicting return addresses for function calls, a loop direction predictor for predicting when a loop controlling instruction will terminate a loop, or other specialised types of branch prediction structures for predicting behaviour of branches in specific scenarios. The BTB 43 may have any known BTB design and will not be described in detail here. In general the BTB may act as a cache correlating particular instruction addresses with sets of one or more branch properties such as branch type or the branch target address (the address predicted to be executed next after the branch if the branch is taken), and may also provide a prediction of whether a given instruction address is expected to correspond to a branch at all.

The branch direction predictor 42 may be based on a variety of (or even multiple) different prediction techniques, e.g. a TAGE predictor and/or a perceptron predictor, which includes prediction tables which track prediction state used to determine whether, if a given instruction address is expected to correspond to a block of instructions including a branch, whether that branch is predicted to be taken or not taken. The BDP 42 may base its prediction on local history records tracked in local history storage circuitry 44. In the present techniques, one of the prediction techniques that is used is a replay predictor in which the previous execution of an instruction that is subsequently rewound can be used as a basis for predicting the outcome of its re-execution.

The apparatus 2 may have branch prediction state updating circuitry and misprediction recovery circuitry 46, which updates state information within the branch predictor 40 based on observed instruction behaviour seen at the execute stage 16 for branch instructions executed by the branch unit 24. When the branch instruction is executed and the observed behaviour for the branch matches the prediction made by the branch predictor 40 (both in terms of whether the branch is taken or not and in terms of other properties such as branch target address) then the branch prediction state updating circuitry 46 may update prediction state within the BDP 42 or the BTB 43 to reinforce the prediction that was made so as to make it more confident in that prediction when that address is seen again later. Alternatively, if there was no previous prediction state information available for a given branch then when that branch is executed at the execute stage 16, its actual outcome is used to update the prediction state information. Similarly, the local history storage 44 may be updated based on an observed branch outcome for a given branch. On the other hand, if a misprediction is identified when the actual branch outcome 24 differs from the predicted branch outcome in some respect, then the misprediction recovery portion of the state updating/misprediction recovery circuitry 46 may control updating of state within the branch predictor 40 to correct the prediction state so that it is more likely that the prediction will be correct in future. In some cases, a confidence counter-based mechanism may be used so that one incorrect prediction does not necessarily overwrite the prediction state which has previously been used to generate a series of correct predictions, but multiple mispredictions for a given instruction address will eventually cause the prediction state to be updated so that the outcome actually being seen at the execute stage 60 is predicted in future. As well as updating the state information within the branch predictor 40, on a misprediction, the misprediction recovery circuitry may also cause instructions to be flushed from the pipeline 4 which are associated with instruction addresses beyond the address for which the misprediction was identified, and cause the fetch stage 6 to start refetching instructions from the point of the misprediction.

Selecting entries of the BDP 42 based on instruction address alone may not give accurate predictions in all cases, because it is possible that the same instruction address could be reached by different paths of program flow depending on outcomes of previous instructions, and depending on the path taken to reach the current instruction, this may lead to different actual instruction behaviour for the same instruction address.

One solution to this is to select predictions based on history information which tracks a sequence of previously seen instruction behaviour. Global history can be used as the branch history format. In particular, a sequence of taken and not taken outcomes for a series of branches can be tracked. The outcome of other branch instructions can then be correlated with the current branch history over time, in order to enable future predictions to be made.

A downside to this approach is that the same global history might be seen for multiple branch instructions. For instance, the sequence NNTTTNNT (assuming a global history of 8 branch instructions is considered) might be encountered for two branch instructions at completely different addresses. In this situation, it is unlikely that there would be any correlation between the outcome of the two distant branch instructions even though the global history technically matches.

Another possibility might be to use local history, which involves correlating the outcome of a branch instruction to the global history seen at that branch instruction (i.e., the history local to that branch instruction). This solution can work well. However, it can require maintaining a large amount of data for each branch instruction. For instance, since each branch instruction might be encountered with different frequencies and along different paths, it may be necessary to track the history multiple times—once for each branch instruction. A further difficulty with using local history is that in many cases, the local history might not be relevant. For instance, consider the situation illustrated in FIG. 2. Here, branch A acts as a guard for branch B. In other words, branch B is only encountered dependent on the outcome of branch A. The outcome of branch A forms part of the local history of branch B. However, this information is irrelevant because the entry in the local history for branch A will always be the same value.

Separately to this, it is also desirable to enable replay prediction. In a speculative out-of-order processor, instructions can be executed in an order other than how they appear in the program itself in order to improve overall efficiency of execution. In such situations, some later branch instructions might resolve while the result of an earlier branch instruction is waiting for resolution. For instance, in the example of FIG. 3, the short latency hard to predict condition might be expected to resolve before the long latency hard to predict condition is resolved. Under normal circumstances, if the long latency instruction was mispredicted then a 'rewind' occurs that causes the program to revert to the state that it was in at the time the long latency instruction was executed. This is done in order to prevent the wrong execution path being taken. However, as a consequence of this, the prediction and outcome data generated for the short latency instruction is lost. In practice, however, since execution of the short latency instruction is not dependent on the long latency instruction, the previous execution of that instruction is likely to be a very good guide as to how the instruction will execute when it is reexecuted. Hence, it would be beneficial for the result of executing the short latency instruction to be kept (despite the rewind) in order to be available for a future 'replay prediction'. Note, however, that history-based predictors may not be able to help with such replays. This is because the history taken to get to the short latency instruction will be different between the two executions due to the misprediction. In particular, the long latency instruction is taken in one execution and not taken in the other. With differing history information, it is difficult if not impossible to form a prediction of the short latency instruction.

In accordance with the techniques described herein, a mechanism is used that makes it possible to index previous behaviours of a branch instruction according to indexes of FOR loops within the program. Each instance of a given instruction can therefore be individually recognised (a branch instruction that occurs outside a FOR loop simply has an index of 0). If the same iteration/index is encountered again in the future (e.g. due to a replay that occurs after a rewind due to a misprediction event) then the previous behaviour of that branch instruction for that iteration/index can be used as the prediction for the direction in which the branch instruction will go.

An example of this is illustrated in FIGS. 4A and 4B. FIG. 4A shows an example in which a FOR loop contains a long latency branch instruction and a short latency branch instruction. In this example, it is assumed that a misprediction occurs with the second iteration (i=1) of the long latency instruction. That is to say that a prediction is made for one direction and on resolution it is determined that the prediction was incorrect. However, because the long latency instruction is followed by a short latency instruction and because these can be performed out of order, the situation arises in which several further executions of later iterations of the short latency instruction are made before the second iteration of the long latency instruction is resolved thereby revealing the misprediction and resulting in a rewind. In these situations, it would be desirable to store the results of those executions to form the basis of future predictions.

FIG. 4B shows the storage of the data. As described earlier, the indexing is carried out based on the index of the FOR loop. Due to the difference in latencies, more (4) executions of the short latency instruction are made as compared to the long latency instruction (2). When the rewind occurs, the program returns to the second iteration (i=1) of the loop and the long latency instruction is taken (rather than not taken, which was the incorrect prediction). However, the executions performed for the third and fourth iterations (i=3 and i=4) of the short latency instruction remain stored. Then, when the third and fourth iterations are reached for the second time, the previous executions of those iterations can form the basis of predictions for the short latency branch instruction.

A difficulty with this approach is aligning the indexing of the branch behaviour with the index of the FOR loop. In particular, at the time of instruction execution there may be nothing to distinguish a FOR loop from any other branch instruction. Even then, it may not be immediately obvious how to determine which variable (e.g., which value in which register) is used as the index for the FOR loop. One approach to solving this problem is to count backwards taken branches (i.e., instructions where the value of the program counter has decreased as compared to its previous value) and to use this as the index. A loop such as a FOR loop will contain a backwards taken branch at the end of the main body. By keeping a running count of such branches through execution of the program, it is possible to unique identify each instance of each instruction.

However, even this approach is not without difficulty. In particular, such a pointer can become polluted. For example, consider the situation shown in FIG. 5. Here, an outer FOR loop is present, which contains an inner FOR loop, whose index is hard to predict. Indeed, the iteration count might always be different (or could even be random). By the time branch A is reached, the backwards taken branch pointer could point to a variety of locations. Consequently, the index at which the behaviour of branch A is stored may have no relation to the index of the outer FOR loop. This therefore makes any replay impractical since it is very difficult to determine the previous behavioural execution of branch A for a given iteration of the outer FOR loop.

In accordance with the techniques described herein, this problem is alleviated by providing a plurality of pointers. Not every pointer is updated at every backwards taken branch instruction. In some cases, some pointers could be updated with every backwards taken branch instruction. Other pointers could be updated only every M backwards taken branch instructions. Some backwards taken branch instructions might update multiple (or even all) pointers. By maintaining a number of pointers, each of which is updated differently, it is expected that one of the pointers will be incremented in correspondence with the FOR loop index.

Figure 6:
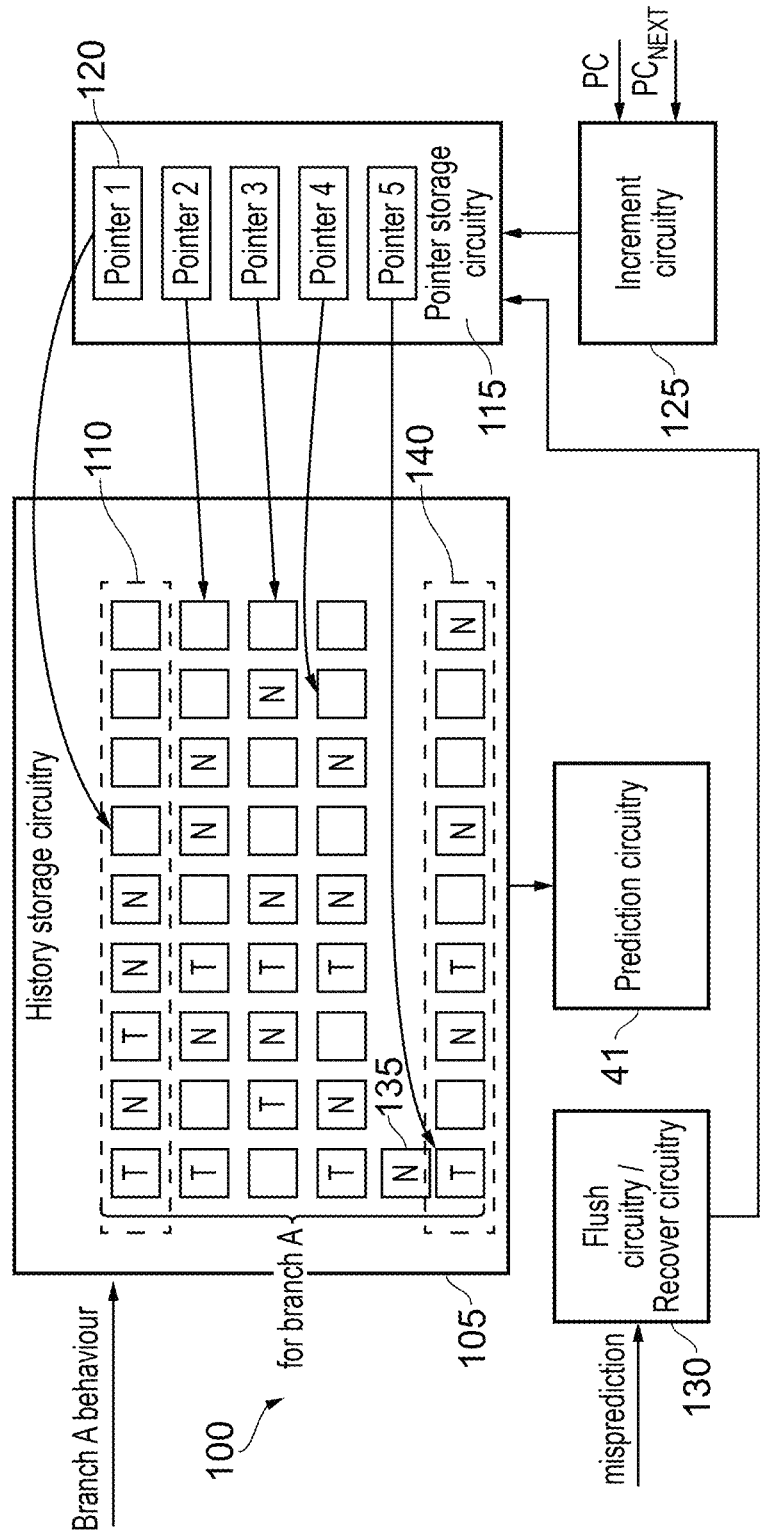
FIG. 6 schematically illustrates an example of a data processing apparatus.

FIG. 6 illustrates an example of a data processing apparatus 100 in accordance with some examples. The data processing apparatus 100 includes history storage circuitry 105. This stores six sets 110 of behaviours of instances of a control flow instruction that are usable to predict the behaviour of that control flow instruction (branch A) during a replay situation. It will be appreciated that multiple pluralities of sets may be provided—each for a different control flow instruction. Pointer storage circuitry 115 is provided that stores a plurality of pointers 120, with each of the pointers 120 being associated with one of the sets 110 of behaviours. The pointer is used to index entries into the sets. That is, each pointer indicates where a next entry into the associated set should be stored. In this example, the actual behaviours are the same, but the set of behaviours differs due to the indexing. In this example, the behaviours are (in order) TNTNN. However, the sets differ because in some instances, there are gaps between some of the behaviours. The differences in the behaviours arise due to differences in how the pointers 120 in the pointer storage circuitry 115 are updated by the increment circuitry 125. In particular, the increment circuitry receives a current program counter value (PC) and the program counter value of a next instruction ($PC_{NEXT}$). If $PC_{NEXT}$ is less than or equal to PC, then the current instruction is a backwards taken branch and one or more of the pointers are updated.

Two special sets 135, 140 may be stored for each control flow instruction. The first of these sets 135 tracks only the most recent prediction that has been made for the control flow instruction. The second set 140 has its pointer incremented for all backwards taken control flow instructions.

Prediction circuitry 41 is provided to make a prediction of the future behaviour of the control flow instruction (e.g. branch A) based on one of the sets. It is hoped that the set that would be selected is one that corresponds with the FOR loop. A training process can be performed to determine which set of behaviours to use. With one of the set having been selected, the corresponding pointer is used to index into that set. If a previous behaviour is stored then this can be used to form the basis of the prediction for the control flow instruction. Otherwise, more common prediction techniques can be used. That is, if one set 110 has been selected and if the corresponding pointer 120 currently refers to index '3' then it is determined whether the set 110 has an entry at index 3. If so, then a previous execution of the branch A at this iteration has occurred and the behaviour (T) can be used to predict how branch A will perform again (e.g. it will be taken). If the entry is empty then no previous behaviour has been recorded for the current iteration and so no prediction is made in this way. Other prediction techniques can be used instead.

Finally in FIG. 6, flush circuitry and recover circuitry 130 (which are shown as a single device) are provided. In response to a misprediction on a control flow instruction, this causes a flush of the pipeline to occur. As part of this process, the values of the pointers 120 are reset to a value that they had at the time of the mispredicted instruction being issued. However, the contents of the history storage circuitry 105 are not touched as a consequence of the flush. That is the flush itself does not count as a backwards taken branch instruction and the behaviours of the instructions that follow the mispredicted instruction are not erased from the history storage circuitry 105 and thus can be used to form the basis of a later prediction.

Figure 7:
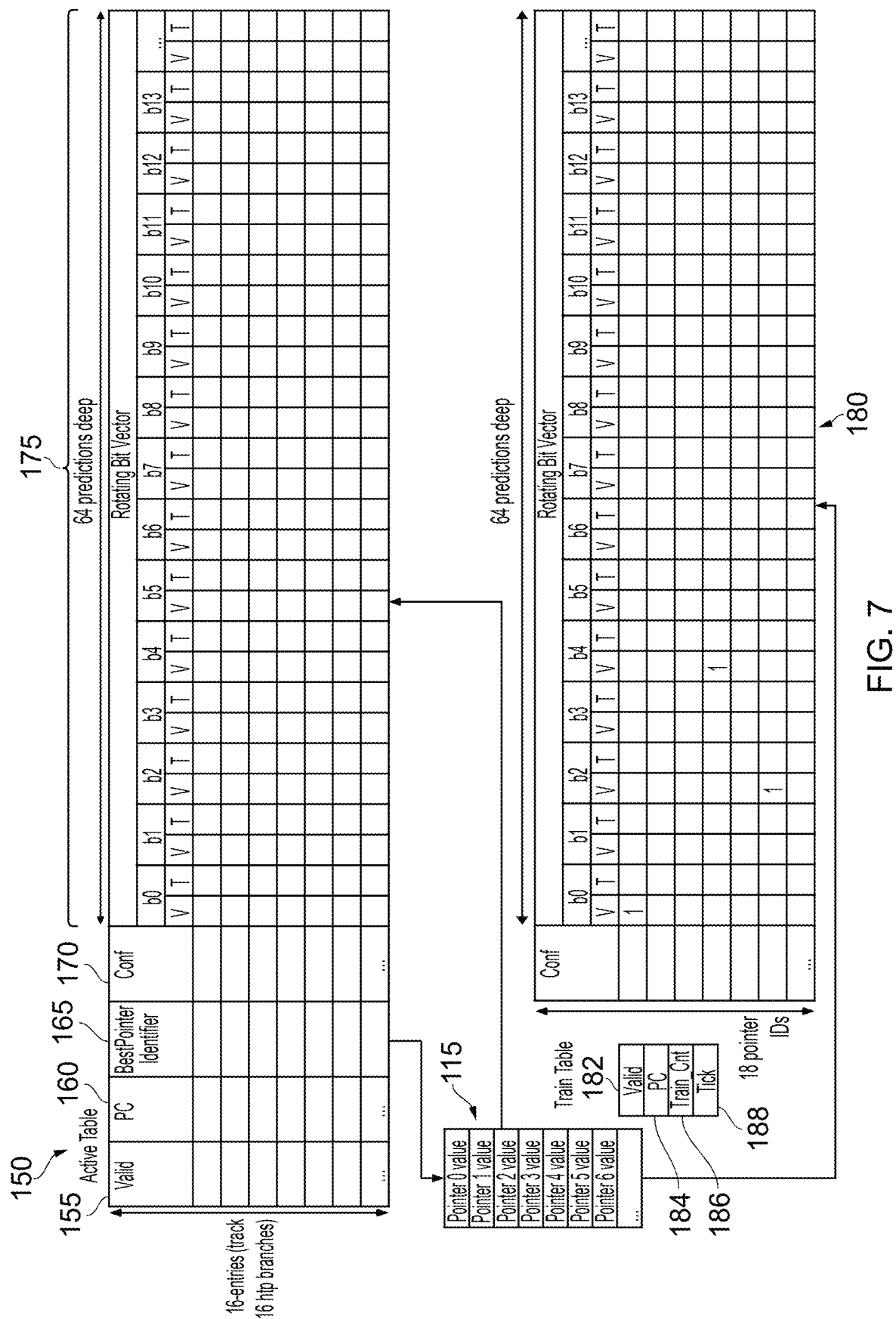
FIG. 7 schematically illustrates how training could be performed to determine pointers to associate with hard to predict (HTP) branch instructions being tracked.

One mechanism that could be used to seek to perform training within the apparatus of FIG. 6, in order to decide which pointer to use for any given control flow instruction being tracked within the history storage 105, is schematically illustrated in FIG. 7. In this example, a separate active table 150 and train table 180 is provided. The active table 150 includes a plurality of entries, where each entry is used for one HTP branch for which it is desired to make predictions. Each entry includes a valid field 155 to identify whether the entry is valid, a program counter field 160 to identify an address of the HTP branch instruction being tracked in that entry, a best pointer identifier field 165 to identify the pointer that is considered to be the best pointer for the HTP branch instruction being tracked, and a confidence indication 170 used to determine when there is sufficient confidence in the contents of the entry to enable predictions to be made using that entry. A rotating bit vector 175 is then maintained in each entry, in which to maintain the set of behaviours discussed earlier with reference to FIG. 6, populated using the pointer identified by the best pointer identifier field 165. As shown in FIG. 7, each entry in the bit vector is used to identify a taken or not taken prediction, and has a valid bit to identify whether a valid taken or not taken prediction has been stored in that entry.

The train table 180 enables, at any point in time, training to be performed for one hard to predict branch instruction being tracked in the active table. The valid field 182 is used to indicate when the contents of the train table are valid, the PC field 184 is used to identify the address of the HTP branch instruction being trained, and the train count field 186 is used to keep track of the number of training events that have taken place when training that HTP branch instruction. Separate entries in the train table are provided in order to maintain a rotating bit vector for each of the possible pointers stored in the pointer storage circuitry 115. In this particular example, it is assumed that there are 18 pointers, and hence 18 entries are provided. The rotating bit vectors take the same form as discussed earlier for the rotating bit vector 175 within the active table.

Whenever a resolved behaviour of the branch instruction for which training is being performed is received, an update process is performed for each of the entries of the train table 180 using, for each entry, the current value of the associated pointer, and if a bit vector entry pointed to by the pointer value is valid, and has a taken/not taken prediction that matches the resolved behaviour, then the confidence of that entry can be increased. Similarly, if the taken/not taken prediction does not match the resolved behaviour, then the confidence can be decreased. If there is not yet a valid bit vector entry, then that bit vector entry can be populated using the resolved behaviour. A similar update process can be performed within the active table 155 for each resolved behaviour received, and when the confidence indication indicated by the confidence indication field 170 reaches a threshold level, predictions can start to be made using the contents of the bit vector 175 for the entry containing the hard to predict branch in question.

Once a certain number of confidence updates (as indicated by the train count 186) have been made to an entry in the train table 180 for any of the pointers, then it can be determined whether the pointer having the highest confidence in the train table exceeds the confidence 170 of the current best pointer identified in the field 165 of the active table, and if so the best pointer identifier 165 and confidence indication 170 can be updated to identify the trained pointer having the highest confidence. At this point, the associated rotating bit vector 175 can also be updated to reflect the contents of the corresponding entry in the train table.

In the example illustrated in FIG. 7, a tick field 188 is provided, which can be used as a timeout in case a period of time elapses without any further training event been detected, so as to cause the current contents of the train table to be evaluated, the relevant entry in the active table to be updated if necessary, and then training to be performed for a different one of the hard to predict branch instructions being tracked in the active table.

Whilst this process can enable training to be performed for each of the hard to predict branch instructions being tracked, it suffers from a number of issues. Firstly, training can only be performed for one hard to predict branch at a time, and as a result the time taken to identify the best pointers to use for the various branch instructions being tracked can be unacceptably high. Also there are large periods of time where any given one of the branch instructions being tracked is not being trained, and hence the training may not be as accurate as desired. These problems are exacerbated if it is desired to increase the number of branch instructions being tracked.

Furthermore, in addition to the above disadvantages, if the size of the active table is increased to seek to track more hard to predict branches, then this leads to significant size/area requirements, due to the need for dedicated storage to store each of the rotating bit vectors for each of the entries.

Figure 8:
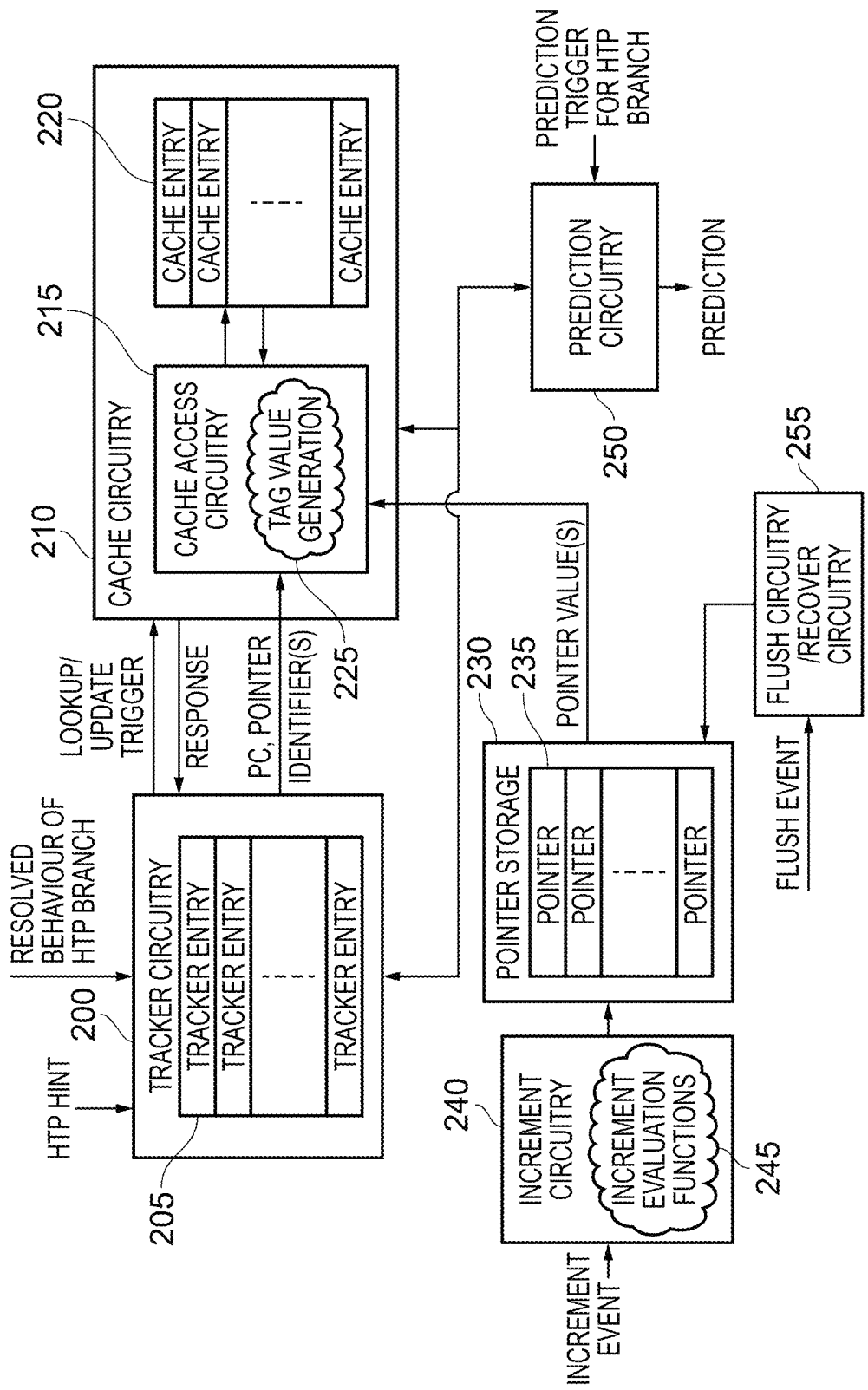
FIG. 8 schematically illustrates an example of a data processing apparatus in accordance with one example implementation.

In accordance with the techniques described herein, a mechanism is provided that seeks to alleviate the above issues, allowing a larger number of hard to predict branch instructions to be tracked in a cost/area efficient manner, and which improves the manner in which training is performed for the various hard to predict branches being tracked. An example of an apparatus in accordance with one example implementation is illustrated schematically in FIG. 8. As shown in FIG. 8, tracker circuitry 200 is provided that maintains a number of tracker entries 205. Each tracker entry can be used to identify an HTP branch instruction, a current active pointer to be associated with that instruction, and a current training pointer to be associated with that instruction. Confidence indications can also be maintained in the tracker entry for each of the active pointer and the training pointer. There are various ways in which it can be decided when to allocate any given branch instruction to an entry of the tracker circuitry 200, but in one example implementation a hard to predict hint may be provided to the tracker circuitry, for example to identify a branch instruction for which reliable prediction is not being achieved using a default prediction mechanism, for example the earlier discussed TAGE predictor.

Pointer storage 230 is provided that maintains a plurality of pointers 235, in much the same way as the earlier described pointer storage circuitry 115. However, instead of seeking to maintain bit vectors of resolved behaviours within the various tracker entries, cache circuitry 210 is provided that has a plurality of cache entries 220, where each cache entry is arranged to store a resolved behaviour of an instance of an HTP branch instruction being tracked by any of the tracker entries along with an associated tag value generated when the resolved behaviour was allocated into that cache entry. Cache access circuitry 215 is provided for maintaining the contents of the various cache entries 220, and for performing lookup operations within those cache entries as and when required. The cache access circuitry 215 includes tag value generation circuitry 225 that generates the associated tag values to be stored in association with resolved behaviours when those resolved behaviours are allocated into cache entries, and also to produce comparison tag values used when performing lookup operations.

Whenever a lookup operation needs to be performed (as for example may be the case when a resolved behaviour of an HTP branch instruction being tracked by the tracker circuitry 200 is observed, this resulting in the issuance of a lookup/update trigger to the cache circuitry 210 from the tracker circuitry 200), the cache access circuitry 215 will receive an identifier of the HTP branch instruction for which a lookup operation is required, in one example this being achieved by providing the program counter value of that HTP branch instruction from the tracker circuitry 200 to the cache access circuitry 215, and will also receive an identifier of the relevant pointer to be used when performing the lookup operation. This may be either the active pointer or the training pointer identified in the corresponding tracker entry, depending on the lookup required, and indeed in one example implementation it will typically be the case that two lookup operations will be performed, one using the active pointer and one using the training pointer. The tag value generation circuitry can then combine the received information, in combination with the pointer value of the relevant pointer as obtained from the pointer storage 230, in order to generate a tag value to be used during the lookup operation, as will be discussed in more detail later.

Depending on the outcome of such lookup operations, the contents of the various tracker entries may be updated, for instance to increment or decrement pointer confidence indications maintained for the active pointer and/or the training pointer. In addition, a training counter value may be maintained within each tracker entry, which can be incremented when a training event is determined to have occurred, in one example such a training event being determined to have occurred when either one or both of the active pointer confidence and the training pointer confidence for a given entry are updated. As will be discussed in more detail, when the training count has reached a threshold level, it can be determined whether the current training pointer is performing better than the current active pointer, and if so that training pointer can be identified as the new active pointer. Also at that point, a new training pointer can be chosen for the entry, and the training process reinitiated for that new training pointer.

By using a shared cache storage to maintain the resolved behaviours in, which is accessed in the way discussed above, this can significantly reduce the storage requirements for each individual HTP branch to be tracked, and hence can allow a significantly larger number of HTP branches to be tracked for any given area/cost provided for implementing such replay prediction. In one particular example implementation, the tracker circuitry may be arranged to maintain 256 tracker entries.

Increment circuitry 240 is provided that is responsive to increment events to apply a series of increment evaluation functions 245 to decide which pointers to increment in response to any given increment event. In one example implementation, the increment events take the form of detected backwards taken branches, such that each time a backwards taken branch is detected the increment circuitry 240 is arranged to perform the increment evaluation functions 245 in order to decide which pointers within the pointer storage 230 to increment. As discussed earlier, the evaluation functions can take a variety of different forms, but the aim is that over time the various pointers are incremented differentially with respect to each other. By way of specific example, and as noted earlier, a first pointer could have its value incremented for every backwards taken branch irrespective of the program counter value, a second pointer could be arranged never to be incremented irrespective of the program counter value, a third pointer could be incremented if a hash of all of the program counter bits is 1, a fourth pointer could be incremented if the hash of all the program counter bits is 0, etc.

When considering the above specific examples of pointers, it should be noted that the approach described in FIG. 8 where a shared cache structure is used, in addition to all the other benefits described herein, also provides a further efficiency benefit when compared with the approach shown in FIG. 7. In particular, the second pointer (i.e. the one that is never incremented irrespective of the program counter value) essentially corresponds to a last prediction direction tracker. However, the replay predictor would perform better if it used this pointer only when reusing the prediction for the same instance of a hard to predict branch from the wrong path to the new path, and not for subsequent instances of that hard to predict branch. Using the rotating buffer approach of FIG. 7, the last prediction is never cleared, so subsequent instances of that branch may use that prediction. However, when that prediction is allocated into the cache structure in the manner described herein, it will be evicted from that cache by predictions made by other branches and pointers. This ages out the prediction based on the second pointer, preventing it from being used on subsequent instances of the hard to predict branch.

Returning to FIG. 8, prediction circuitry 250 is provided that, in response to a prediction trigger in respect of a HTP branch instruction being tracked by the tracker circuitry 200, is arranged to reference the contents of the tracker circuitry 200 and the cache circuitry 210 in order to determine whether a prediction can be made of the behaviour (in this case the behaviour being whether the branch is predicted as taken or not taken) for the HTP branch instruction in question. In particular, if a lookup performed within the cache circuitry 210 using the program counter value of the HTP branch instruction, the currently active pointer and the value of that currently active pointer, results in a hit been detected, and the confidence in the currently active pointer has reached at least a threshold level, then the prediction circuitry may make a prediction using the behaviour stored in the hit entry of the cache.

As also shown in FIG. 8, flush circuitry/recover circuitry 255 can be provided to operate in much the same way as the circuitry 130 shown in FIG. 6, in response to a flush event. In one example implementation, such a flush event will occur when a misprediction is detected that causes the contents of the pipeline to be flushed and processing to resume from a previous position in the execution flow. As noted previously, the flush circuitry can be arranged to maintain the contents of the tracker circuitry and the cache circuitry during such a flush operation, and the recover circuitry can recover the relevant previous pointer values for the various pointers in response to the flush.

Figure 9:
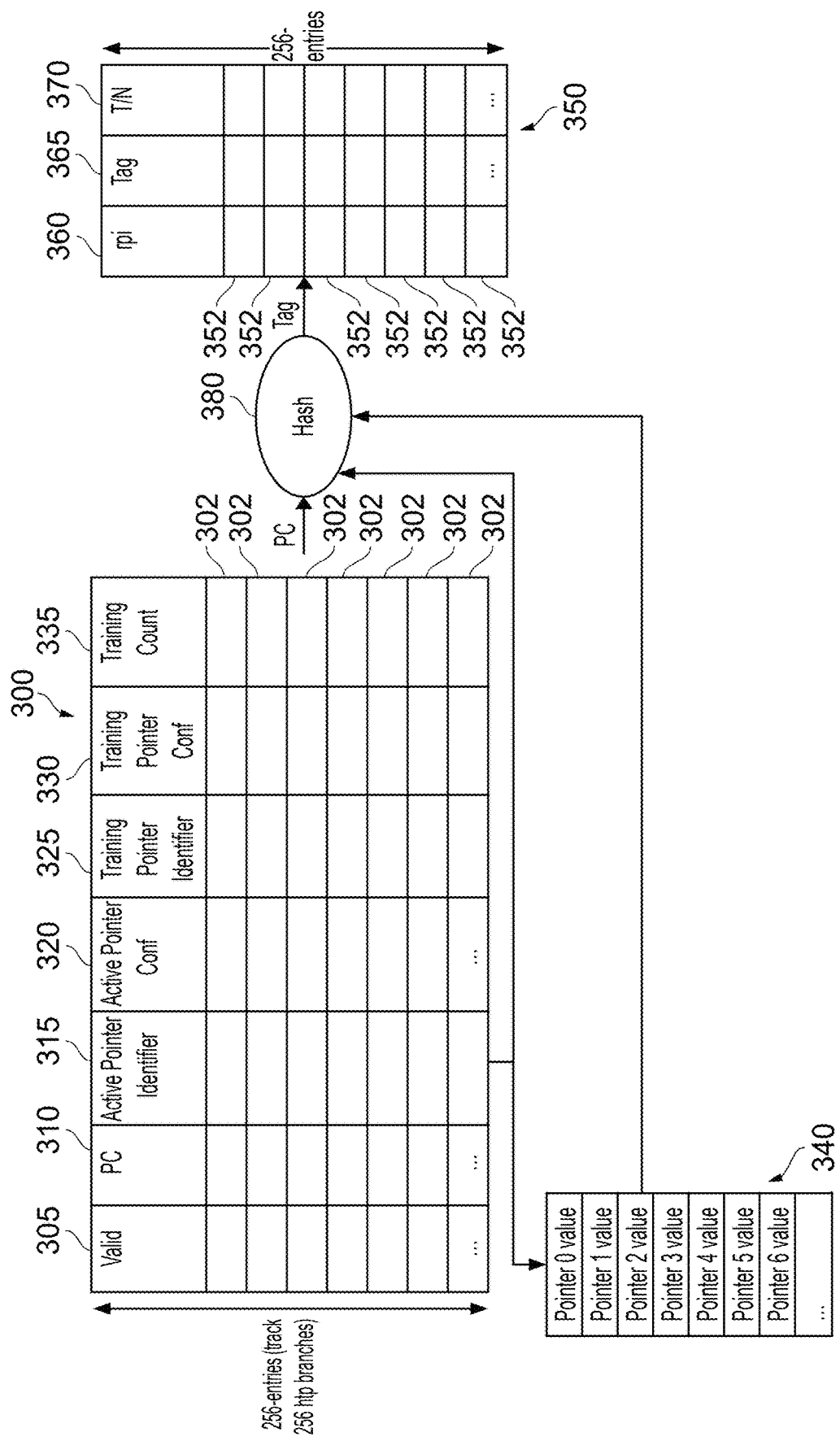
FIG. 9 illustrates how tag values may be generated in accordance with one example implementation when seeking to access the cache illustrated in FIG. 8.

FIG. 9 illustrates in more detail the contents of the tracker entries and cache entries, and the way in which tag values are generated, in accordance with one example implementation. In this example, the tracker circuitry contains tracker storage 300 providing a plurality of tracker entries 302. As shown, each tracker entry has a plurality of fields. A valid field 305 is used to identify whether the contents of the corresponding entry are valid, whilst the program counter field 310 is used to store the program counter value of the HTP branch instruction being tracked in that entry. An active pointer identifier 315 identifies one of the plurality of pointers in the pointer storage that is currently viewed to be the active pointer for the entry in question, and the associated active pointer confidence field 320 identifies a confidence indication for that active pointer. Similarly, the field 325 identifies a training pointer, again this being chosen from amongst the pointers maintained in the pointer storage 230, whilst the associated training pointer confidence field 330 provides a confidence indication for the training pointer. The training count field 335 is used to maintain a count of training events that have occurred in respect of the corresponding entry, so that when a certain threshold is reached an evaluation can be performed to determine whether the training pointer is performing better than the active pointer.

As shown in FIG. 9, the cache circuitry 210 may maintain a cache storage 350 containing a plurality of cache entries 352. Each cache entry can be used to store a tag value 365 generated by the tag value generation circuitry 225 when that cache entry was populated, and can also store an associated resolved behaviour in the field 370, in this case the taken/not taken behaviour. As also shown in FIG. 9, if desired, a field 360 can be used to store replacement policy information (rpi) referenced by the cache circuitry when selecting a victim cache entry whose current contents are to be overwritten to make space for allocation of new content.

The tag value generation circuitry 225 can take a variety of forms, but in the example of FIG. 9 implements a hash function 380 using as inputs the program counter value of the HTP branch instruction in question, the active pointer identifier associated with that HTP branch instruction in the relevant tracker entry, and the current pointer value of that active pointer as obtained from the pointer storage 340 (this corresponding to the pointer storage 230 shown in FIG. 8). By performing a hash operation using these three pieces of information, it will be appreciated that the tag value generated will be dependent on the current active pointer, and the value of that active pointer at the time the tag value is generated.

The cache storage 350 can be organised in a variety of ways, and hence for example could take the form of a fully associative cache or a set associative cache. In one particular example implementation it is assumed that the cache storage is a fully associative cache, and accordingly all entries are referenced when performing a lookup operation, as any given content can be allocated in any available entry within the cache.

Figure 10:
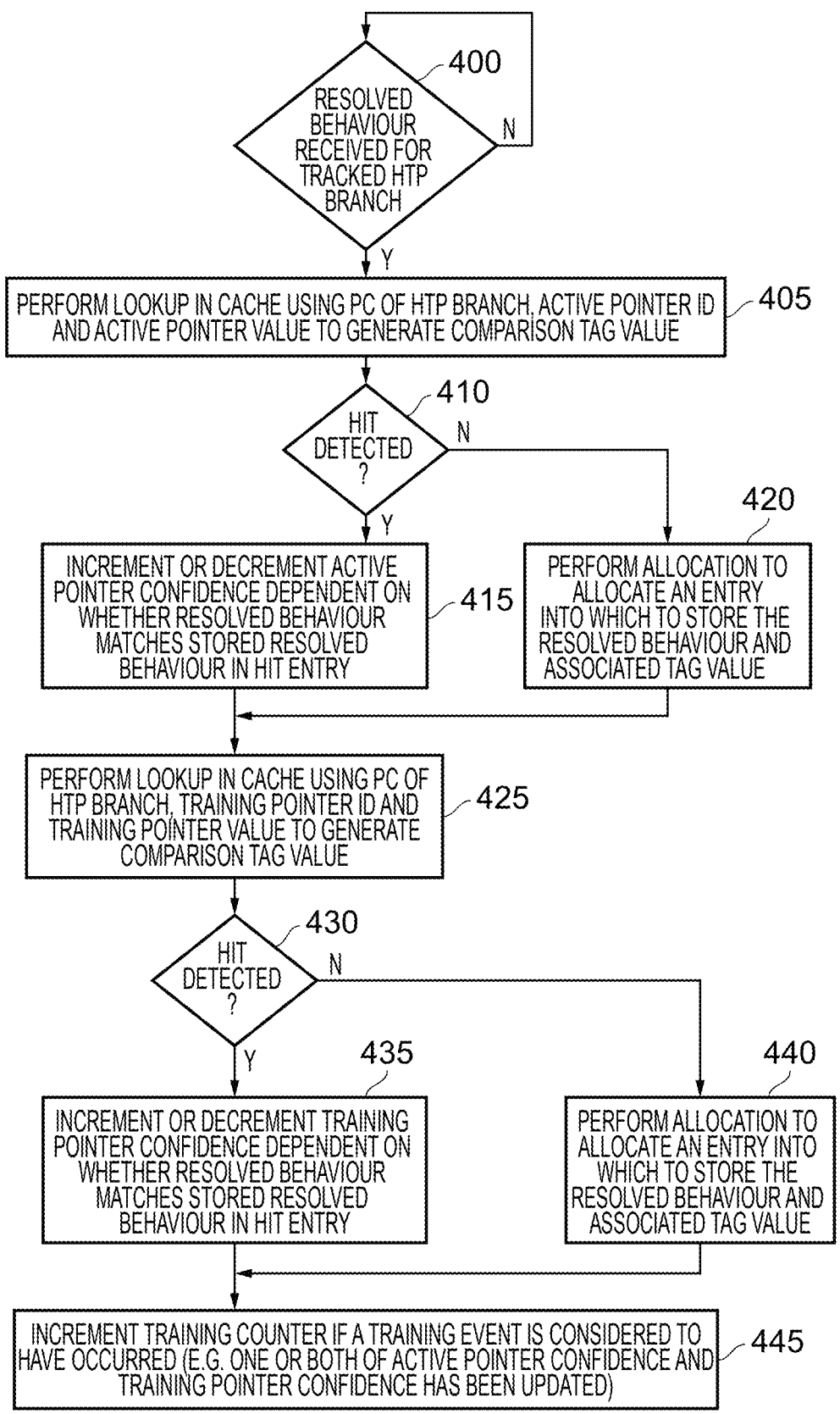
FIG. 10 is a flow diagram illustrating steps performed by the apparatus of FIG. 8 upon receiving an indication of resolved behaviour for a tracked HTP branch instruction, in accordance with one example implementation.

FIG. 10 is a flow diagram illustrating steps performed by the apparatus of FIG. 8 when a resolved behaviour is received for an HTP branch instruction being tracked within the tracker circuitry 200. When such a resolved behaviour is detected at step 400, then at step 405 a lookup is performed in the cache of the cache circuitry 210 using a comparison tag value that is generated using the program counter value of the HTP branch instruction in question, the active pointer identifier for that HTP branch as identified by the tracker entry, and the pointer value of that active pointer.

It is then determined at step 410 whether a hit has been detected in one of the cache entries (i.e. whether the comparison tag value matches the stored tag value in that entry), and if so the process proceeds to step 415 where the active pointer confidence in the relevant tracker entry may be incremented or decremented dependent on whether the resolved behaviour matches the stored resolved behaviour in the hit entry. For example, in one particular implementation the active pointer confidence is incremented if the resolved behaviour matches the stored resolved behaviour, and is otherwise decremented. However, if desired, this increment/decrement functionality can be made dependent on other criteria. For example, it may be determined in one example implementation to inhibit update of the confidence indication if the predicted behaviour stored in the hit entry matches the prediction that would have been made using a default prediction mechanism, such as the earlier described TAGE predictor.

If a hit is not detected at step 410, then in one example implementation an allocation is performed within the cache, in order to allocate an entry into which to store the resolved behaviour and the associated tag value. The earlier discussed replacement policy information can be referenced by the cache circuitry when determining a victim entry into which to allocate this new information. In one example implementation, when performing such an allocation, no update is made to the active confidence indication being maintained in the relevant tracker entry.

As also shown in FIG. 10, in addition to performing a lookup using the active pointer, a lookup is also performed using the training pointer. Hence, at step 425, a comparison tag value is generated using the program counter of the HTP branch instruction, the training pointer identifier stored in the relevant tracker entry, and the current pointer value of that training pointer, and a lookup is performed in the cache using that comparison tag value. At step 430 it is determined whether a hit has been detected, and if so then at step 435 the training pointer confidence may be incremented or decremented dependent on whether the resolved behaviour matches the stored resolved behaviour in the hit entry, in much the same way as the active pointer confidence is incremented or decremented as discussed earlier with reference to step 415.

Again, this functionality can be inhibited in certain situations if desired, for example if the predicted behaviour stored in the hit entry matches the prediction that would be made by a default prediction mechanism. Further, in one example implementation, if only one of the two lookup operations performed at steps 405 and 425 results in the associated confidence indication needing to be incremented, and that associated confidence indication is already at a saturated level, then instead the other confidence indication can be decremented (so by way of specific example, if it was determined that the active pointer confidence needed incrementing but the training pointer confidence did not, and the active pointer confidence was already at a saturated level, it may be determined instead to decrement the training pointer confidence).

If a miss is detected at step 430, then at step 440 an entry can be allocated into which to store the resolved behaviour and the associated tag value, in much the same way as an allocation may be performed as discussed earlier at step 420 when performing the lookup using the active pointer.

Irrespective of which of steps 435 or 440 are performed, at step 445 the training counter is incremented if a training event is considered to have occurred. In one example implementation, such a training event will be considered to have occurred if one or both of the active pointer confidence and the training pointer confidence has been updated as a result of the process described with reference to FIG. 10.

Figure 11:
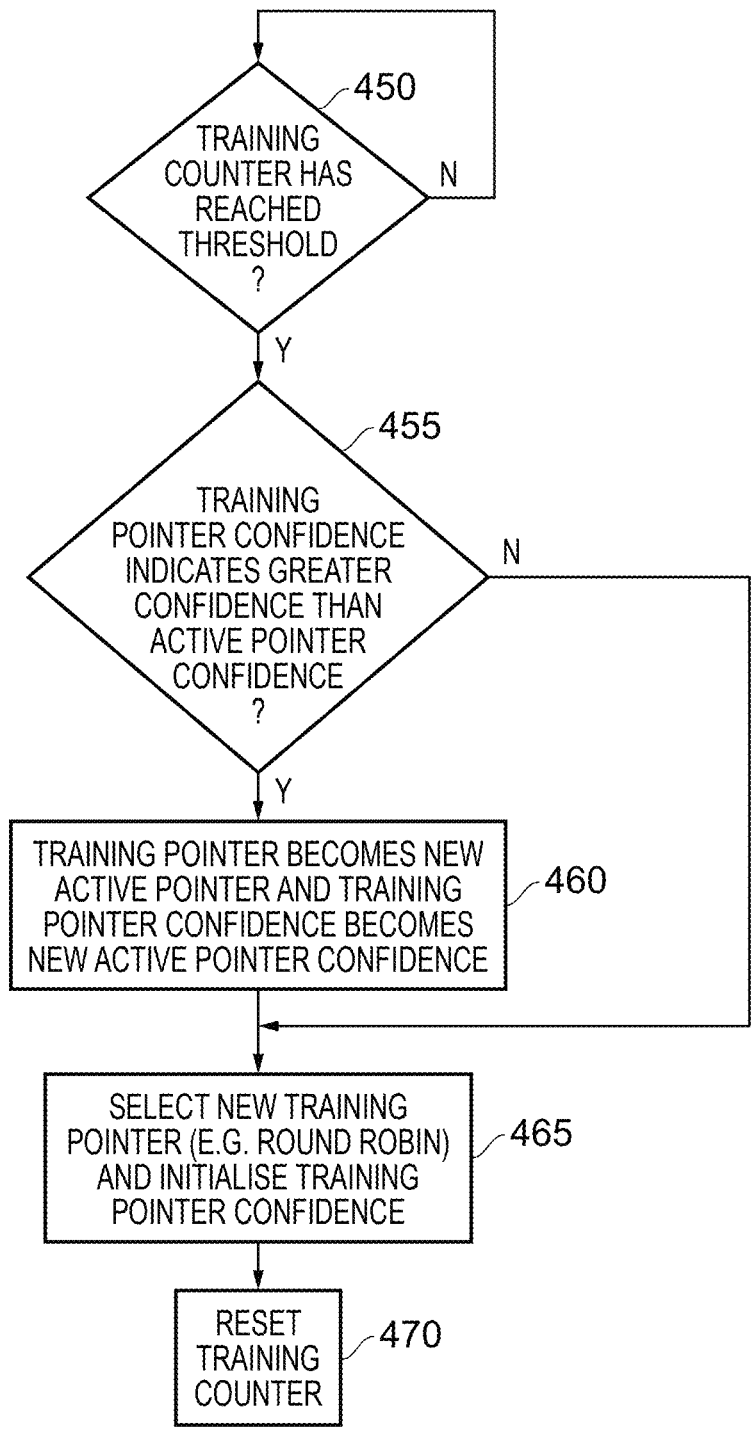
FIG. 11 is a flow diagram illustrating steps performed by the apparatus of FIG. 8 upon determining that a training counter has reached a determined threshold, in accordance with one example implementation.

FIG. 11 is a flow diagram illustrating steps taken in one example implementation when the training counter of a given tracker entry has reached a threshold level. Any suitable threshold level can be chosen, but in one particular example implementation the threshold level is determined to have been reached when 32 training events have been detected. When this is detected at step 450, it is then determined at step 455 whether the training pointer confidence indicates a greater confidence than the active pointer confidence, for the tracker entry in question. If so, then the training pointer becomes the new active pointer at step 460, and similarly the training pointer confidence becomes the new active pointer confidence. Thereafter, at step 465, or directly following step 455 if it is determined that the training pointer confidence is not greater than the active pointer confidence, a new training pointer is selected and the training pointer confidence is initialised for that newly selected training pointer. There are various ways in which the new training pointer can be selected, but the aim is to cycle through all of the possible pointers over time in order to decide which one performs best for any given HTP branch instruction being tracked, and hence in one example implementation the new training pointer can be selected in a round robin manner, by cycling through the pointers maintained within the pointer storage 340. At step 470, the training counter is then reset, so as to reinitiate the above described training process.

It should be noted that by adopting the above described approach, each of the tracker entries is trained at its own rate, depending on the frequency at which the HTP branch instruction being tracked in that tracker entry is encountered, and hence allows training to be performed more quickly for the more commonly appearing HTP branch instructions. This can significantly improve performance, since the more frequently appearing HTP branch instructions are the ones that will give rise to the best incremental performance improvement if they are predicted correctly.

Figure 12:
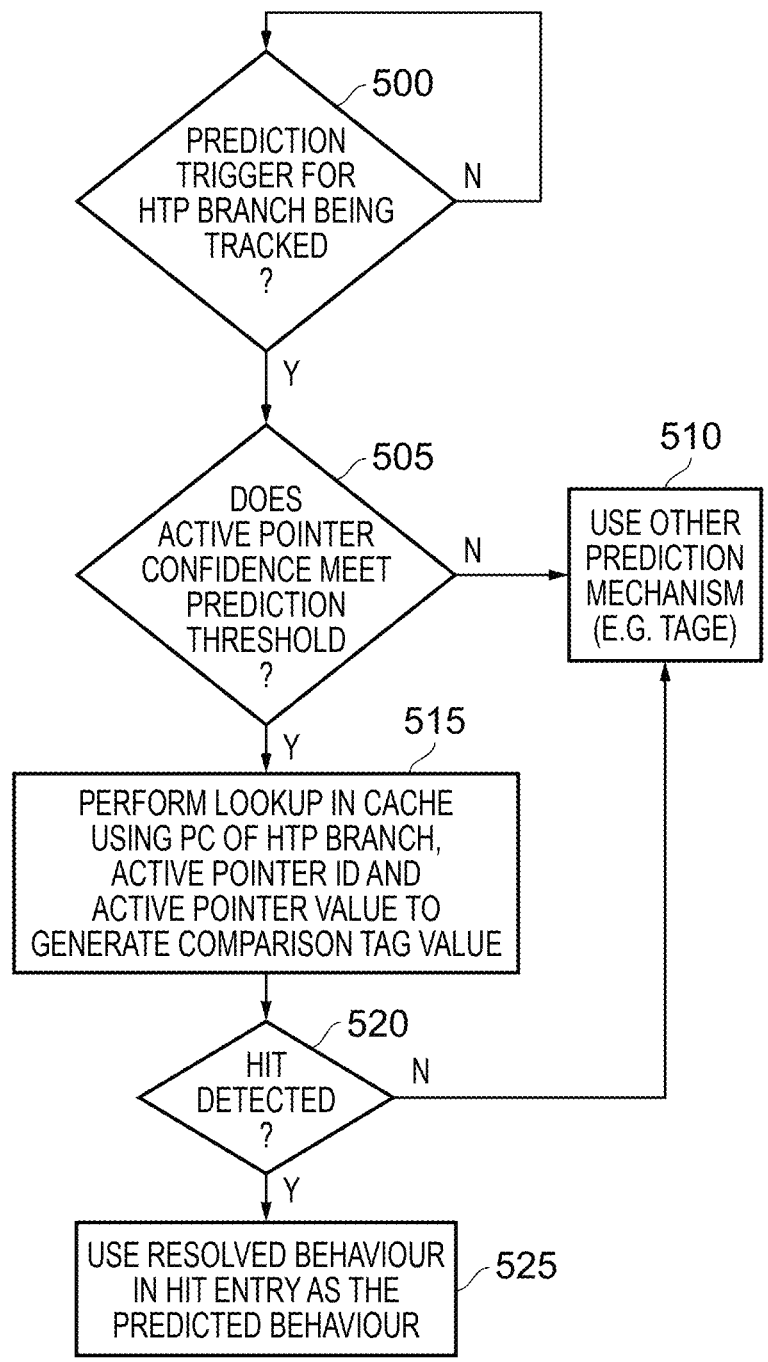
FIG. 12 is a flow diagram illustrating steps performed by the apparatus of FIG. 8 upon receipt of a prediction trigger for a tracked HTP branch instruction, in accordance with one example implementation.

FIG. 12 is a flow diagram illustrating steps taken by the apparatus of FIG. 8 upon receipt of a prediction trigger for a HTP branch instruction being tracked within the tracker circuitry. When such a prediction trigger is received (for example due to a tracked HTP branch instruction being detected in the instruction flow), it is determined at step 505 whether the active pointer confidence indicated in the relevant tracker entry meets a determined prediction threshold, and if not then at step 510 a different prediction mechanism is used to make the prediction, for example the earlier discussed TAGE predictor.

However, if the active pointer confidence does meet a specified prediction threshold, then at step 515 a lookup is performed in the cache using a comparison tag value generated using the program counter of the HTP branch instruction in question, the active pointer identifier as identified by the relevant tracker entry, and the current value of the active pointer. It is then determined at step 520 whether a hit has been detected, and if not then the process proceeds to step 510 where another prediction mechanism is used as discussed earlier. However, if a hit is detected, then the resolved behaviour as stored in the hit entry is used as the predicted behaviour at step 525.

It has been found that the above described techniques can provide for significantly improved prediction performance for a variety of HTP branch instructions than would be achieved by using other prediction mechanisms. However, it may still be the case that there are certain HTP branch instructions for which it is difficult to obtain accurate predictions. For example, some HTP branch instructions may be provided within a software function that is called from multiple different places within program code, and the behaviour of that HTP branch instruction may depend upon where that function is called from within the program code. As a result, the correlation that is seeking to be determined using the above described technique may be difficult to realise due to the behaviour of that HTP branch instruction varying in such a way.

Figure 13:
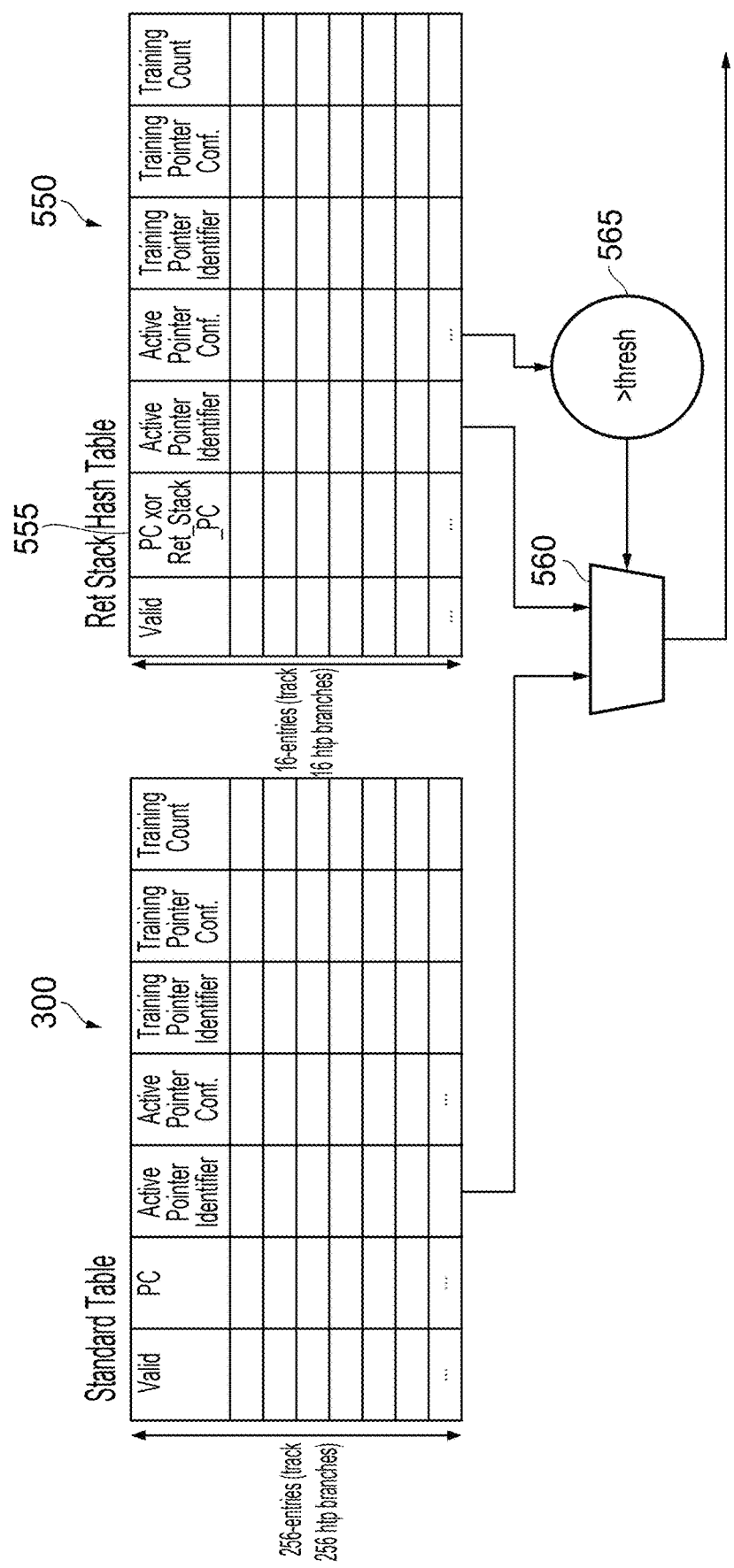
FIG. 13 is a diagram schematically illustrating the use of an additional tracker table for hard to predict branch instructions, in accordance with one example implementation.

In order to seek to improve the prediction accuracy for such HTP branch instructions, then in one example implementation the tracker circuitry may be arranged to maintain a plurality of additional tracker entries, as illustrated schematically in FIG. 13. As shown, in addition to the standard tracker table 300, which may take the form discussed earlier with reference to FIG. 9, an additional table 550 may be provided, referred to in FIG. 13 as a return stack hash table. As will be seen, the return stack hash table 550 contains a number of entries that essentially have the same fields as the entries in the standard table. However, instead of merely storing the program counter of the HTP branch instruction being tracked, as can be seen by the field 555 of an entry in the return stack hash table 550, that program counter value is XORed with a return stack program counter value identifying where within the program code execution will return to once the function containing the HTP branch instruction in question has completed. Hence, the address indication captured within the field 555 is influenced by where within the program code the function containing the HTP branch instruction in question was called from.

The entries in the return stack hash table 550 can be used and trained in much the same way as the entries in the standard table 300, with both of these tracker tables making use of the cache storage maintained by the cache circuitry 210. The only difference is that when the tag value generation circuitry performs the tag generation process, it will use the contents of the field 555 as the address indication, and as noted above those contents are formed by combining the program counter of the HTP branch instruction in question with a return stack program counter value.

How many entries are provided within the return stack hash table 550 is a matter of design choice, but in one example implementation it may be the case that there are significantly fewer entries in the return stack hash table 550 than in the standard table 300. In the particular example illustrated in FIG. 13, there are 256 entries in the standard table 300, but only 16 entries in the return stack hash table 550. In this example implementation, it is assumed that an entry is only made within the return stack hash table 550 if a threshold level of prediction accuracy is not being achieved using the corresponding entry in the standard table 300.

When an entry is made in the return stack hash table 550, then in one example implementation the corresponding entry in the standard table may be invalidated. However, in an alternative implementation, both entries may be maintained, so that either can be used for prediction dependent on prediction accuracy achieved. In the particular example shown in FIG. 13, a threshold detection circuitry 565 may be used to determine when the active pointer confidence of the corresponding entry in the return stack hash table 550 reaches or exceeds a threshold level, at which point the prediction circuitry may switch (as indicated schematically by the multiplexer 560) from using the contents of the relevant tracker entry in the standard table when performing a lookup within the cache to obtain the predicted behaviour, and instead may use the contents of the corresponding entry in the return stack hash table to perform such lookup operations in order to obtain the predicted behaviour.

Figure 14:
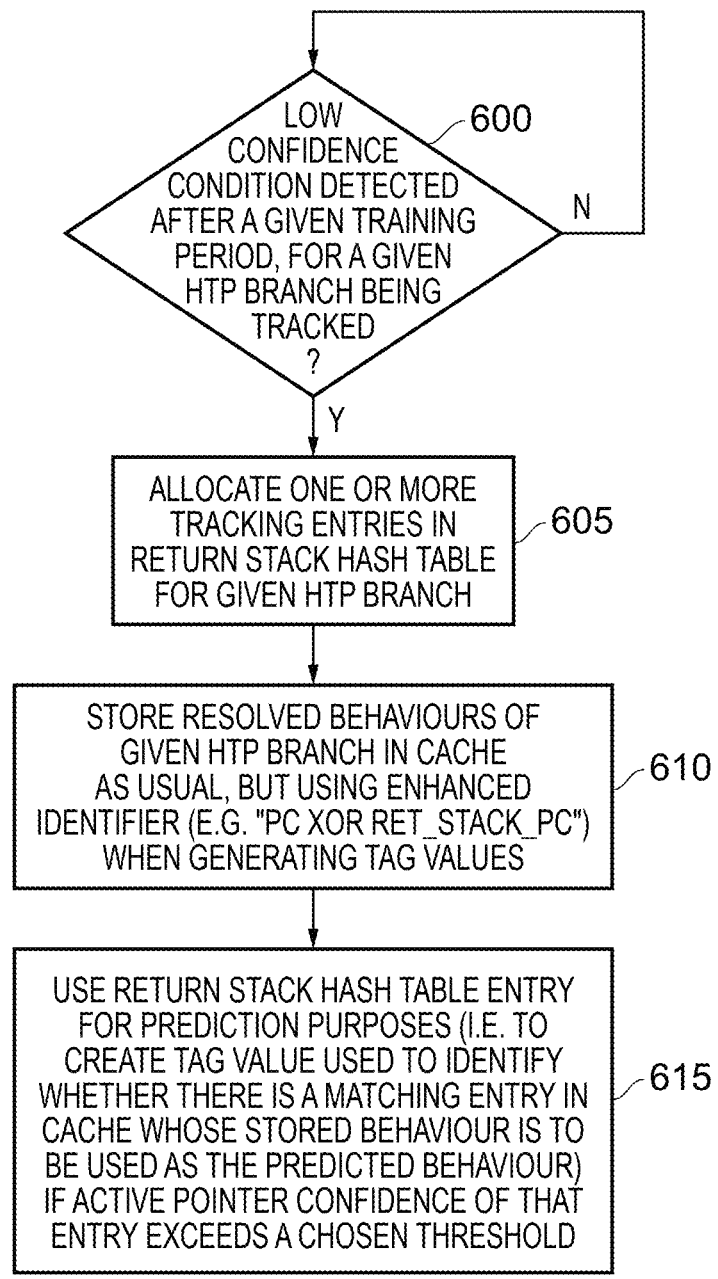
FIG. 14 is a flow diagram illustrating how the additional tracker table of FIG. 13 may be utilised, in accordance with one example implementation.

FIG. 14 is a flow diagram illustrating one way in which the technique illustrated in FIG. 13 may be used. At step 600, it is determined whether a low confidence condition has been detected after a given training period, for a given HTP branch instruction being tracked by a tracker entry in the standard table 300. That training period can be chosen as desired, but by way of example may involve at least one training iteration through all of the pointers, with the best performing of those pointers then being reflected as the current active pointer in the tracker entry of the standard table. If after that process a certain level of mispredictions still occurs when predicting the behaviour of the given HTP branch instruction, this may be treated as elapse of the above-mentioned training period and cause an additional tracker entry to be allocated for that given HTP branch instruction within the return stack hash table 550, with the training process then being performed for that additional tracker entry.

Hence, as shown in FIG. 14, if such a low confidence condition is detected after a given training period, then at step 605 one or more tracking entries are allocated in the return stack hash table for the given HTP branch instruction, and thereafter, at step 610, resolved behaviours of the given HTP branch instruction are stored in the cache as usual, but using the enhanced address identifier referred to earlier when generating tag values, which in one example implementation is achieved by XORing the program counter of the hard to predict branch instruction with the program counter value on a return stack. If the corresponding tracker entry in the standard table is still being used in parallel, then the resolved behaviours can also cause updates to be made using the contents of the entry in the standard table, as discussed earlier.

At step 615, the return stack hash table entry can be used for prediction purposes if the active pointer confidence of that entry exceeds a chosen threshold. This can be achieved by creating a tag value using the contents of the field 555 of the relevant entry in the return stack hash table, in combination with the active pointer identifier and the current value of the active pointer, in order to create a comparison tag value used to determine whether there is a matching entry in the cache, and if so the stored behaviour in that matching entry can be used as the predicted behaviour.

The approach described above with reference to FIGS. 8 to 14 can provide significant benefits, through its use of a shared cache structure to maintain the resolved behaviours of each of the control flow instructions being tracked by the tracker entries of the tracker circuitry, which can lead to a very efficient design when compared with an approach that instead seeks to maintain separate storage structures for each of the tracked control flow instructions into which to store the resolved behaviours of those tracked control flow instructions. In particular, for a given area/size, it is possible using the above described technique to track a larger number of control flow instructions than would be possible were separate storage structures required to be maintained for each of the tracked control flow instructions in order to store their resolved behaviours. Further, it is possible to train each of the entries independently and in parallel, in order to seek to find the most appropriate pointer for any given control flow instruction, which can lead to significantly improved prediction accuracy.

However, such an approach can give rise to some implementation challenges in terms of both power consumption and timing, particularly in systems where the required prediction bandwidth is relatively high. In particular, in some systems it may be necessary to be able to predict the outcome of multiple control flow instructions per clock cycle, and it can be difficult to achieve this required performance if the prediction circuitry needs to access the tracker circuitry and cache circuitry in order to obtain the information necessary to make a prediction. As will be discussed herein with reference to the following figures, an alternative implementation may be provided that can retain the benefits of the above described approach, whilst allowing a higher prediction bandwidth to be achieved. In accordance with such an implementation the above described tracker circuitry and cache circuitry are used to form training circuitry whose aim is to perform a training process in order to determine, for each hard to predict branch instruction tracked by the tracker circuitry, an associated pointer whose pointer value increments in a manner that meets a correlation threshold with occurrences of instances of that hard to predict branch instruction. Then, once a suitable pointer has been identified for a given hard to predict branch instruction, the apparatus is arranged to promote that given hard to predict branch instruction into another structure (referred to herein as prediction circuitry) which can then be accessed when making predictions. The training circuitry is then off the critical path and can be optimised having regard to its main function, which is to perform a training process in order to find the most appropriate pointer to associate with each hard to predict branch, whilst the prediction circuitry can be optimised with regards to its main function, which is to provide high bandwidth predictions. This can lead to better overall power efficiency and storage efficiency, whilst improving performance.

Figure 15:
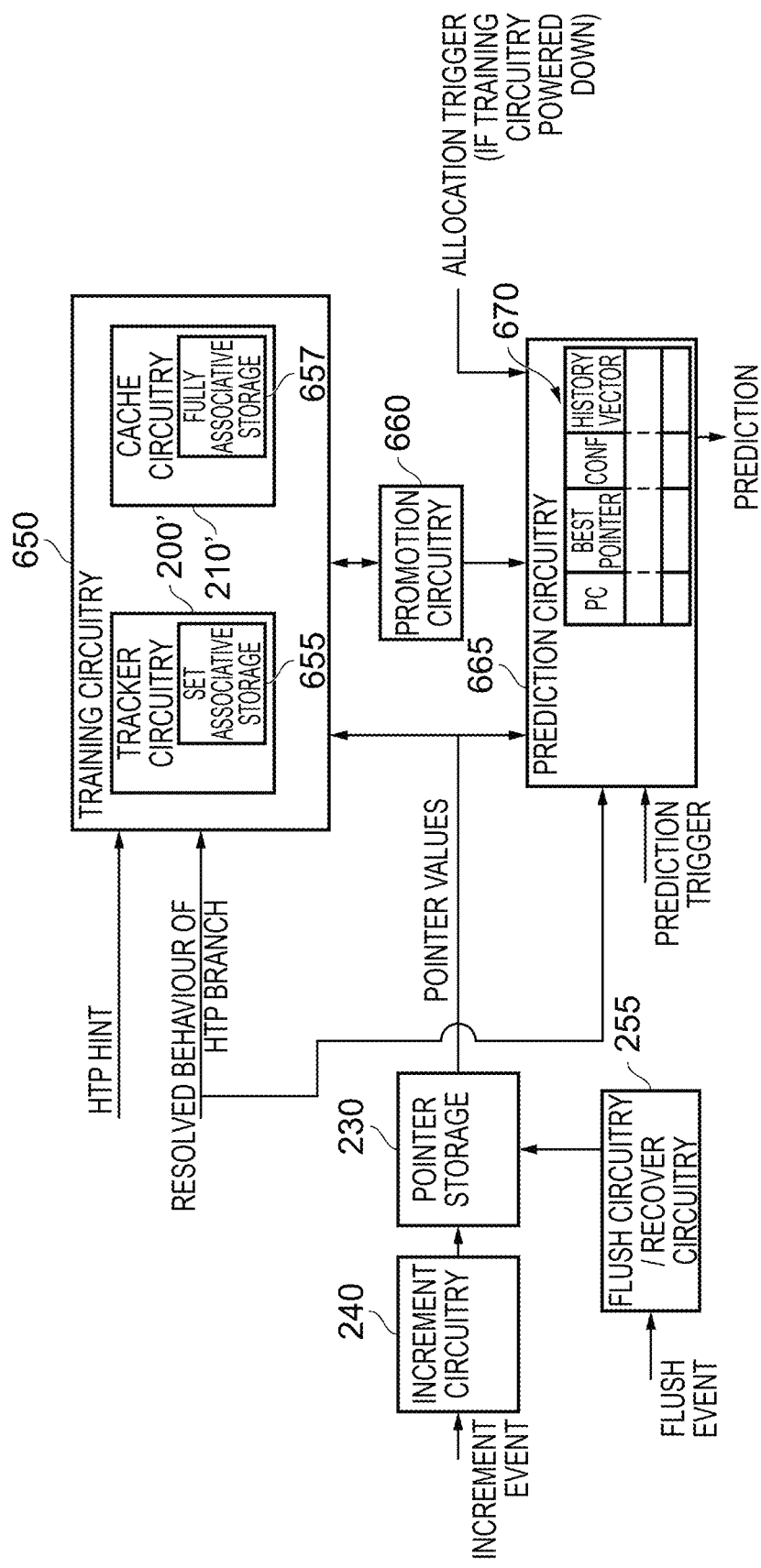
FIG. 15 schematically illustrates an example of a data processing apparatus in accordance with one example implementation.

FIG. 15 is a block diagram schematically illustrating such an implementation, and in this figure components that are common to the example shown earlier in FIG. 8 are designated with the same reference numerals. As shown, training circuitry 650 is provided, which incorporates both tracker circuitry 200' and 210' which generally take the form discussed earlier when describing the tracker circuitry 200 and cache circuitry 210 of FIG. 8. However, since the training circuitry 650 does not need to meet the performance requirements that the tracker circuitry 200 and cache circuitry 210 would be required to meet in order to seek to improve prediction bandwidth, the topologies of the storage components provided by the tracker circuitry 200' and cache circuitry 210' can be chosen so as to seek to be more power and area efficient. By way of example, the tracker circuitry no longer needs to use a fully associative or very highly associative structure, but instead can use a more standard set associative storage structure such as a two-way set associative storage structure. This can significantly reduce the area and power consumption requirements, which can for example allow the tracker circuitry to be implemented in random access memory. Further, there is more flexibility in the topology used for the cache circuitry 210'. In one example implementation a fully associative storage structure is still used to implement the storage in the cache circuitry, but the size of that storage can be reduced, as will be discussed in more detail later.

As shown in FIG. 15, promotion circuitry 660 is provided that can be used to allocate a given hard to predict branch instruction being tracked by the training circuitry 650 into a prediction entry of table 670 of the prediction circuitry 665 when the training circuitry 650 has identified a suitable associated pointer for that given hard to predict branch instruction (i.e. an associated pointer whose pointer value increments in a manner that meets a correlation threshold with occurrences of instances of that hard to predict branch instruction). The prediction entries of table 670 can be organised in much the same way as the entries of the active table 150 described earlier with reference to FIG. 7. Hence, each prediction entry may include a program counter field to identify an address of the HTP branch instruction being tracked in that entry, a best pointer identifier field to identify the pointer that is considered to be the best pointer for the HTP branch instruction being tracked (which will be specified by the promotion circuitry 660 at the time the allocation takes place, based on the associated pointer that the training circuitry has identified), and a confidence indication used to determine when there is sufficient confidence in the contents of the prediction entry to enable predictions to be made using that entry. That confidence indication may be initialised to a given value, for example the value of the associated pointer confidence indication maintained in the relevant tracker entry for the hard to predict branch instruction now being allocated into the prediction circuitry. A history vector field may also be provided which can be used to store a rotating bit vector such as a rotating bit vector of the form 175 described earlier when discussing FIG. 7. Hence each entry in the bit vector may be used to identify a taken or not taken prediction, and may have a valid bit to identify whether a valid taken or not taken prediction has been stored in that entry.

There are various ways in which the history vector may be populated in response to a prediction entry being allocated for a given control flow instruction. For instance, in one implementation the history vector may be populated at the time the prediction entry is allocated, for example by retrieving from the cache circuitry 210' the resolved behaviour for one or more instances of the given control flow instruction. Alternatively, the history vector may instead be populated after the prediction entry has been allocated, using the resolved behaviour for one or more subsequently observed instances of the given control flow instruction, which can be forwarded to the prediction circuitry 665 in addition to being forwarded to the training circuitry 650. As a yet further example approach, a hybrid approach could be taken, where the history vector could be at least partly populated using information retrieved from the cache circuitry 210', but could then be supplemented in response to each subsequently observed instance of the given control flow instruction.

The pointer storage 230, increment circuitry 240 and flush circuitry/recover circuitry 255 can operate in the same way as described when discussing those components in relation to the example implementation of FIG. 8. The pointer values retrieved from the pointer storage 230 can be provided to the training circuitry 650 and/or the prediction circuitry 665, as required.

In response to a prediction trigger received by the prediction circuitry 665, then it can be determined whether a valid prediction entry exists for the hard to predict branch instruction associated with the prediction trigger, and if so it can be determined whether the confidence indication in that prediction entry meets a certain prediction threshold. If it does, then an element within the history vector can be identified based on the best pointer indicated for that hard to predict branch instruction within the prediction entry, and the current pointer value of that pointer as retrieved from the pointer storage 230, and if that element is valid then the resolved behaviour stored in that element can be used as the predicted behaviour output by the prediction circuitry 665.

Figure 16:
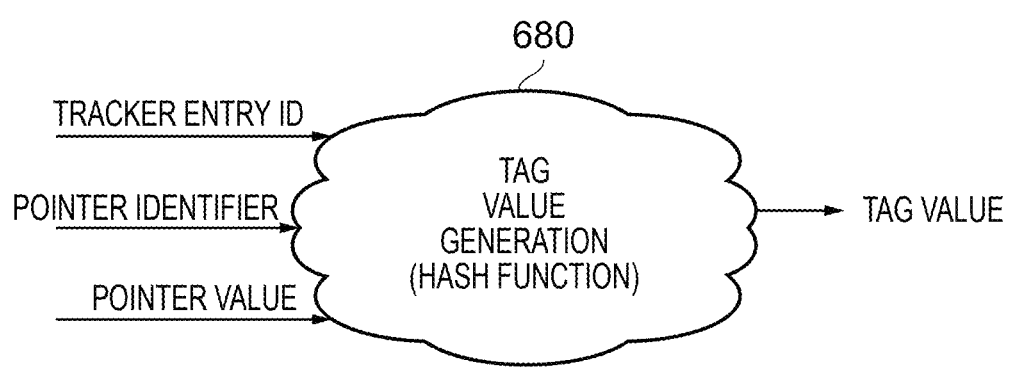
FIG. 16 schematically illustrates how a tag value may be generated in accordance with one example implementation.

FIG. 16 schematically illustrates a tag value generation function 680 that may be performed by cache access circuitry associated with the cache circuitry 210' when accessing the cache storage within that cache circuitry. In particular, the tag value generation function can be used to generate a tag value that, when allocating a resolved behaviour into a cache entry, can be stored in association with that allocated resolved behaviour, and when performing lookup operations can be used to generate a comparison tag value that can then be compared with the tag values stored in allocated cache entries. In the example discussed earlier with reference to FIG. 8, the tag value generation function may be arranged to take as inputs an identifier of the hard to predict branch instruction under consideration, for example at least a portion of the program counter (PC) value, an indication of the relevant pointer, and an indication of the current pointer value of that pointer, and can then be arranged to apply a suitable function, such as a hash function, in order to generate the tag value. In the example illustrated in FIG. 16, the PC-based indication of the hard to predict branch instruction is replaced with a tracker entry identifier. Such an approach can enable the size of the cache circuitry 210' to be reduced, as the identifier of the tracker entry will typically be smaller than a PC-based identifier of the control flow instruction and hence less space may be required within the cache to hold the associated tag values. Further, it has been found that such a physical identifier of the tracker entry is sufficient and stable enough to use when generating a tag value, since once a control flow instruction has been allocated to a tracker entry, it can remain allocated in that same tracker entry for a relatively long time, for example at least until an associated pointer has been found during the training process that enables the correlation threshold to be met, and hence causes promotion of the control flow instruction into the prediction circuitry 665.

Figure 17:
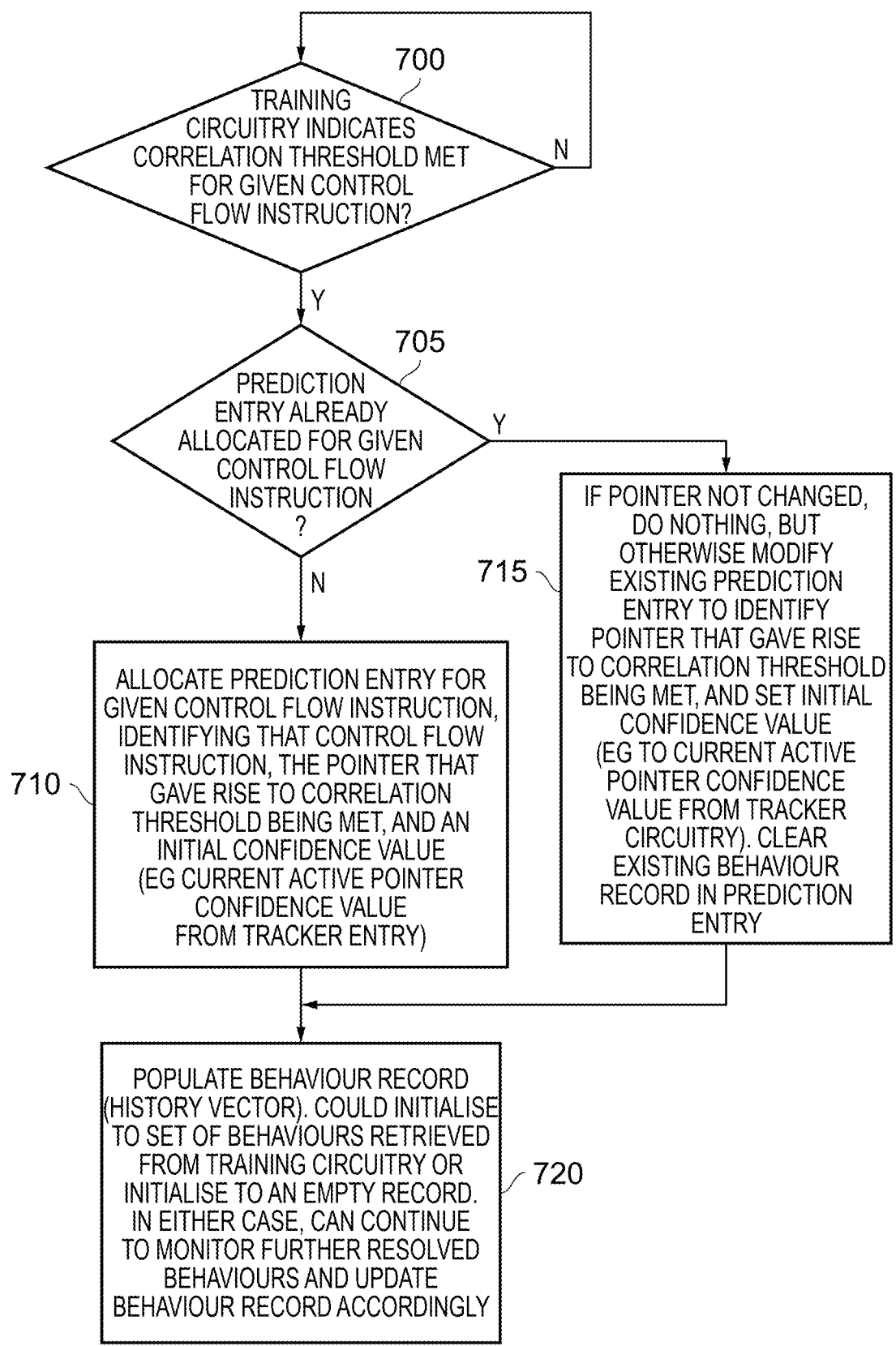
FIG. 17 is a flow diagram indicating steps that may be taken when a correlation threshold is considered to be met for a given control flow instruction being tracked by the training circuitry of FIG. 15, in accordance with one example implementation.

FIG. 17 is a flow diagram illustrating steps performed by the apparatus of FIG. 15 upon a determination by the training circuitry that the correlation threshold has been met in respect of an active pointer indicated for a given control flow instruction (hard to predict branch instruction) being tracked in a tracker entry of the tracker circuitry 200'. In one example implementation the meeting of the correlation threshold may be detected when the active pointer confidence indication indicates a desired level of confidence. When at step 700 such a condition is detected, then at step 705 it is determined whether a prediction entry has already been allocated for the given control flow instruction. If not, then the process proceeds to step 710 where the promotion circuitry 660 communicates with the prediction circuitry 665 in order to cause a prediction entry to be allocated for the given control flow instruction. Within that allocated prediction entry, the control flow instruction will be identified (for example by storing the PC value of that instruction), the pointer that gave rise to the correlation threshold being met will also be identified as the best pointer within the prediction entry, and an initial confidence value will be set within the confidence field of the prediction entry. In one example implementation the initial confidence value will be set to the current active pointer confidence value held in the corresponding tracker entry of the tracker circuitry 200'.

Thereafter, at step 720, the behaviour record (which in the example of FIG. 15 takes the form of a history vector) will be populated. As discussed earlier, this behaviour record could be initialised to a set of behaviours retrieved from the cache circuitry 210' of the training circuitry 650, or could be initialised to be an empty record. In either case, the prediction circuitry 665 can continue to monitor further resolved behaviours for the given control flow instruction that has now been allocated into the prediction entry, and can update the behaviour record accordingly based on those observed resolved behaviours.

If at step 705, it is determined that a prediction entry has already been allocated for the given control flow instruction, then the process proceeds to step 715 where, if the active pointer within the tracker entry has not been changed no further action is needed, but otherwise the existing prediction entry will be modified to identify the updated pointer that has given rise to the correlation threshold being met, and to set of initial confidence value for that pointer. As discussed earlier, this initial confidence value can be set to the current active pointer confidence value held in the corresponding tracker entry of the tracker circuitry. The existing behaviour record in the prediction entry will then be cleared, whereafter the process will proceed to step 720 (assuming the existing prediction entry has been modified at step 715—if the pointer has not changed, and hence the prediction entry is not modified, then step 720 will not be performed).

In one example implementation, the process of FIG. 17 is performed on an ongoing basis, so that whenever the training circuitry determines, for a given tracker entry, that the active pointer confidence indication for the current active pointer indicates that the correlation threshold has been met, the process of FIG. 17 is performed. This ensures that as soon as a desired level of confidence has been reached in respect of a pointer associated with a given control flow instruction, a prediction entry can be populated with that information to allow predictions to thereafter be made. However, if desired, in an alternative implementation the process of FIG. 17 could be performed at discrete points in time, for example at the end of each training period (which in one example implementation may be deemed to occur in response to the training counter reaching a determined threshold for a given tracker entry) and hence at the point in time where it is decided whether the currently tracked training pointer should become the new active pointer.

Figure 18:
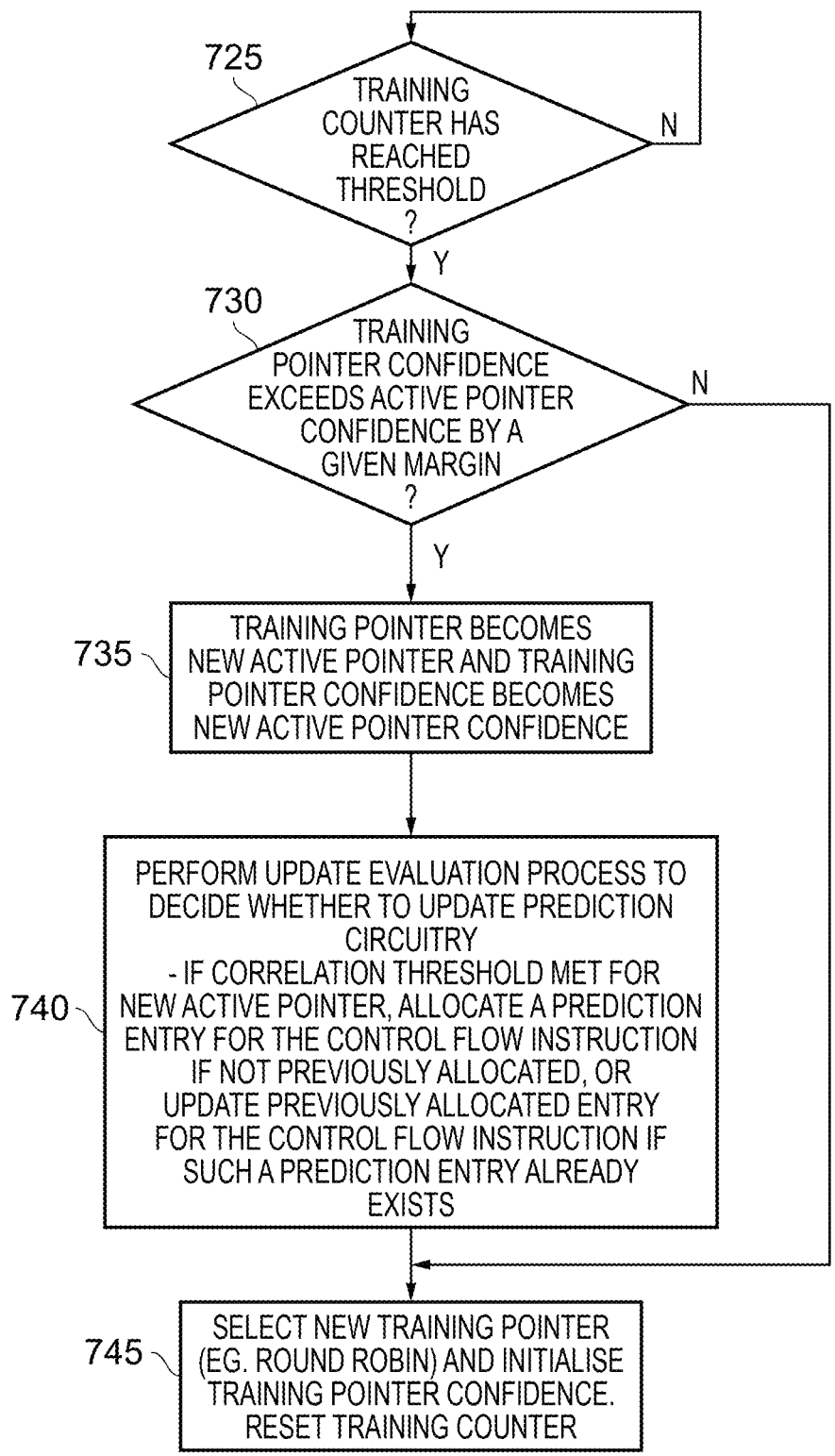
FIG. 18 is a flow diagram illustrating steps performed when a training counter is considered to have reached a threshold level for a particular tracker entry of the tracker circuitry, in accordance with one example implementation.

FIG. 18 is a flow diagram illustrating the steps that can hence be taken upon determining that the training counter (for example the training count as maintained within the field 335 of a tracker entry as shown in FIG. 9) has reached a threshold level. If at step 725 it is determined that the training counter has reached the threshold level for a given tracker entry, then it is determined at step 730 whether the training pointer confidence maintained within that tracker entry exceeds the active pointer confidence maintained within that tracker entry by a given margin. The given margin can be chosen as a design parameter, but is intended to ensure that thrashing does not occur in a prediction entry of the prediction circuitry by avoiding repetitive updates to that prediction entry to cycle back and forth between different indicated pointers.

If at step 730 it is determined that the training pointer confidence does indeed exceed the active pointer confidence by the given margin, then at step 735 the training pointer becomes the new active pointer and the training pointer confidence becomes the new active pointer confidence. At step 740, an update evaluation process can then be performed to decide whether to update the prediction circuitry. In particular, if it is determined that the correlation threshold has been met for the new active pointer (i.e. if the new active pointer confidence indicates a level of confidence that is sufficiently high) then a prediction entry may be allocated for the control flow instruction identified in the tracker entry if a prediction entry has not previously been allocated for that control flow instruction, or instead a previously allocated prediction entry may be updated for the control flow instruction if such a prediction entry already exists. The process discussed earlier with reference to FIG. 17 can be used at this point to populate the allocated entry with the required information.

At step 745, a new training pointer is then selected using a suitable selection algorithm, for example a round robin algorithm that merely cycles through the available pointers, and the training pointer confidence can then be initialised, for example to a zero confidence level. The training counter can then be reset in order to begin another training period. If at step 730 it is determined that the training pointer confidence does not exceed the active pointer confidence by the given margin, then the process can proceed directly to step 745 and steps 735 and 740 are not performed.

Whilst step 740 is shown as being performed between steps 735 and 745 in FIG. 18, this is merely for ease of illustration, and it will be appreciated that in practice step 740 could be performed in parallel with step 745, or indeed could be performed after step 745.

Figure 19:
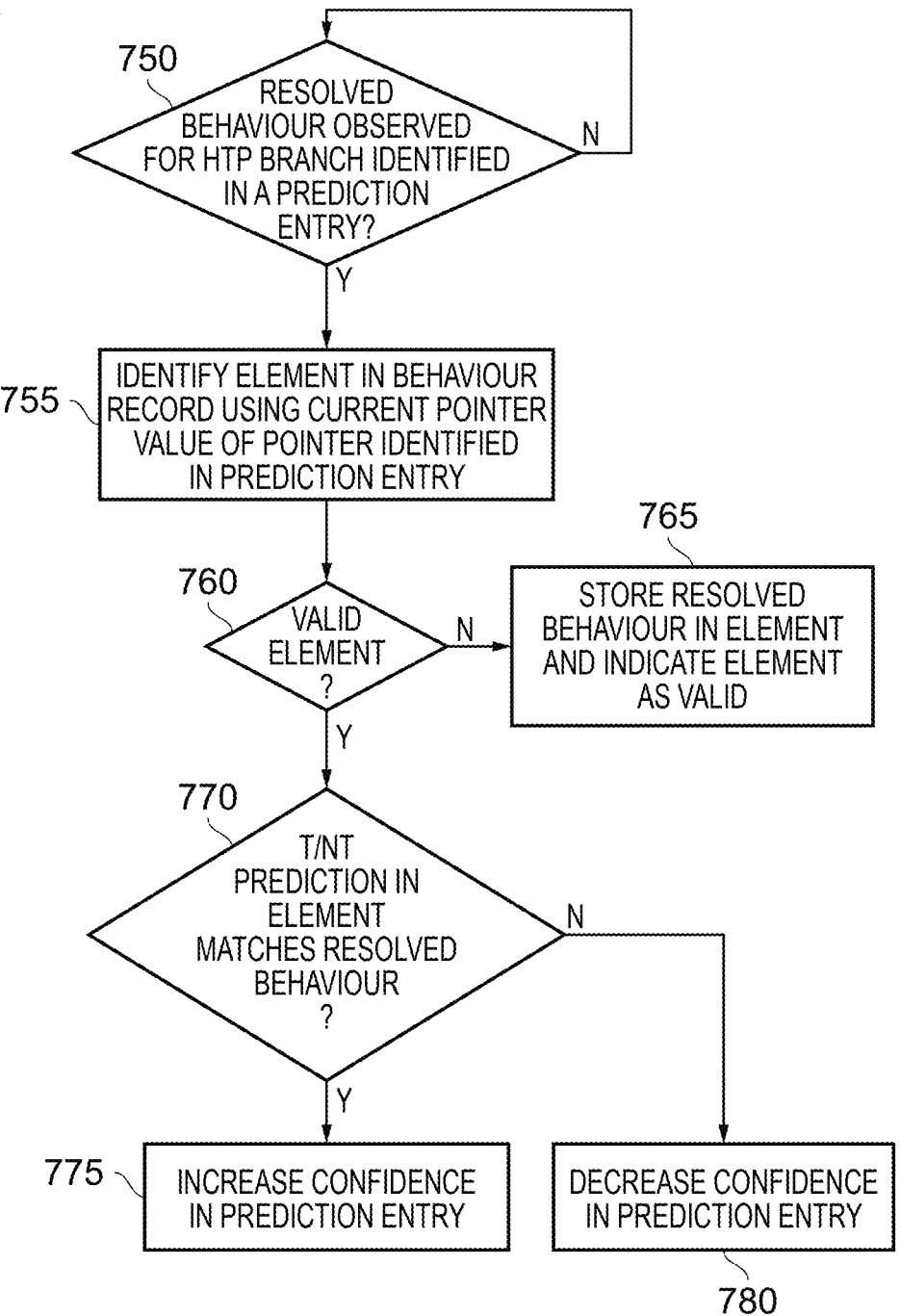
FIG. 19 is a flow diagram illustrating the operation of the prediction circuitry upon observing a resolved behaviour for a control flow instruction allocated into one of the prediction entries, in accordance with one example implementation.

FIG. 19 is a flow diagram illustrating the operation of the prediction circuitry when a resolved behaviour of a hard to predict (HTP) branch instruction is observed. At step 750, it is determined whether a resolved behaviour has been observed for an HTP branch instruction identified in a prediction entry of the prediction circuitry 665. If not, no action is taken and the process remains at step 750 until such a resolved behaviour is observed. When a resolved behaviour is observed for an HTP branch instruction identified in a prediction entry, then at step 755 an element in the behaviour record of the relevant prediction entry is identified using the current pointer value of the pointer that is identified in that prediction entry. Hence, in the example where the behaviour record takes the form of a history vector, then the pointer value of the relevant pointer is used to identify a particular element within that history vector.

At step 760, it is determined whether that element is marked as valid. In one example implementation, the history vector takes the form of the rotating bit vector 175 discussed earlier with reference to FIG. 7, and hence each element has a valid field (which may for example be set to indicate that the entry is valid, and cleared to indicate that the entry is not valid) and a resolved behaviour identification field (for example to identify whether the resolved behaviour is a taken behaviour or a not taken behaviour). If the element is not marked as valid, then at step 765 the observed resolved behaviour is stored in the element and the valid field is set to indicate that the element is valid.

If at step 760 it is determined that the element is marked as valid, then it is determined at step 770 whether the taken/not taken prediction behaviour stored in the element matches the observed resolved behaviour. If it does, then the confidence field in the prediction entry is updated to indicate an increased confidence, whereas if the observed resolved behaviour does not match the behaviour stored in the element the process instead proceeds to step 780 where the confidence in the prediction entry is updated to indicate a decreased confidence.

Figure 20:
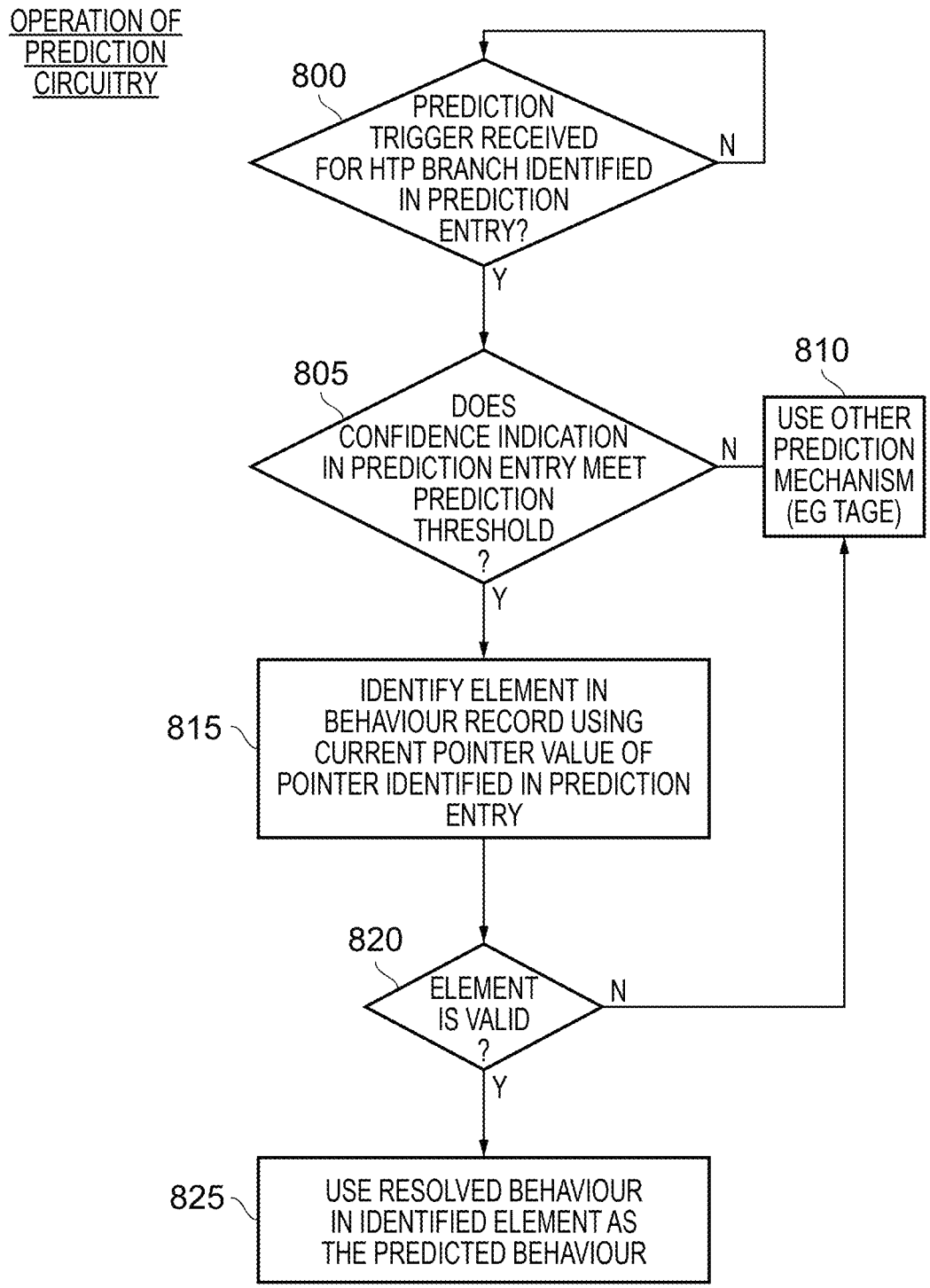
FIG. 20 is a flow diagram illustrating the operation of prediction circuitry upon detection of a prediction trigger, in accordance with one example implementation.

FIG. 20 illustrates the operation of the prediction circuitry in response to a prediction trigger. When such a prediction trigger is detected at step 800 (for example due to an HTP branch instruction identified in a prediction entry being detected in the instruction flow), it is determined at step 805 whether the confidence indication in the prediction entry meets a determined prediction threshold, and if not then at step 810 a different prediction mechanism is used to make the prediction, for example the earlier discussed TAGE predictor.

However, if the confidence indication does meet a specified prediction threshold, then at step 815 an element in the behaviour record of the relevant prediction entry is identified using the current pointer value of the pointer identified in that prediction entry. It is then determined at step 820 whether the element identified at step 815 is marked as valid, and if not the process proceeds to step 810 where a different prediction mechanism is used to make the prediction. However, if the element is determined at step 820 to be marked as valid, then at step 825 the resolved behaviour stored in that identified element may be used as the predicted behaviour.

As will be apparent from the earlier discussions, a variety of different pointers may be established within the pointer storage, which all have associated different rules used to determine when the values of those pointers get updated in response to increment events. One particular type of pointer that could be used as one of the pointers is a pointer whose value never updates in response to any increment events, and hence remains a static value, such a pointer also being referred to herein as an IDX1 pointer. When such a pointer is chosen as the associated pointer for a hard to predict branch instruction, this means that the predicted behaviour will always be the last observed behaviour. Hence, the behaviour record of the associated prediction entry only holds a single observed behaviour. In order to maintain the correct information within that behaviour record, whenever an instance of an HTP branch instruction gets retired from the processing pipeline, and that HTP branch instruction is being tracked in a prediction entry of the prediction circuitry and has as its associated pointer the IDX1 pointer, then the behaviour record element storing the last observed behaviour of that branch instruction is invalidated. Then, on the next observed behaviour of that branch instruction, the element is repopulated and set to valid, so that that observed behaviour can then be used as a predicted behaviour for a subsequent instance of the HTP branch instruction.

Figure 21:
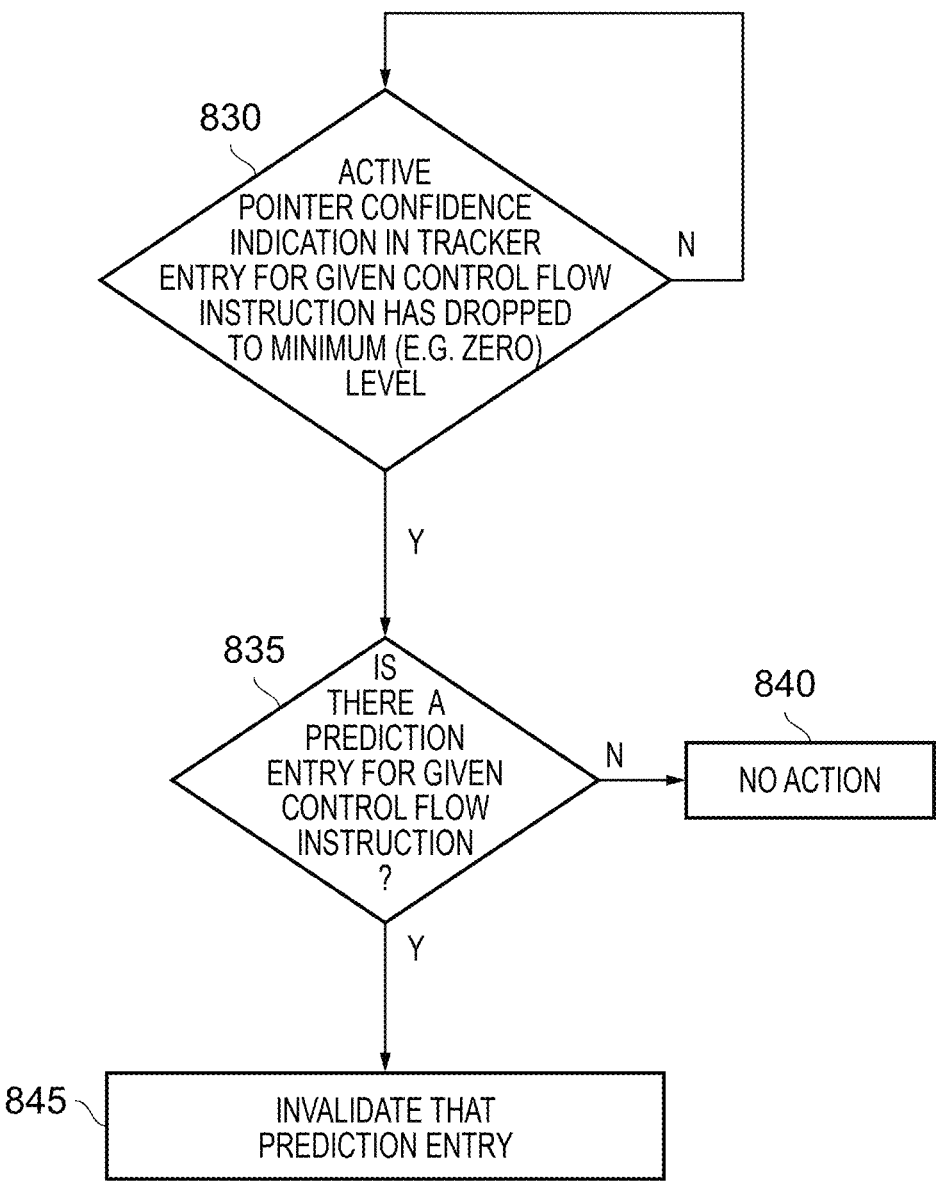
FIG. 21 is a flow diagram illustrating steps that may be taken when the active pointer confidence indication in a tracker entry drops to a determined minimum level, in accordance with one example implementation.

In some instances, it may be determined to be appropriate to invalidate an entry in the prediction circuitry. One example scenario where this may occur is illustrated by the flow diagram of FIG. 21. In particular, at step 830, it is determined whether the active pointer confidence indication in a tracker entry for a given control flow instruction has dropped to a minimum level. The minimum level may be implementation dependent, but in one example implementation is a zero level. At this point, the training circuitry has decided that the currently indicated active pointer is not expected to enable an accurate prediction to be made for the given control flow instruction. However, it is possible that a prediction entry still exists for the given control flow instruction. Hence, at step 835, it is determined whether there is a prediction entry for the given control flow instruction. If not, then no further action is required (as indicated by step 840), but if there is a prediction entry for the given control flow instruction, the process proceeds to step 845 where that prediction entry is invalidated. This will prevent the prediction circuitry making any further prediction for that given control flow instruction (at least until such time as the training circuitry determines in the future that there is an associated pointer for the given control flow instruction that does meet the correlation threshold, at which point the promotion circuitry can reallocate an entry in the prediction circuitry for the given control flow instruction identifying the relevant pointer).

Figure 22:
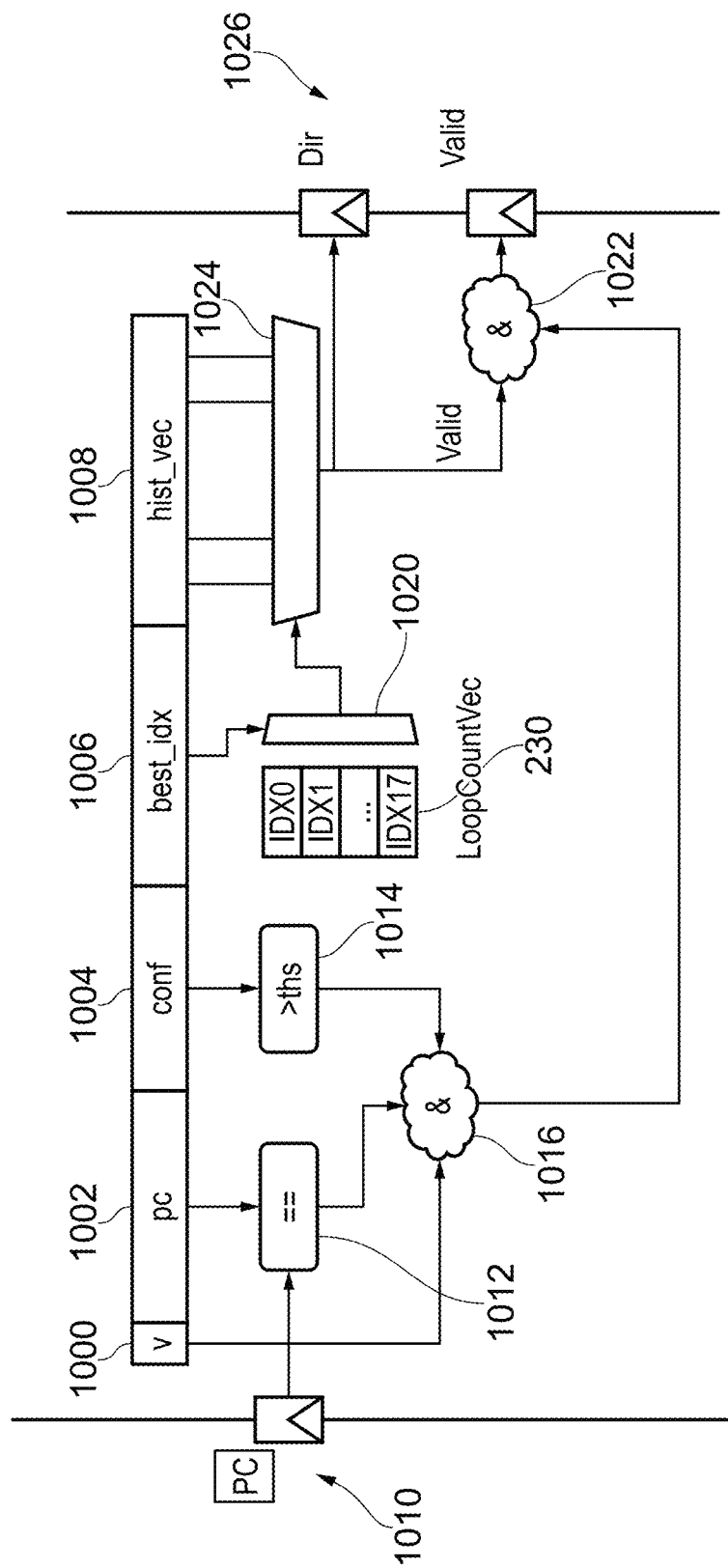
FIG. 22 schematically illustrates an example prediction entry and associated circuitry which may be employed when making a prediction in respect of a given control flow instruction.

FIG. 22 schematically illustrates an example prediction entry (a prediction entry of the first type) of the prediction circuitry 665, and associated circuitry which may be employed when making a prediction in respect of a given control flow instruction, for example according to the method illustrated in FIG. 20.

The prediction entry comprises a validity indication field 1000, a control flow instruction indication field 1002, a confidence indication field 1004, an associated pointer field 1006, and a behaviour record field 1008. The prediction entries may be substantially the same as the entries of the active table 150 illustrated in FIG. 7. The use of these fields in making a prediction shall be discussed below.

As indicated in steps 800 and 805 of FIG. 20, a prediction may be made in respect of an HTP branch when the prediction circuitry contains a valid entry corresponding to that HTP branch which has a confidence indication meeting the prediction threshold.

Therefore, as illustrated in FIG. 22, each entry may be provided with logic for determining whether these conditions are satisfied for a given entry. Although only one entry of the prediction circuitry 665 is shown in FIG. 22, it will be appreciated that similar determinations may be made in parallel in respect of each of the entries.

The PC value of the HTP branch for which a prediction is requested is provided as an input 1010 to the prediction circuitry 665 on an input line. Comparison logic 1012 compares the input 1010 to the control flow instruction indication 1002 of the prediction entry. If these values match, then the given prediction entry is a prediction entry corresponding to the HTP branch for which a prediction is requested. Hence, if there is a match then the comparison circuitry will output TRUE to AND logic 1016. If there is no match, comparison logic 1012 outputs FALSE to the AND logic 1016.

Threshold logic 1014 compares the confidence indication 1004 to a threshold value to perform the check of step 805 of FIG. 20 and determine whether the confidence indication meets the prediction threshold. If the confidence indication 1004 meets the threshold then threshold logic outputs TRUE to the AND logic 1016.

The AND logic 1016 also takes as input the value of the validity indication 1000 of the prediction entry.

Therefore, the AND logic 1016 outputs TRUE when the prediction entry is valid, matches the HTP branch for which a prediction is requested, and meets the prediction threshold. Similar checks may be performed for other prediction entries of the prediction circuitry in response to the input 1010.

In addition to (and optionally in parallel with) determining whether the entry can be used to make the prediction for the input 1010, an element of the behaviour record 1008 is selected to form the prediction in the case that the entry matches the input. As discussed previously, the selection of an element of the behaviour record is performed on the basis of the pointer associated with the control flow instruction identified by that prediction entry. As illustrated in FIG. 22, the associated pointer is indicated in the field 1006. In the example entry of FIG. 22, the associated pointer may be any one of the 18 pointers stored in the pointer storage 230.

Hence, selection logic 1020 is provided in association with the prediction entry to select, based on the pointer identified in field 1006, the pointer value of the associated pointer from the pointer storage circuitry 230. The selected pointer value is used as an input in selection circuitry 1024 to select which of the elements of the behaviour record 1008 is the selected element to be used for making a prediction. The selection logic 1024 outputs the branch direction (T/NT) indicated by the selected element as well as a valid indication associated with that element (for example, as indicated in the active table 150 of FIG. 7).

The output from AND logic 1016 and the validity indication of the selected element are provided to validity logic 1022. If the AND logic 1016 indicates TRUE, and the selected element is valid, then the selected element of the behaviour record associated with that prediction entry can be used to make a prediction in respect of the input HTP branch. The predicted direction is the direction indicated by the selected element of the behaviour record. The logic associated with the prediction entry outputs validity and direction information 1026 which indicate the prediction when the validity information indicates the direction is valid. Each prediction entry in the prediction circuitry 665 may perform similar checks in parallel, with up to one valid prediction being output for any given HTP branch instruction.

The logic illustrated in FIG. 22 enables a prediction to be made for a given instance of an HTP branch instruction. However, the inventors have identified some drawbacks with the implementation illustrated in FIG. 22. The prediction entry could be associated with any of the pointers in the pointer storage 230. Hence, each entry is required to access the pointer storage 230 and be capable of selecting any pointer value stored in the pointer storage 230. This means that the pointer storage may need to have a read port for each prediction entry, and multiplexing circuitry 1020 is provided for each entry. For example, for prediction circuitry having 64 entries, 64 read ports could be required for the pointer storage. The pointer storage 230 frequently toggles and all logic connected to the pointer storage 230 therefore has a power cost. The large number of read ports and multiplexing circuitry therefore contributes to a high power (and area) cost for the prediction circuitry. In addition, many entries may attempt to read pointer values from the pointer storage simultaneously. There may therefore be significant congestion for access to the pointer storage as a result of the large number of read ports which can harm the ability of the prediction circuitry to make a prediction in a given cycle, possibly requiring an extra cycle to make a prediction. These problems are only exaggerated if the number of entries in the prediction circuitry is increased, and therefore prediction circuitry having entries as illustrated in FIG. 22 may scale poorly.

The inventors have recognised that it may not be required for every prediction entry to have the full capability of the prediction entry of FIG. 22 to be associated with any of the pointers in the pointer storage. It has been found that the amount of circuitry associated with a given prediction entry (and therefore the area and power cost) may be reduced if that prediction entry is restricted in the selection of pointers with which it may be associated. In addition, as mentioned in the foregoing discussion, the inventors have found that the pointers IDX0 and IDX1 are used more regularly than the other pointers. Therefore, the inventors have proposed prediction circuitry comprising more than one type of entry including a more general entry capable of accessing a wider range of pointers (as illustrated in FIG. 22), and a more restrictive type of entry to be described below. If the more restrictive type of entry is still able to represent control flow instructions associated with the IDX0 and/or IDX1 pointers, then due to the prevalence of these pointers, replacing a number of the general prediction entries with the more restrictive prediction entries is not anticipated to significantly affect the ability of the prediction circuitry to represent control flow instructions as desired.

Figure 23:
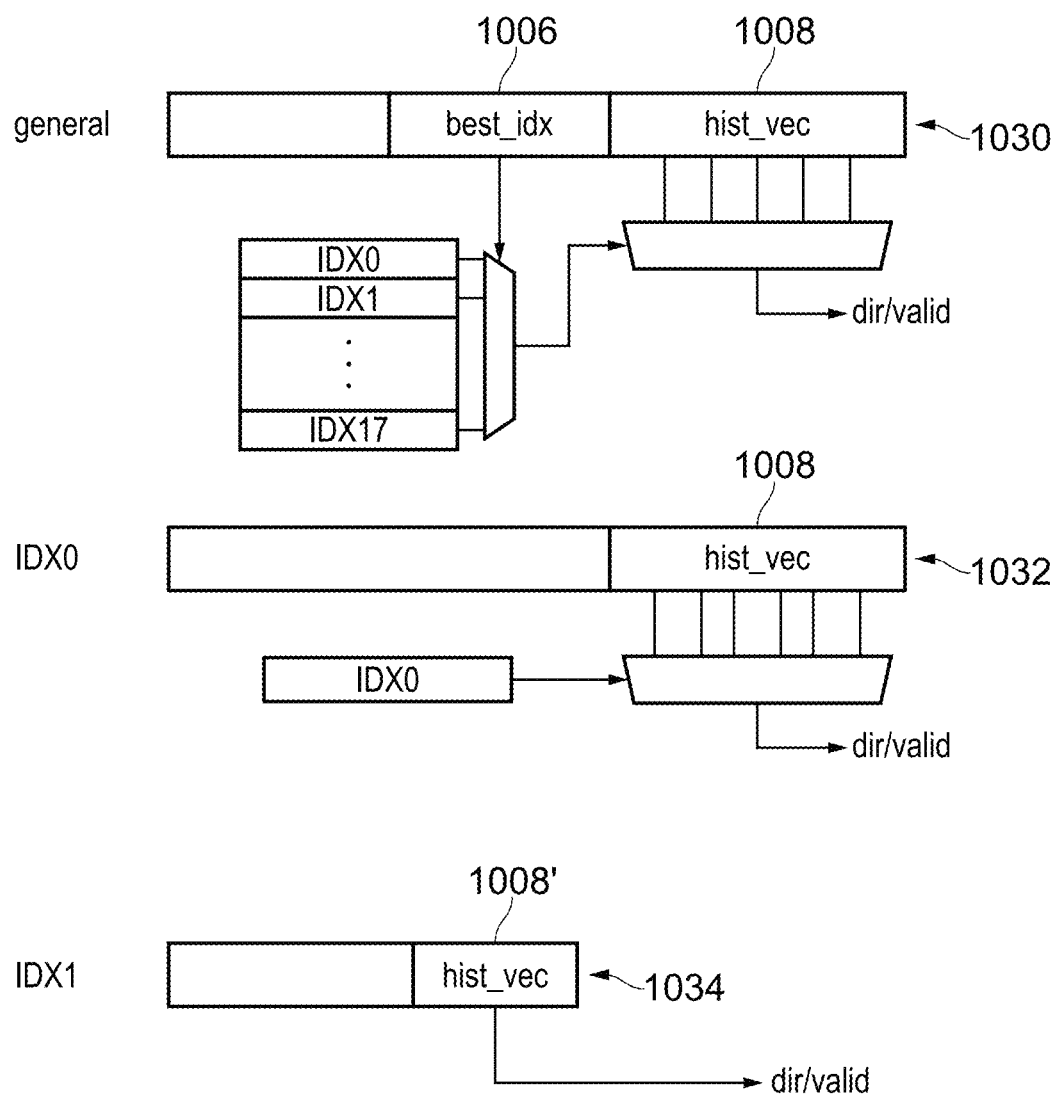
FIGS. 23 and 24 illustrate examples of different types of prediction entry and selection logic which may be provided in prediction circuitry.

FIG. 23 illustrates examples of different types of prediction entry and logic which may be provided in prediction circuitry 665 according to examples of the present technique.

The entry 1030 is a first type of prediction entry, which may also be referred to as a general prediction entry. The general entry 1030 is provided with circuitry enabling it to access a first subset of the pointers of the pointer storage 230, which in the example of FIG. 23 includes all of the pointers (although this does not have to be the case, and in some examples the first subset could exclude for example IDX0 and IDX1). The general entry 1030 illustrated in FIG. 23 is the same as the entry shown in FIG. 22, but certain fields and logic have not been shown for clarity, as this logic is the same for all entries.

The entry 1032 is a further type of entry which is unable to be used to make predictions in respect of particular control flow instructions. The entry 1032 is enabled to be used for control flow instructions having an associated pointer in a further subset of pointers which excludes at least one of the pointers which can be used by the general entry 1030. The entry 1032 is more specifically an entry which includes in its further subset only the pointer IDX0, which is a pointer whose value is incremented upon occurrence of every increment event (the entry 1032 also being referred to as a second type of entry). Although an alternative embodiment will be discussed below with reference to FIG. 24, in the example of FIG. 23 the circuitry associated with the IDX0 entry 1032 is configured to access only the IDX0 pointer from the pointer storage 230. This means that selection circuitry for selecting between the pointers in the pointer storage 230 does not need to be provided for the IDX0 entry 1032, and instead the pointer value of the IDX0 pointer can be directly read out of the pointer storage 230, reducing the power and area overhead associated with routing pointer values for the IDX0 entries 1032 when compared to the general entries 1030. In addition, in some examples the IDX0 entry is unable to be used for control flow instructions other than those having IDX0 as the associated pointer. Therefore, in such examples there is no requirement to provide a field 1006 in the IDX0 entry 1032 identifying the associated pointer, as this can instead be identified from the type of entry. Hence, a more restrictive entry such as the IDX0 entry may have a smaller storage requirement than the general entries 1030, and therefore reduce the storage requirement of the prediction circuitry 665.

The entry 1034 is also a further type of entry. The entry 1034 includes in its further subset of pointers, which can be associated with a control flow instruction identified by the entry, only the pointer IDX1, which is a pointer whose value is never updated and therefore remains a static value (the entry 1034 is referred to elsewhere as a third type of entry). As the IDX1 pointer remains static, it only ever points to one particular element of the behaviour record 1008' of the IDX1 entry. Therefore, there is no requirement to read the IDX1 pointer from the pointer storage 230 when it is known that the associated pointer is IDX1, since this pointer will always have the same value. IDX1 entries therefore do not need to be provided with pointer value routing circuitry or a read port into the pointer storage 230. An IDX1 entry can therefore have significantly reduced area and power requirements than a general entry 1030. Further, as only one element of the behaviour record will be used to store a resolved behaviour, the other elements do not need to be provided in the behaviour record field 1008' of the IDX1 entry 1034. Hence, the IDX1 entry may have a behaviour record comprising only a single element, which is therefore much smaller than the behaviour record of other prediction entries, and can enable a reduction in the storage requirements of the prediction circuitry.

Hence, for prediction circuitry having a given number of prediction entries, making some of that given number of prediction entries prediction entries of a further type can be associated with reductions in power and area cost associated with the prediction circuitry (both from the reduced storage requirements for the prediction circuitry, and the reduced logic required to provide pointer values from pointer storage).

It will be appreciated that while two examples of prediction entries of the further type have been provided in FIG. 23, the technique is not limited to these examples. Other prediction entries could be provided for which the further subset includes a pointer other than IDX0 or IDX1. These prediction entries would also be associated with the advantage of reduced circuitry overhead compared to a general entry 1030, due to the reduction in selection circuitry. The examples herein have been provided with reference to IDX0 and IDX1 since these are the pointers which have been found by the inventors to be most frequently used, and therefore represent good candidates for replacing general entries in the prediction circuitry. IDX1 is also a special case as it does not require a pointer value to be read from the pointer storage 230, and therefore is associated with a particularly large reduction in overhead.

It will also be appreciated that whilst the entry 1030 has been referred to as a "general" entry, and shown to have access to all of the pointer values in FIG. 23, the entry 1030 does not have to be capable of accessing every pointer value. The first subset of pointers with which a control flow instruction identified by the entry 1030 can be associated may exclude, for example, pointers IDX0 and IDX1 which have their own dedicated prediction entries in the example of FIG. 23. The general advantage of reduced circuitry is achieved as long as some of the prediction entries are unable to be used for every pointer.

Whilst the entries IDX0 and IDX1 have further subsets including a single value, there is no reason why prediction entries of the further type cannot be used for more than one pointer. The further type of prediction entry could be able to be used for two or more pointers each requiring a pointer value to be read from the pointer storage 230. In this case, overhead may still be reduced because the entries of the further type do not need to access every pointer in the first subset.

In some examples, the IDX0 entry (or another entry which can access a particular pointer value from the pointer storage 230) may also be used for control flow instructions having the IDX1 pointer as the associated pointer. In this case, the type of entry does not implicitly identify which pointer is the associated pointer, so a parameter may be provided in the encoding of the prediction entry identifying which of IDX0 and IDX1 is the associated pointer. This parameter could be provided using fewer bits than the full associated pointer field 1006, and therefore the prediction entry of the further type could still have a reduced size when compared with the general prediction entry.

Figure 24:
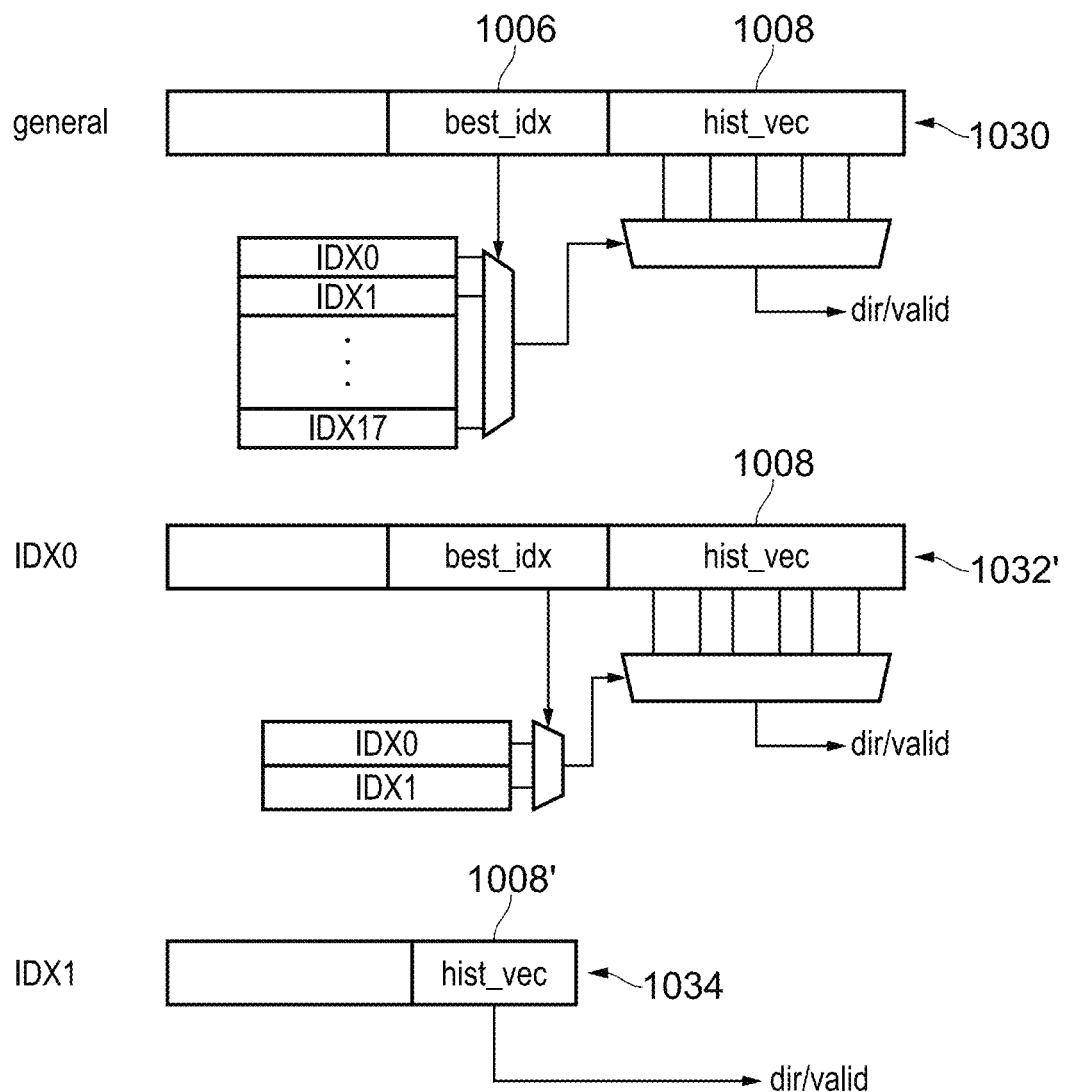

When the associated pointer associated with a shared IDX0/IDX1 entry is IDX1, then in some examples a pointer value is not read from pointer storage 230 (because it has a static value) and the selected element is a particular predetermined element of the behaviour record 1008. The IDX0 entry may be provided with a full behaviour record for use when the associated pointer is IDX0, and the predetermined element could be any one of the elements of the behaviour record. Hence, because a pointer value is not required to be read when the associated pointer is IDX1, the IDX0 entry could be used for either IDX0 or IDX1 control flow instructions without increasing the circuitry required to select a pointer value. However, the specialised circuitry required to identify a predetermined element of the behaviour record when the associated pointer is IDX1 (for example, including storage indicating the predetermined element) may be undesirable. In an alternative example, the prediction circuitry may identify the selected element when the associated pointer is IDX1 in the same way that it would identify the selected element for any other pointer, by using the pointer value stored in the pointer storage 230. Therefore, an IDX0 entry capable of also being used for control flow instructions having IDX1 as the associated pointer may be provided with selection circuitry enabling the entry to select either of the IDX0 or IDX1 pointer value from the pointer storage 230 as illustrated in FIG. 24. In this case, as with other examples where the full range of pointers is excluded, overhead can be reduced as a result of reducing the amount of selection circuitry which is provided to select a pointer value from pointer storage 230 (in addition to enabling smaller prediction entries which only need to specify the associated pointer from a smaller set of pointers).

Figure 25:
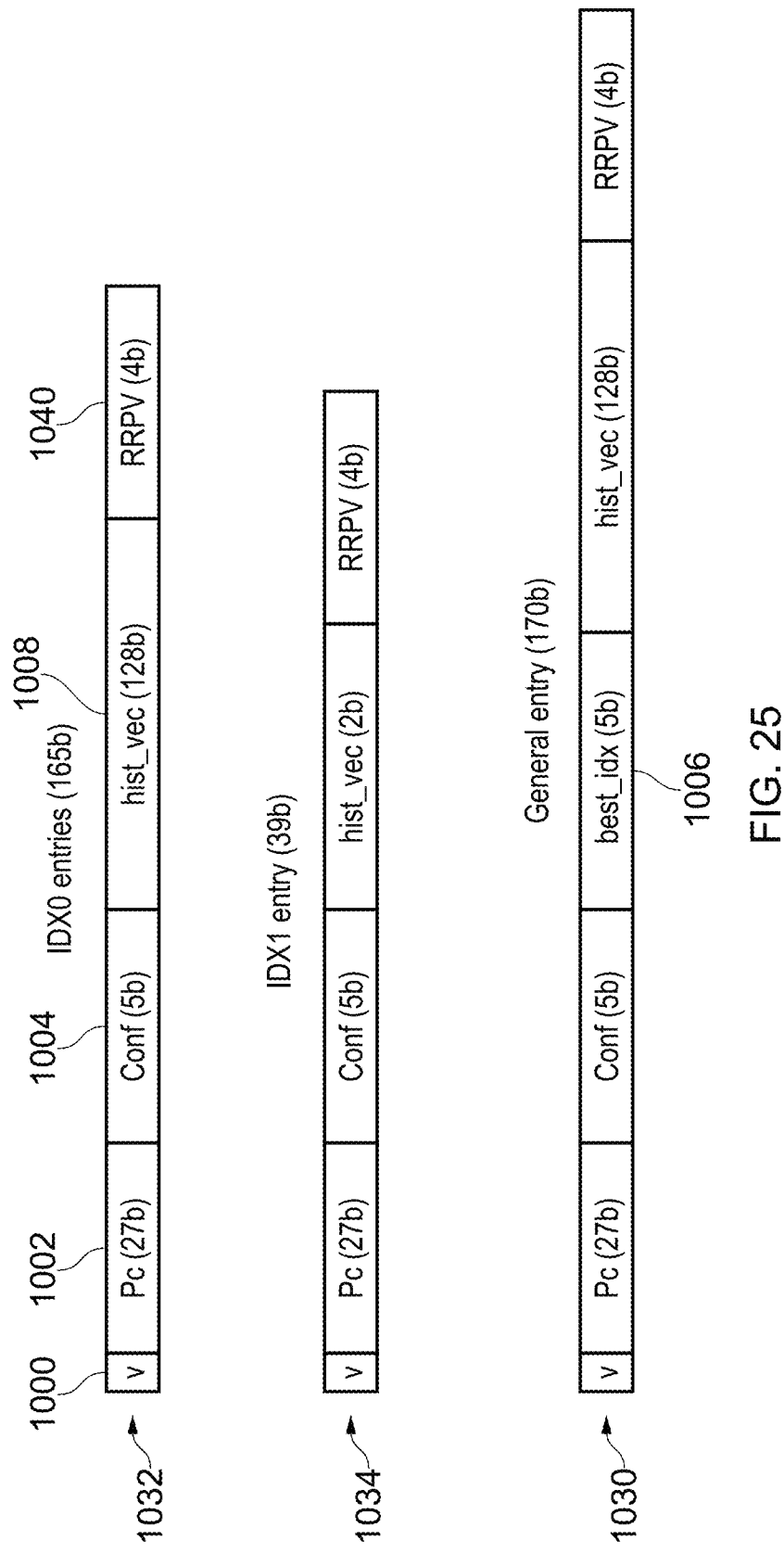
FIG. 25 schematically illustrates encodings of different example prediction entries.

FIG. 25 schematically illustrates encodings of different example prediction entries. The fields in the prediction entries illustrated in FIG. 25 correspond to the fields indicated in FIGS. 22-24, except for an additional field "RRPV". The RRPV field 1040, or Re-Reference Prediction Value field, is a field corresponding to a particular cache replacement policy implemented for the prediction circuitry 665. If a prediction entry is to be evicted from the prediction circuitry, then the victim entry may be selected on the basis of the RRPV values. The RRPV value may be set high on allocation but may be reset to a lower value whenever the cache line is reused and may be increased periodically. The cache line having the highest RRPV value may be selected for eviction, so that more frequently reused cache lines are retained in the cache. It will be appreciated that this is merely one example of a cache replacement policy, and other policies could be used to select which prediction entry is to be evicted. Some policies do not require any cache replacement bits to be provided in the entries at all (e.g., if an entry is evicted at random), so these bits may not be provided in the encoding of the prediction entries.

FIG. 25 illustrates the difference in size of different prediction entries when certain prediction entries are not enabled to be used for every pointer. For example, a general entry 1030 in one example is able to be used for any pointer, and therefore has a full associated pointer field 1006 (for identifying any one of the pointers) and a full behaviour record 1008. It will be appreciated that the exact values for the size of the fields in FIG. 25 are merely examples, and can vary based on implementation, although the principles discussed below apply in the same way. For example, the use of 27 bits for the control flow instruction indication field 1002 suggests that partial tagging of memory is used, although this is not required.

An IDX0 entry may not provide an associated pointer field if it is unable to be used for any pointers other than IDX0, and therefore can be 5 bits smaller in the example of FIG. 25 where 5 bits are used for the field 1006. In some examples, the IDX0 entry may also be used for IDX1, and therefore one bit could be used to differentiate between IDX0 and IDX1, but this would still allow the IDX0 entries 1032 to be smaller than the general entries 1030.

As with the IDX0 entry, the IDX1 entry may also exclude the associated pointer field 1006, as the circuitry for making a prediction based on the IDX1 entry is not required to select a pointer value from pointer storage 230. In addition, the behaviour record for the IDX1 entry can be made significantly smaller than the behaviour record for an IDX0 or general entry. As discussed above, the IDX1 behaviour record need only store a single element comprising a taken/not taken indication and a validity indication, which can be provided in as little as 2 bits. In comparison, other entries may provide full behaviour records comprising, for example, 64 elements enabling 64 instances of observed behaviour to be recorded, requiring significantly more storage than the IDX1 prediction entries.

It will be appreciated that the encodings shown in FIG. 25 are merely an example to illustrate the potential storage improvements that can be achieved using different types of prediction entry. The individual fields described could of course include different numbers of bits, and in a different arrangement.

Figure 26:
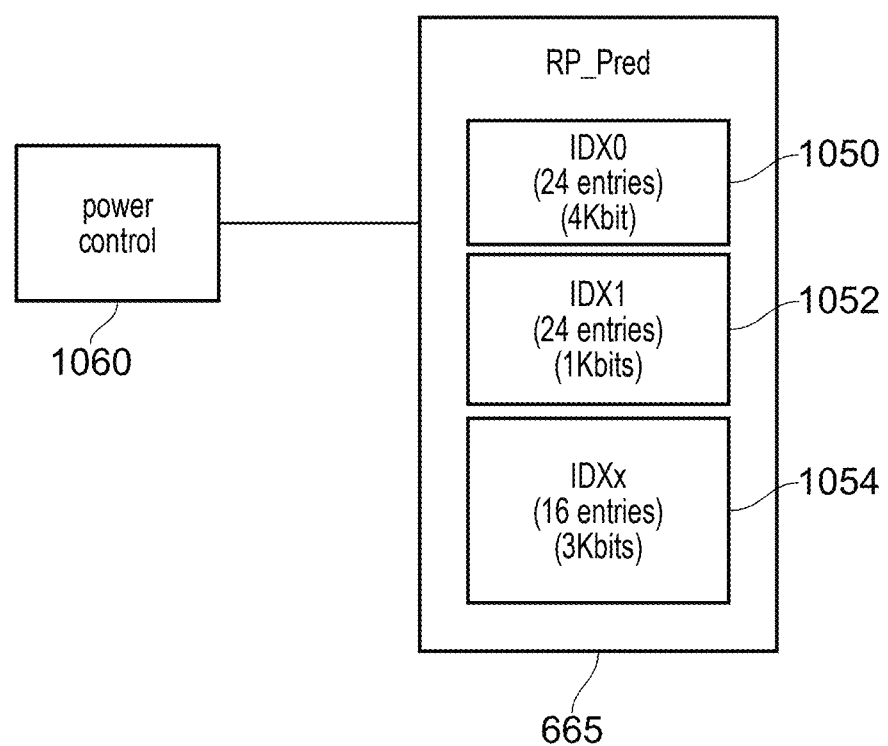
FIG. 26 illustrates prediction circuitry according to an example of the present technique.

FIG. 26 illustrates prediction circuitry 665 according to an example of the present technique. The prediction circuitry 665 of FIG. 26 comprises 64 prediction entries of the different types illustrated in FIG. 25.

Based on the anticipated frequency of control flow instructions associated with each type of pointer, the 64 prediction entries in one example include 24 IDX0 entries, 24 IDX1 entries, and 16 general entries. It will be appreciated that this number and distribution of entries is only one example, but the advantages of the present technique apply with different selections of prediction entries. This selection of entries would in one example have a total storage requirement of around 7.6 Kb if entries having encodings shown in FIG. 25 were used (as discussed, since different sizes of entries could be used the total size of each partition could vary). In comparison, if each of the 64 entries were general entries then the storage requirement would be around 10.9 Kb. Hence, it can be seen that the storage requirement for the prediction circuitry can be reduced by around 30%. This reduction is achievable without significantly impacting performance. Even if all of the entries were general entries, a significant number of those general entries would be used for the IDX0 and IDX1 pointers anyway based on the prevalence of the IDX0 and IDX1 pointers. For example, if half of the prediction entries are associated with IDX0 or IDX1 pointers anyway, then accommodating those entries using reduced overhead entries of the further type rather than general entries means that overall overhead can be reduced by reducing the number of general entries without reducing the capability of the prediction circuitry. Reducing the capability of certain entries to access other types of pointer when those entries would typically be used for a particular type of pointer is therefore less likely to negatively impact performance.

As illustrated in FIG. 26, the different types of entry may be provided in partitions including an IDX0 partition 1050, and IDX1 partition 1052, and an IDXx (or general) partition 1054. Although shown as contiguous partitions, this may not be required.

Allocation of control flow instructions into prediction entries on promotion from the training circuitry can be performed based on which type of pointer is the associated pointer identified by the training circuitry for that control flow instruction. For example, instructions associated with the IDX1 pointer may be preferentially allocated to the IDX1 partition (leaving the IDX0 and IDXx entries for other control flow instructions which could not be allocated to the IDX1 partition). Likewise, control flow instructions having an associated pointer of IDX0 may be preferentially allocated to the IDX0 partition. Control flow instructions having an associated pointer other than IDX0 and IDX1 must be allocated to the IDXx partition, as the IDX0 and IDX1 partitions lack the circuitry to select the correct pointer value from the pointer storage 230 if that pointer is not IDX0 or IDX1. If the IDX1 partition is full, a control flow instruction having an associated IDX1 pointer may be allocated to the IDX0 partition as a next preference (assuming the variant of IDX0 entry shown in FIG. 24 is used), and finally to the IDXx partition if both IDX1 and IDX0 are full. Similarly, the IDX0 partition may overflow into the IDXx partition (no control flow instructions other than those associated with the IDX1 pointer can use the IDX1 partition as the IDX1 entries have a truncated behaviour record with a single element and lack pointer value routing circuitry).

In some workloads, IDX0 and/or IDX1 pointers may be so common that very few or no control flow instructions are associated with any other pointer. Hence, in some workloads partitions (primarily IDXx but possibly IDX0 or IDX1) may be entirely or largely empty. In these examples, power can be further reduced by placing those partitions in a lower power mode. Hence, power control circuitry 1060 may be provided which is responsive to trigger events to control the power mode of partitions of prediction entries. For example, a partition may be placed in a lower power mode in response to a determination that a particular partition has less than a threshold number of active entries and placed in a higher power mode in response to a determination that a control flow instruction is to be allocated to a partition in a lower power mode.

Figure 27:
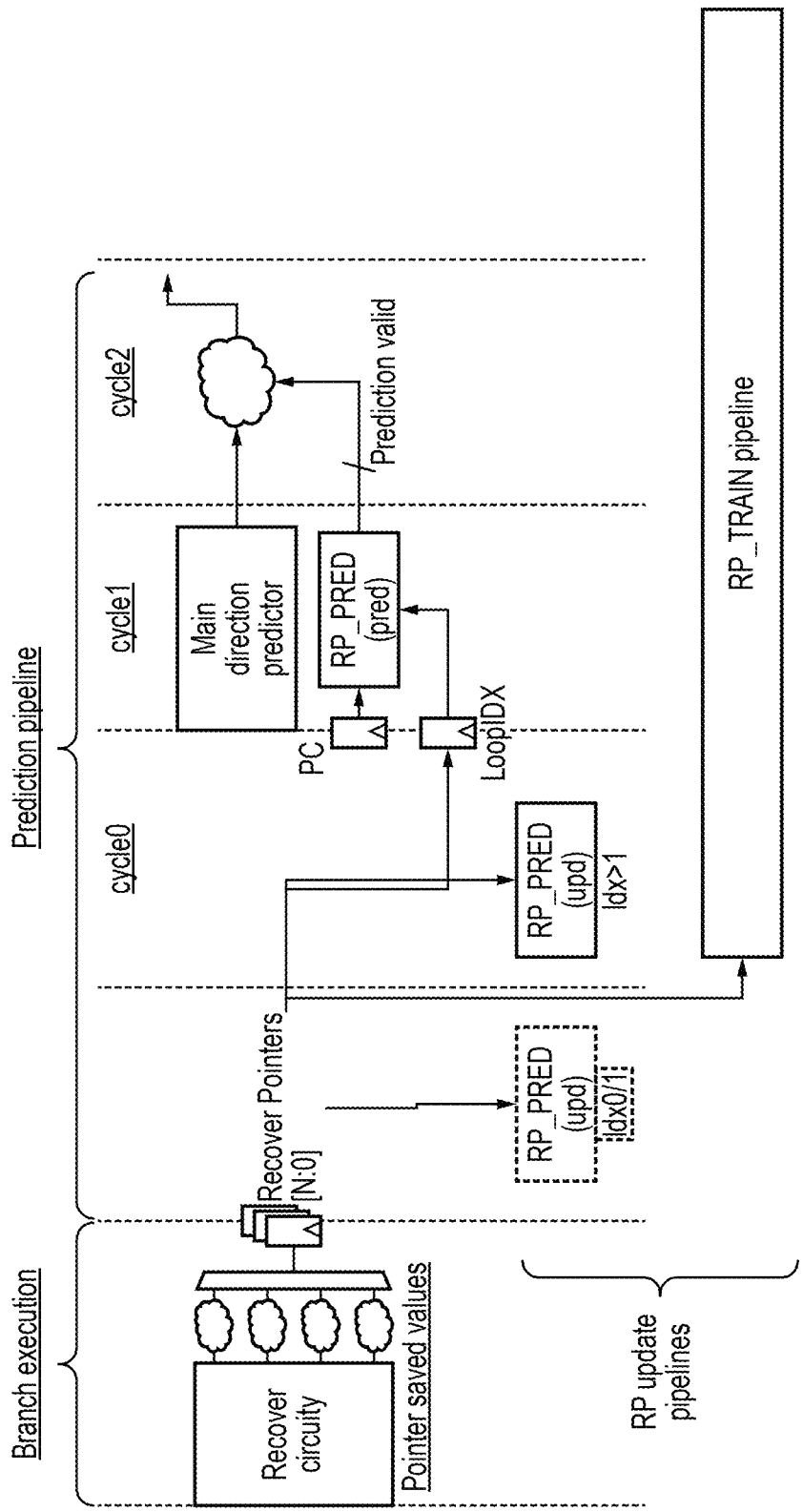
FIG. 27 is a timing diagram for prediction circuitry.

FIG. 27 is a timing diagram for prediction circuitry illustrating processing cycles following a resolved behaviour being observed in which a prediction entry is updated and a prediction is made.

When updating a prediction entry using a resolved behaviour of an instance of the control flow instruction, a particular element of the behaviour record which is to be updated is selected. Hence, entries typically access pointer storage 230 during an update. In an example of prediction circuitry in which each entry is able to access any pointer value, the large amount of accesses and hence congestion could cause delays accessing the pointer storage which could mean that updates can be delayed by up to a cycle (in the example of FIG. 27, these updates may be delayed to cycle 0 following the resolved behaviour becoming available at the end of cycle −2).

Certain prediction entries do not suffer as much from congestion. For example, IDX1 entries do not access pointer storage at all, and IDX0 entries may directly read a pointer value without making a selection. For these prediction entries, the update circuitry may perform the update in an earlier cycle than the update is performed for other types of prediction entry such as the IDXx entries. For example, FIG. 27 illustrates the update for IDX0 and IDX1 entries being performed in an earlier cycle than the update for IDX>1 entries. By performing the update for certain prediction entries earlier, performance can be improved. In addition, the burden of meeting the timing requirements for the general entries is reduced because there are fewer general entries which need to access the pointer values in a given cycle, making it easier to meet timing requirements for these entries too.

In addition, by providing prediction entries which are unable to access all of the pointers, overall congestion can be decreased. Less congestion means that pointer values may be read quicker. In some cases, this can allow update for all of the entries (when those entries include a mix of different types of entry) to be moved to an earlier cycle than if the entries were all general entries. Although this is not shown in FIG. 27, for example all of the update could take place in the cycle indicated as the IDX0/1 update cycle in FIG. 27. Hence, the provision of more than one type of entry can enable improved update performance.

Similar considerations apply to the use of prediction entries for making a prediction. As pointer storage is also accessed when making a prediction, then the reduced congestion associated with providing different types of prediction entry can enable predictions in respect of either a subset of the entries (the IDX0 and IDX1 entries) or all of the entries to be moved to an earlier processing cycle than if all entries were general entries.

Figure 28:
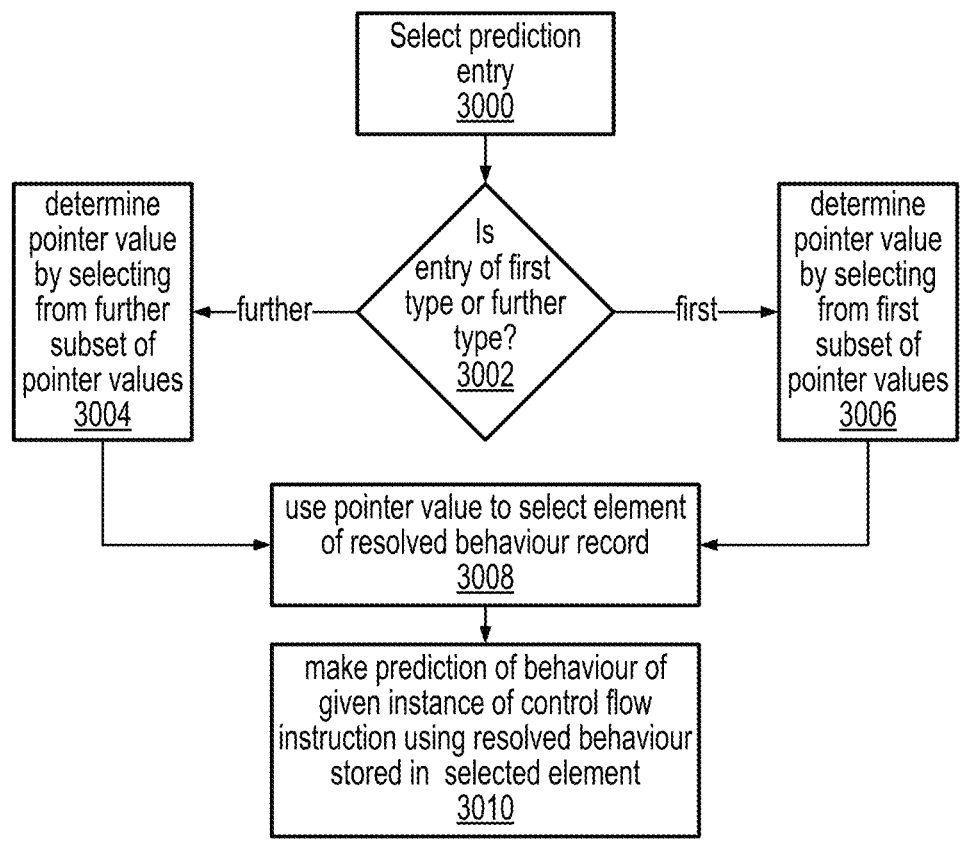
FIGS. 28 and 29 are flow diagrams illustrating methods of using prediction entries of more than one type to make a prediction of the behaviour of a given instance of a control flow instruction.

FIG. 28 is a flow diagram illustrating a method of using prediction entries of more than one type to make a prediction of the behaviour of a given instance of a control flow instruction. At step 3000, a prediction entry is selected based on a comparison of the address of the branch to be predicted and an address of the control flow instruction indicated in each prediction entry (e.g., as described with reference to the comparison logic 1012 of FIG. 22).

If the selected prediction entry is a prediction entry of the first type, then at step 3006 a pointer value is determined by selecting a pointer value from pointer storage 230 based on the associated pointer associated with the control flow instruction indicated by the matching entry of the prediction circuitry. The associated pointer is specified from among a first subset of pointers.

If instead the selected prediction entry is a prediction entry of the further type, then at step 3004 a pointer value is determined from among the pointer values of a further subset of pointers excluding at least one of the pointers in the first subset. In some examples the pointer value associated with the prediction entry of the further type may not be read from pointer storage, but may be determined implicitly based on an entry type (e.g., if the entry is IDX1 then a pointer value is known to have a static value).

In any case, once a pointer value has been determined the pointer value is used to select an element of the behaviour record stored in the selected prediction entry at step 3008. Then, at step 3010, as long as there is a valid resolved behaviour stored in the selected element, and a high enough confidence in the entry is indicated, the resolved behaviour stored in the selected element may be used to make a prediction in respect of the given instance of the control flow instruction, enabling an accurate branch direction prediction to be made on the basis of replayed speculative instructions.

Figure 29:
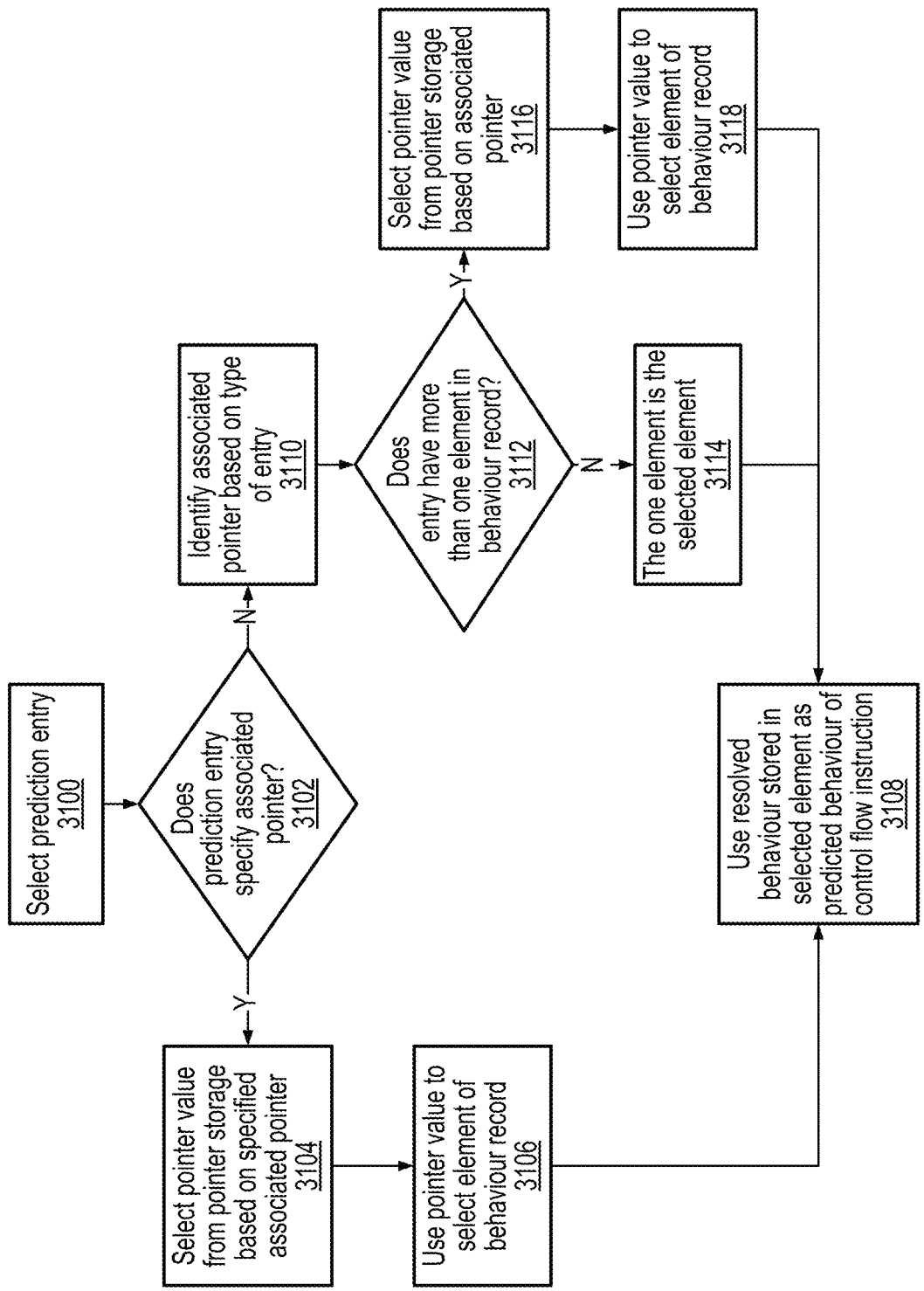

FIG. 29 is a flow diagram illustrating a method of using prediction entries of more than one type to make a prediction of the behaviour of a given instance of a control flow instruction. FIG. 29 focusses on how a pointer value is selected (i.e., expanding on steps 3004 and 3006 of FIG. 28).

Step 3100 is the same as step 3000 of FIG. 28. At step 3102 it is determined whether the selected prediction entry specifies an associated pointer.

If the prediction entry does specify an associated pointer, then at step 3104 the identification of the specified pointer is used to select a pointer value from the pointer storage 230 (as illustrated in FIG. 22, for example). The pointer value can then be used to select an element of the behaviour record (step 3106) which can be used to make a prediction (step 3108).

If, however, the prediction entry does not specify an associated pointer, then at step 3110 the associated pointer is identified based on the type of entry. If there is only one element in the behaviour record (step 3112) then that one element is the selected element (step 3114). This will be the case for IDX1 entries, for example. If there is more than one element in the behaviour record then a pointer value is selected from the pointer storage based on the type of entry. For example, for an IDX0 entry the IDX0 pointer may selected without being specified by the prediction entry. The selected element may then be selected based on the pointer value (step 3118) and used to make a prediction for the instance of the control flow instruction (step 3108).

It will be appreciated that whilst FIG. 29 illustrates a series of determinations, in practice the method may not step through each determination explicitly. For example, if the selected element is an IDX1 entry, the prediction will be output based on the sole element in the behaviour record without explicitly checking how many elements are in the behaviour record. The flow diagram of FIG. 29 logically illustrates how a selected element is determined for different types of entry rather than illustrating a process which prediction circuitry goes through in practice to determine a selected element.

Figure 30:
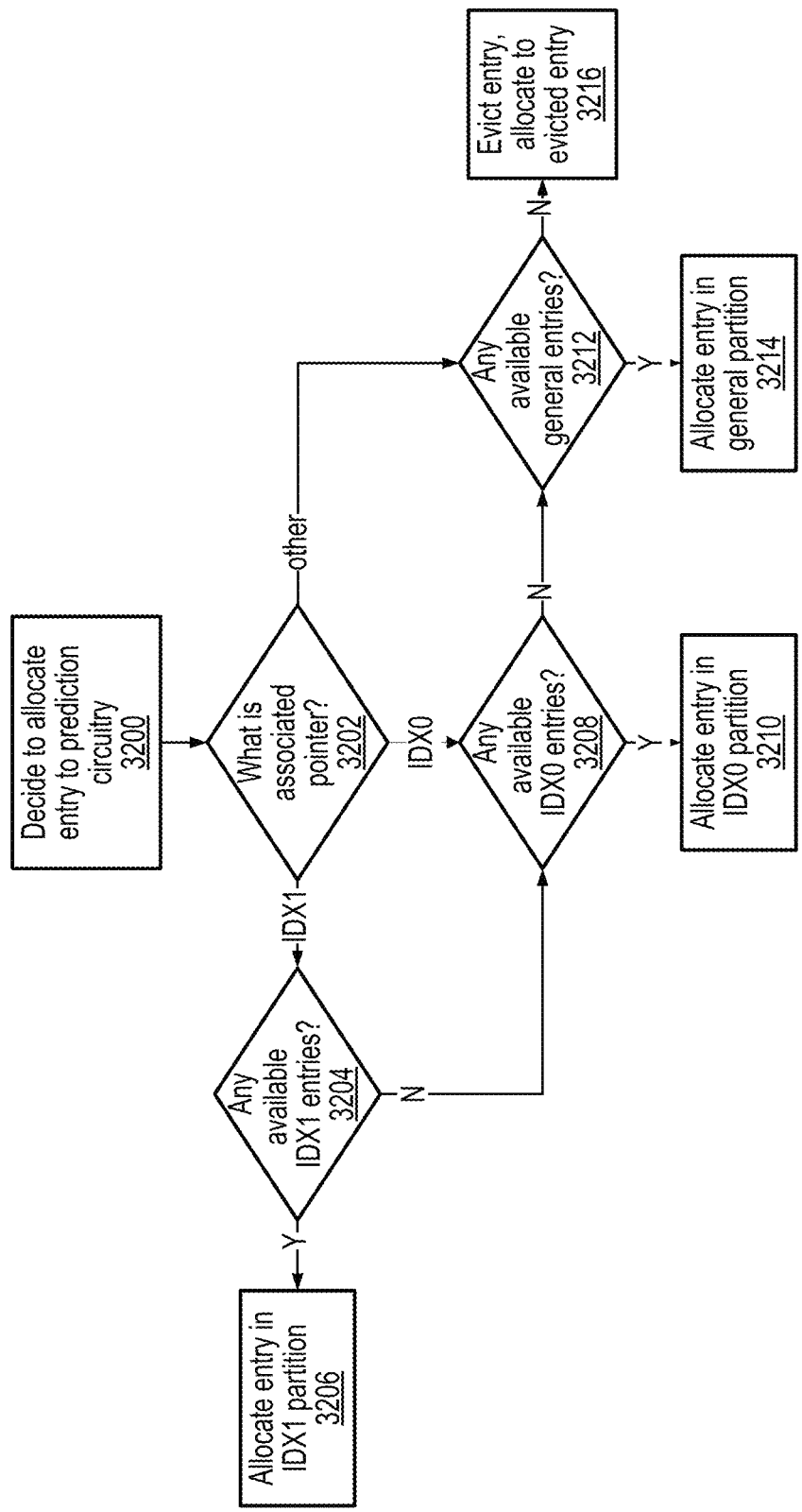
FIG. 30 is a flow diagram illustrating a method of allocating a control flow instruction to a prediction entry of prediction circuitry.

FIG. 30 is a flow diagram illustrating a method of allocating a control flow instruction to a prediction entry of prediction circuitry. At step 3200 allocation circuitry determines that a control flow instruction is to be promoted from the training circuitry to the prediction circuitry. At step 3202 it is determined what pointer the training circuitry has identified as the associated pointer for the given control flow instruction to be allocated. If the associated pointer is IDX1, then it is determined at step 3204 whether there are any available IDX1 entries in the prediction circuitry and if so then the control flow instruction is allocated to an IDX1 entry at step 3206.

If there is not an available IDX1 entry, then it is determined whether there are any IDX0 entries into which the IDX1 partition can overflow at step 3208. If so, then the control flow instruction is allocated into an IDX0 entry at step 3210. If not, then it is determined at step 3212 whether there are any general entries available and if so the control flow instruction is allocated to a general entry at step 3214. If there are no entries at all available, then at step 3216 an entry may be victimised (e.g., based on RRPV bits associated with each entry) and the control flow instruction allocated to the newly available entry. In some examples, if there are no available entries then instead the control flow instruction may not be allocated to any entry of the prediction circuitry.

If the control flow instruction to be allocated is associated with an IDX0 pointer then from step 3202 the process moves to step 3208 and proceeds as described previously.

If the control flow instruction to be allocated is associated with a pointer other than IDX0 or IDX1, then the process moves from step 3202 to step 3212 and proceeds as described previously.

Although not shown in FIG. 30, if it is determined that a particular partition does not have any available entries then rather than overflowing into a different partition, an entry of that partition may instead be evicted to make space for the control flow instruction to be allocated a prediction entry in that partition.

It will be appreciated that whilst FIG. 30 describes allocation with respect to IDX0 and IDX1 entries, the concept is applicable more broadly to partitions of different types of entry where one partition can accommodate control flow instructions which are preferentially allocated to a different partition.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 31:
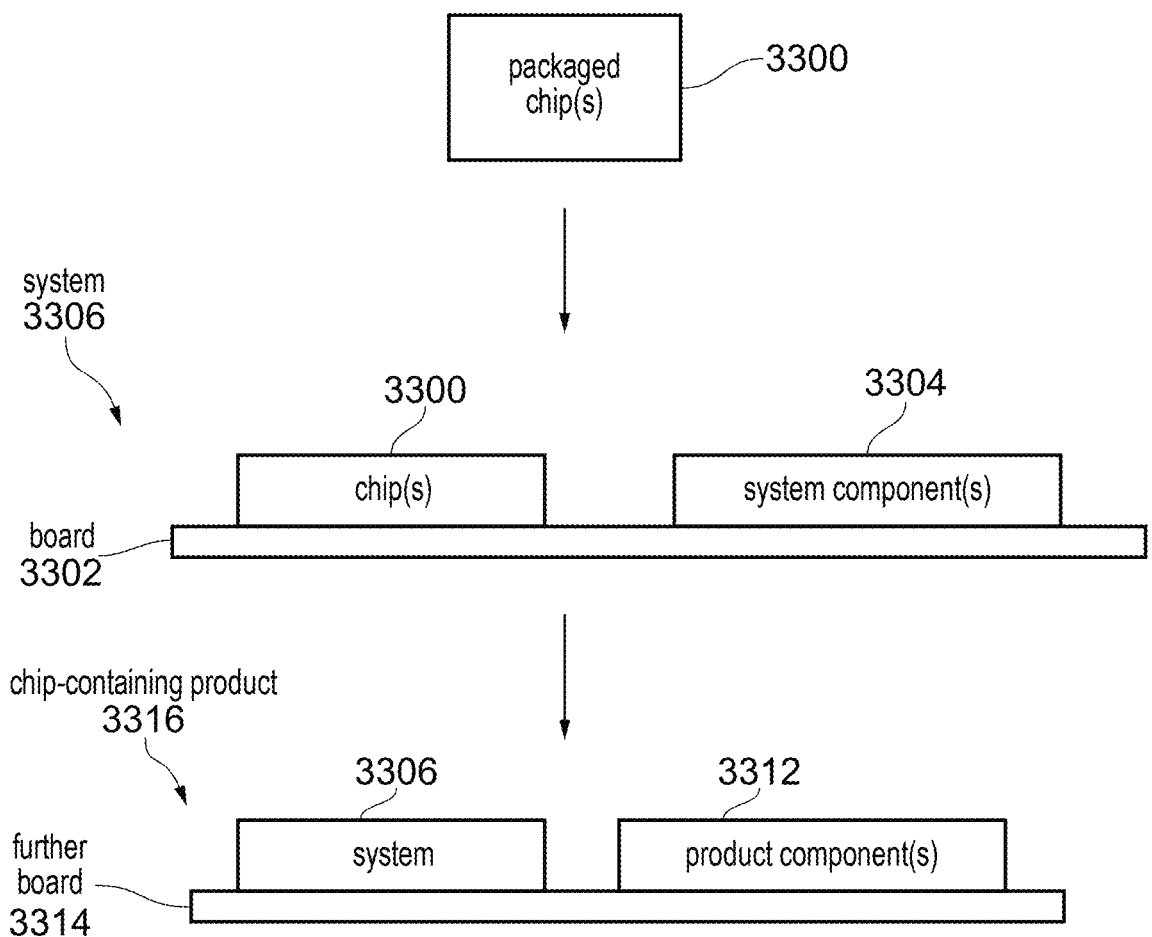
FIG. 31 illustrates a system and a chip-containing product.

As shown in FIG. 31, one or more packaged chips 3300, with the apparatus described above implemented on one chip or distributed over two or more of the chips, are manufactured by a semiconductor chip manufacturer. In some examples, the chip product 3300 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 3300 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. chips which are combined together to provide the functionality of a single chip and appearing as a single chip from an external perspective) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 3300 are assembled on a board 3302 together with at least one system component 3304 to provide a system 3306. For example, the board may comprise a printed circuit board. The board substrate may be made of any of a variety of materials, e.g. plastic, glass, ceramic, or a flexible substrate material such as paper, plastic or textile material. The at least one system component 3304 comprise one or more external components which are not part of the one or more packaged chip(s) 3300. For example, the at least one system component 3304 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 3316 is manufactured comprising the system 3306 (including the board 3302, the one or more chips 3300 and the at least one system component 3304) and one or more product components 3312. The product components 3312 comprise one or more further components which are not part of the system 3306. As a non-exhaustive list of examples, the one or more product components 3312 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 3306 and one or more product components 3312 may be assembled on to a further board 3314.

The board 3302 or the further board 3314 may be provided on or within a device housing or other structural support (e.g. a frame or blade) to provide a product which can be handled by a user and/or is intended for operational use by a person or company.

The system 3306 or the chip-containing product 3316 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus comprising:
pointer storage configured to store pointer values for a plurality of pointers;
increment circuitry, responsive to a series of increment events, to differentially increment the pointer values of the pointers; and
prediction circuitry configured to maintain a plurality of prediction entries, each prediction entry arranged to identify a control flow instruction with an associated pointer from the plurality of pointers, and a behaviour record comprising at least one element, wherein a valid element of the behaviour record comprises an indication of a resolved behaviour of an instance of the control flow instruction identified by the prediction entry; wherein
the prediction circuitry is responsive to replay of a given instance of a given control flow instruction identified by a given prediction entry of the prediction circuitry, to use the resolved behaviour stored in a selected element of the behaviour record of the given prediction entry as the predicted behaviour of the given instance of the given control flow instruction, wherein the selected element is dependent on a pointer value of the associated pointer; and
the plurality of prediction entries comprises:
at least one prediction entry of a first type, wherein the prediction circuitry is enabled to use each prediction entry of the first type to identify any given control flow instruction whose associated pointer is within a first subset of the plurality of pointers; and
at least one prediction entry of at least one further type, wherein the prediction circuitry is enabled to use each prediction entry of the at least one further type to identify any given control flow instruction whose associated pointer is within a further subset of the plurality of pointers that excludes at least one pointer of the first subset.

(2) The apparatus according to clause 1, comprising pointer value routing circuitry arranged to route a pointer value from the pointer storage to the prediction circuitry for making a prediction in respect of a chosen prediction entry; wherein
the pointer value routing circuitry comprises first pointer value routing circuitry arranged to route to the prediction circuitry a pointer value associated with any pointer of the first subset of pointers, the first pointer value routing circuitry being employed when the chosen prediction entry is a prediction entry of the first type, and further pointer value routing circuitry arranged to route to the prediction circuitry a pointer value associated with at least one pointer of the further subset of pointers, the further pointer value routing circuitry being employed when the chosen prediction entry is a prediction entry of a given further type.

(3) The apparatus according to clause 2, wherein
the further pointer value routing circuitry associated with a prediction entry of the given further type is arranged to directly read the pointer value of the associated pointer from the pointer storage without making a selection between pointer values.

(4) The apparatus according to any preceding clause, wherein
each prediction entry of the first type is arranged to specify the associated pointer.

(5) The apparatus according to any preceding clause, wherein
at least one prediction entry of the at least one further type is arranged to identify the associated pointer based on an entry type.

(6) The apparatus according to any preceding clause, wherein the at least one prediction entry of the at least one further type comprises a prediction entry of a second type, and the further subset for the prediction entry of the second type comprises an incremented-each-event pointer for which the pointer value is incremented in response to each increment event.

(7) The apparatus according to clause 6, wherein the further subset for the prediction entry of the second type comprises a never-updated pointer for which the pointer value is not updated in response to any of the series of increment events.

(8) The apparatus according to any preceding clause, wherein the at least one prediction entry of the at least one further type comprises a prediction entry of a third type, and the further subset for the prediction entry of the third type comprises a never-updated pointer for which the pointer value is not updated in response to any of the series of increment events.

(9) The apparatus according to clause 8, wherein the behaviour record associated with a control flow instruction identified by the prediction entry of the third type comprises a single element which is the selected element.

(10) The apparatus according to any preceding clause, wherein
the first subset of the plurality of pointers comprises the further subset of the plurality of pointers.

(11) The apparatus according to any preceding clause, comprising allocation circuitry configured to allocate a control flow instruction to the plurality of prediction entries;
wherein the allocation circuitry is configured to allocate a control flow instruction, having an associated pointer which is in both the first subset and the further subset, to a selected prediction entry chosen from amongst the first type and the at least one further type.

(12) The apparatus according to clause 11, wherein
the allocation circuitry is configured to preferentially choose as the selected prediction entry a free prediction entry of the at least one further type.

(13) The apparatus according to any preceding clause, wherein
the plurality of prediction entries comprises a fixed number of prediction entries of each type.

(14) The apparatus according to any preceding clause, comprising power control circuitry, wherein:

the prediction circuitry comprises multiple partitions each for storing a respective type of prediction entry; and the power control circuitry is responsive to one or more power trigger events to separately control a power mode of each partition.

(15) The apparatus according to any preceding clause, comprising training circuitry comprising tracker circuitry to maintain a plurality of tracker entries each associated with a control flow instruction, the training circuitry arranged, for a given control flow instruction identified in a given tracker entry, to perform a training process to seek to determine, as the associated pointer for the given control flow instruction, a pointer from amongst the plurality of pointers whose pointer value increments in a manner that meets a correlation threshold with occurrence of instances of the given control flow instruction; and promotion circuitry, responsive to detection of the correlation threshold being met for the given control flow instruction, to allocate a prediction entry within the prediction circuitry to identify the given control flow instruction and the associated pointer, and to establish within the prediction entry the behaviour record.

(16) The apparatus according to clause 15, comprising cache circuitry to maintain a plurality of cache entries, each cache entry to store a resolved behaviour of an instance of a control flow instruction identified by a tracker entry of the tracker circuitry along with an associated tag value generated in dependence on a chosen pointer when the resolved behaviour was allocated into that cache entry.

(17) The apparatus according to any preceding clause, comprising update circuitry configured to update a prediction entry identifying a given control flow instruction in response to a resolved behaviour event identifying a resolved behaviour for one or more subsequently observed instances of the given control flow instruction; wherein the update circuitry is configured to update a prediction entry of the at least one further type within fewer clock cycles following the resolved behaviour event than the update circuitry is configured to update a prediction entry of the first type.

(18) A method of predicting behaviour of control flow instructions, comprising:

maintaining pointer values for a plurality of pointers and, responsive to a series of increment events, differentially incrementing pointer values of the pointers;

employing prediction circuitry to maintain a plurality of prediction entries, each prediction entry arranged to identify a control flow instruction with an associated pointer from the plurality of pointers, and a behaviour record comprising at least one element, wherein a valid element of the behaviour record comprises an indication of a resolved behaviour of an instance of the control flow instruction identified by the prediction entry; and responsive to replay of a given instance of a given control flow instruction identified by a given prediction entry of the prediction circuitry, using the resolved behaviour stored in a selected element of the behaviour record of the given prediction entry as the predicted behaviour of the given instance of the given control flow instruction, wherein the selected element is dependent on a pointer value of the associated pointer; wherein the plurality of prediction entries comprises:

at least one prediction entry of a first type, wherein the prediction circuitry is enabled to use each prediction entry of the first type to identify any given control flow instruction whose associated pointer is within a first subset of the plurality of pointers; and at least one prediction entry of at least one further type, wherein the prediction circuitry is enabled to use each prediction entry of the at least one further type to identify any given control flow instruction whose associated pointer is within a further subset of the plurality of pointers that excludes at least one pointer of the first subset.

(19) A non-transitory computer-readable medium to store computer-readable code for fabrication of a data processing apparatus comprising:

pointer storage configured to store pointer values for a plurality of pointers;

increment circuitry, responsive to a series of increment events, to differentially increment the pointer values of the pointers; and prediction circuitry configured to maintain a plurality of prediction entries, each prediction entry arranged to identify a control flow instruction with an associated pointer from the plurality of pointers, and a behaviour record comprising at least one element, wherein a valid element of the behaviour record comprises an indication of a resolved behaviour of an instance of the control flow instruction identified by the prediction entry; wherein the prediction circuitry is responsive to replay of a given instance of a given control flow instruction identified by a given prediction entry of the prediction circuitry, to use the resolved behaviour stored in a selected element of the behaviour record of the given prediction entry as the predicted behaviour of the given instance of the given control flow instruction, wherein the selected element is dependent on a pointer value of the associated pointer; and the plurality of prediction entries comprises:

at least one prediction entry of a first type, wherein the prediction circuitry is enabled to use each prediction entry of the first type to identify any given control flow instruction whose associated pointer is within a first subset of the plurality of pointers; and at least one prediction entry of at least one further type, wherein the prediction circuitry is enabled to use each prediction entry of the at least one further type to identify any given control flow instruction whose associated pointer is within a further subset of the plurality of pointers that excludes at least one pointer of the first subset.

(20) A system comprising:

the apparatus according to clause 1, implemented in at least one packaged chip;

at least one system component; and a board, wherein the at least one packaged chip and the at least one system component are assembled on the board.

(21) A chip-containing product comprising the system according to clause 20, assembled on a further board with at least one other product component.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
pointer storage configured to store pointer values for a plurality of pointers;
increment circuitry, responsive to a series of increment events, to differentially increment the pointer values of the pointers;
prediction circuitry configured to maintain a plurality of prediction entries, each prediction entry arranged to identify a control flow instruction with an associated pointer from the plurality of pointers, and a behaviour record comprising at least one element, wherein a valid element of the behaviour record comprises an indication of a resolved behaviour of an instance of the control flow instruction identified by the prediction entry; and
training circuitry configured to perform a training process to seek to determine from among the plurality of pointers a given pointer, to be associated with a given control flow instruction identified by a given prediction entry of the prediction circuitry, where a pointer value of the given pointer increments in a manner that meets a correlation threshold with occurrence of instances of the given control flow instruction; wherein
the prediction circuitry is responsive to replay of a given instance of the given control flow instruction identified by the given prediction entry of the prediction circuitry, to use the resolved behaviour stored in a selected element of the behaviour record of the given prediction entry as the predicted behaviour of the given instance of the given control flow instruction, wherein the selected element is dependent on the pointer value of the given pointer; and
the plurality of prediction entries comprises:
at least one prediction entry of a first type, wherein the prediction circuitry is enabled to use each prediction entry of the first type to identify a control flow instruction whose associated pointer is within a first subset of the plurality of pointers; and
at least one prediction entry of at least one further type, wherein the prediction circuitry is enabled to use each prediction entry of the at least one further type to identify a control flow instruction whose associated pointer is within a further subset of the plurality of pointers that excludes at least one pointer of the first subset.

2. The apparatus according to claim 1, comprising pointer value routing circuitry arranged to route a pointer value from the pointer storage to the prediction circuitry for making a prediction in respect of a chosen prediction entry; wherein
the pointer value routing circuitry comprises first pointer value routing circuitry arranged to route to the prediction circuitry a pointer value associated with any pointer of the first subset of pointers, the first pointer value routing circuitry being employed when the chosen prediction entry is a prediction entry of the first type, and further pointer value routing circuitry arranged to route to the prediction circuitry a further pointer value associated with at least one pointer of the further subset of pointers, the further pointer value routing circuitry being employed when the chosen prediction entry is a prediction entry of a given further type.

3. The apparatus according to claim 2, wherein
the further pointer value routing circuitry associated with a prediction entry of the given further type is arranged to directly read the further pointer value pointer from the pointer storage without making a selection between pointer values.

4. The apparatus according to claim 1, wherein
each prediction entry of the first type is arranged to specify the associated pointer.

5. The apparatus according to claim 1, wherein
at least one prediction entry of the at least one further type is arranged to identify the associated pointer based on an entry type.

6. The apparatus according to claim 1, wherein the at least one prediction entry of the at least one further type comprises a prediction entry of a second type, and the further subset for the prediction entry of the second type comprises an incremented-each-event pointer, where a pointer value of the incremented-each-event pointer is incremented in response to each increment event.

7. The apparatus according to claim 6, wherein the further subset for the prediction entry of the second type comprises a never-updated pointer, where a pointer value of the never-updated pointer is not updated in response to any of the series of increment events.

8. The apparatus according to claim 1, wherein the at least one prediction entry of the at least one further type comprises a prediction entry of a third type, and the further subset for the prediction entry of the third type comprises a never-updated pointer, where a pointer value of the never-updated pointer is not updated in response to any of the series of increment events.

9. The apparatus according to claim 8, wherein the behaviour record associated with a control flow instruction identified by the prediction entry of the third type comprises a single element which is the selected element.

10. The apparatus according to claim 1, wherein
the first subset of the plurality of pointers comprises the further subset of the plurality of pointers.

11. The apparatus according to claim 1, comprising allocation circuitry configured to allocate a control flow instruction to the plurality of prediction entries;
wherein the allocation circuitry is configured to allocate a control flow instruction, having an associated pointer which is in both the first subset and the further subset, to a selected prediction entry chosen from among the first type and the at least one further type.

12. The apparatus according to claim 11, wherein
the allocation circuitry is configured to preferentially choose as the selected prediction entry a free prediction entry of the at least one further type.

13. The apparatus according to claim 1, comprising power control circuitry, wherein:
the prediction circuitry comprises multiple partitions each for storing a respective type of prediction entry; and
the power control circuitry is responsive to one or more power trigger events to separately control a power mode of each partition.

14. The apparatus according to claim 1, wherein the training circuitry comprises tracker circuitry to maintain a plurality of tracker entries each associated with a control flow instruction, the training circuitry arranged to perform the training process for the given control flow instruction identified in a given tracker entry; and
promotion circuitry, responsive to detection of the correlation threshold being met for the given control flow instruction, to allocate a prediction entry within the prediction circuitry to identify the given control flow instruction and the associated pointer, and to establish within the prediction entry the behaviour record.

15. The apparatus according to claim 14, comprising cache circuitry to maintain a plurality of cache entries, each cache entry to store a resolved behaviour of an instance of a control flow instruction identified by a tracker entry of the tracker circuitry along with an associated tag value generated in dependence on a chosen pointer when the resolved behaviour was allocated into that cache entry.

16. The apparatus according to claim 1, comprising update circuitry configured to update a prediction entry identifying a given control flow instruction in response to a resolved behaviour event identifying a resolved behaviour for one or more subsequently observed instances of the identified given control flow instruction; wherein
the update circuitry is configured to update a prediction entry of the at least one further type within fewer clock cycles following the resolved behaviour event than the update circuitry is configured to update a prediction entry of the first type.

17. A system comprising:
the apparatus according to claim 1, implemented in at least one packaged chip;
at least one system component; and
a board,
wherein the at least one packaged chip and the at least one system component are assembled on the board.

18. A chip-containing product comprising the system according to claim 17, assembled on a further board with at least one other product component.

19. A method of predicting behaviour of control flow instructions, comprising:
maintaining pointer values for a plurality of pointers and, responsive to a series of increment events, differentially incrementing pointer values of the pointers;
employing prediction circuitry to maintain a plurality of prediction entries, each prediction entry arranged to identify a control flow instruction with an associated pointer from the plurality of pointers, and a behaviour record comprising at least one element, wherein a valid element of the behaviour record comprises an indication of a resolved behaviour of an instance of the control flow instruction identified by the prediction entry;
performing a training process to seek to determine from among the plurality of pointers a given pointer, to be associated with a given control flow instruction identified by a given prediction entry of the prediction circuitry, where a pointer value of the given pointer increments in a manner that meets a correlation threshold with occurrence of instances of the given control flow instruction;
detecting replay of a given instance of the given control flow instruction identified by the given prediction entry of the prediction circuitry; and
responsive to replay of the given instance of the given control flow instruction identified by the given prediction entry of the prediction circuitry, using the resolved behaviour stored in a selected element of the behaviour record of the given prediction entry as the predicted behaviour of the given instance of the given control flow instruction, wherein the selected element is dependent on the pointer value of the given pointer; wherein
the plurality of prediction entries comprises:
at least one prediction entry of a first type, wherein the prediction circuitry is enabled to use each prediction entry of the first type to identify a control flow instruction whose associated pointer is within a first subset of the plurality of pointers; and
at least one prediction entry of at least one further type, wherein the prediction circuitry is enabled to use each prediction entry of the at least one further type to identify a control flow instruction whose associated pointer is within a further subset of the plurality of pointers that excludes at least one pointer of the first subset.

20. A non-transitory computer-readable medium to store computer-readable code for fabrication of a data processing apparatus comprising:
pointer storage configured to store pointer values for a plurality of pointers;
increment circuitry, responsive to a series of increment events, to differentially increment the pointer values of the pointers;
prediction circuitry configured to maintain a plurality of prediction entries, each prediction entry arranged to identify a control flow instruction with an associated pointer from the plurality of pointers, and a behaviour record comprising at least one element, wherein a valid element of the behaviour record comprises an indication of a resolved behaviour of an instance of the control flow instruction identified by the prediction entry; and
training circuitry configured to perform a training process to seek to determine from among the plurality of pointers a given pointer, to be associated with a given control flow instruction identified by a given prediction entry of the prediction circuitry, where a pointer value of the given pointer increments in a manner that meets a correlation threshold with occurrence of instances of the given control flow instruction; wherein
the prediction circuitry is responsive to replay of a given instance of the given control flow instruction identified by the given prediction entry of the prediction circuitry, to use the resolved behaviour stored in a selected element of the behaviour record of the given prediction entry as the predicted behaviour of the given instance of the given control flow instruction, wherein the selected element is dependent on the pointer value of the given pointer; and
the plurality of prediction entries comprises:
at least one prediction entry of a first type, wherein the prediction circuitry is enabled to use each prediction entry of the first type to identify a control flow instruction whose associated pointer is within a first subset of the plurality of pointers; and at least one prediction entry of at least one further type, wherein the prediction circuitry is enabled to use each prediction entry of the at least one further type to identify a control flow instruction whose associated pointer is within a further subset of the plurality of pointers that excludes at least one pointer of the first subset.

* * * * *